(12) United States Patent
Mungo et al.

(10) Patent No.: US 11,012,515 B2
(45) Date of Patent: May 18, 2021

(54) MACHINE TO MACHINE ARCHITECTURE

(71) Applicant: Accenture Global Services Limited, Dublin (IE)

(72) Inventors: Fabio Mungo, Rome (IT); Andrea Franco, Rome (IT); Emilio Paterlini, Rome (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 16/351,252

(22) Filed: Mar. 12, 2019

(65) Prior Publication Data

US 2019/0215371 A1 Jul. 11, 2019

Related U.S. Application Data

(63) Continuation of application No. 15/688,475, filed on Aug. 28, 2017, now Pat. No. 10,277,681, which is a
(Continued)

(30) Foreign Application Priority Data

Feb. 15, 2010 (EP) .................................... 10425035

(51) Int. Cl.
*H04W 4/70* (2018.01)
*H04L 29/08* (2006.01)
*H04L 12/24* (2006.01)

(52) U.S. Cl.
CPC .......... *H04L 67/125* (2013.01); *H04L 41/028* (2013.01); *H04L 67/20* (2013.01);
(Continued)

(58) Field of Classification Search
None
See application file for complete search history.

(56) References Cited

U.S. PATENT DOCUMENTS

| 7,213,061 B1 | 5/2007 | Hite et al. |
| 7,739,367 B2 * | 6/2010 | Ding ..................... H04L 67/125 709/223 |

(Continued)

FOREIGN PATENT DOCUMENTS

| CN | 1536818 | 10/2004 |
| CN | 101155332 | 4/2008 |
| WO | WO 2008/044225 A2 | 4/2008 |

OTHER PUBLICATIONS

Extended European Search Report for co-pending European Application No. 10425035.2, dated Sep. 6, 2010, 26 pgs.
(Continued)

*Primary Examiner* — Ayanah S George
(74) *Attorney, Agent, or Firm* — Brinks Gilson & Lione

(57) ABSTRACT

A machine-to-machine communication platform provides a flexible system for device control and solution hosting. In particular, the communication platform hosts and manages third party vertical solutions that interact with external devices. A third party gateway provides the third parties with access to the communication platform so that the third parties may define, configure, and monitor custom vertical solutions that are locally hosted in the communication platform. The communication platform provides a communication manager that implements a device independent communication facility for communicating with the external devices. As a result, the communication platform connects to, communicates with, and controls virtually any external device.

22 Claims, 49 Drawing Sheets

Related U.S. Application Data continuation of application No. 15/294,346, filed on Oct. 14, 2016, now Pat. No. 9,781,213, which is a continuation of application No. 12/777,015, filed on May 10, 2010, now Pat. No. 9,497,070.

(52) U.S. Cl.
CPC .............. *H04L 67/34* (2013.01); *H04W 4/70* (2018.02); *H04L 41/0266* (2013.01); *H04L 41/0273* (2013.01); *H04L 67/025* (2013.01)

(56) References Cited

U.S. PATENT DOCUMENTS

| | | |
|---|---|---|
| 7,987,490 B2 | 7/2011 | Ansari et al. |
| 8,059,565 B2 | 11/2011 | Dholakia et al. |
| 9,497,070 B2 | 11/2016 | Mungo et al. |
| 2005/0108275 A1 | 5/2005 | Capotosto et al. |
| 2008/0109317 A1* | 5/2008 | Singh ............... H04W 4/022 705/14.5 |
| 2008/0219416 A1 | 9/2008 | Roujinksy |
| 2008/0256444 A1* | 10/2008 | Wang ............... G06F 16/951 715/700 |
| 2009/0128319 A1 | 5/2009 | Dholakia et al. |
| 2009/0275331 A1* | 11/2009 | Maitreya ............ H04L 67/04 455/435.1 |
| 2010/0130240 A1* | 5/2010 | Hart ................. H04W 8/005 455/509 |
| 2010/0145164 A1* | 6/2010 | Howell ............. A61B 5/0002 600/301 |

OTHER PUBLICATIONS

European Office Action, dated Sep. 8, 2015, for co-pending European Application No. 10425035.2.

\* cited by examiner

Web Console

- Home
- Reports
  - Scheduled Report
  - Real time Report
- Search
  - Simple Search: [    ] OK
  - Advanced Search Selected Client: Telecom — 2704
- VAS: Vehicle Tracking — 2706
- VAS: Remote Surveillance
- VAS: Remote Metering
- VAS: Personal Tracking
- VAS: Health Diagnostics

| Clients | Hierarchical browsing | Geographical browsing | Number and percentage of devices in OK status |
|---|---|---|---|
| Telecom | | | 98/100 (98%) |
| Telecom B | | | 10/10 (100%) |
| Telecom C | | | 24/48 (50%) |
| Gas | | | 13/52 (25%) |
| Telecom D | | | 1/100 (1%) |
| Telecom E | | | 24/48 (50%) |
| Telecom F | | | 13/52 (25%) |
| Telecom G | | | 1/100 (1%) |
| Telecom H | | | 98/100 (98%) |

FIG. 27

Web Console

- Home
- Reports
  - Scheduled Report
  - Real time Report
- Search
  - Simple Search: [  ] OK
  - Advanced Search Selected Client: Telecom
- VAS: Vehicle Tracking
- VAS: Remote Surveillance
  - Project: T1-SPLB
- VAS: Remote Meteri..2802
- VAS: Personal Tracking
- VAS: Health Diagnostics

2804

| Clients | Hierarchical browsing | Geographical browsing | Number and percentage of devices in OK status |
|---|---|---|---|
| Telecom | | | 98/100 (98%) |
| TelecomB | | | 10/10 (100%) |
| TelecomC | | | 24/48 (50%) |
| Gas | | | 13/52 (25%) |
| TelecomD | | | 1/100 (1%) |
| TelecomE | | | 24/48 (50%) |
| TelecomF | | | 13/52 (25%) |
| TelecomG | | | 1/100 (1%) |
| TelecomH | | | 98/100 (98%) |

Web Console

- Home
- Reports
  - Scheduled Report
  - Real time Report
- Search
  - Simple Search: [ ] OK
  - Advanced Search Selected Client: Telecom
- VAS: Vehicle Tracking
- VAS: Remote Surveillance 2902
  - Project: TI-SPLB
    - Site: Rome (41.901375,12.501165)
    - Site: Rome (41.906964,12.485254)
- VAS: Remote Metering
- VAS: Personal Tracking
- VAS: Health Diagnostics

Mobile Equipments
Client: Telecom
VAS: Remote Surveillance
Project: TI-SPLB

2904

| Check | Device ID | MSISDN | Site | Status |
|---|---|---|---|---|
| ☐ | JR6789 | 3358789001 | Rome (41.901375,12.501165) | OK |
| ☐ | JR6790 | 3358789221 | Rome (41.901375,12.501165) | KO |
| ☐ | JR6791 | 3358789234 | Rome (41.901375,12.501165) | OK |
| ☐ | DR1720 | 3390909090 | Rome (41.906964,12.485254) | NOT Present |
| ☐ | DR1721 | 3345481000 | Rome (41.906964,12.485254) | NOT Present |
| ☐ | DR1722 | 3342381040 | Rome (41.906964,12.485254) | OK |
| ☐ | DR1723 | 3345481123 | Rome (41.906964,12.485254) | OK |
| ☐ | DR1724 | 3345423400 | Rome (41.906964,12.485254) | OK |
| ☐ | DR1725 | 3345423500 | Rome (41.906964,12.485254) | OK |
| ☐ | DR1726 | 3345423600 | Rome (41.906964,12.485254) | OK |

2906

Results 1 - 10 of about 22
Page|<< 1 2 3 >>|

[Check Status Selected]  [Check Status All]

Web Console

- Home
- Reports
  - Scheduled Report
  - Real time Report
- Search
  - Simple Search:
  - Advanced Search Selected Client: Telecom
- VAS: Vehicle Tracking
- VAS: Remote Surveillance
  - Project: TI-SPLB
    - Site: Rome (41.901375, 12.501165)
      - Mobile Equipment: JR6789
      - Mobile Equipment: JR6790 3002
      - Mobile Equipment: JR6791
    - Site: Rome (41.906954, 12.485254)
- VAS: Remote Metering
- VAS: Personal Tracking
- VAS: Health Diagnostics

Mobile Equipments
Client: Telecom
VAS: Remote Surveillance
Project: TI-SPLB
Site: Rome (41.901375, 12.501165)

| Check | ID Device | MSISDN | Status |
|---|---|---|---|
| ☐ | JR6789 | 3358789001 | OK |
| ☐ | JR6790 | 3358789221 | KO |
| ☐ | JR6791 | 3358789234 | OK |

Results 1-3 of about 3
Page |< < 1 > >|

Check Status Selected    Check Status All

FIG. 30

Web Console

- Home
- Reports
  - Scheduled Report
  - Real time Report
- Search
  - Simple Search: [  ] OK
  - Advanced Search

Mobile Equipment: JR6789

| | |
|---|---|
| Client: | Telecom |
| VAS: | Remote Surveillance |
| Project: | TI-SPLB |
| Site: | Rome (41.901375,12.501165) |
| Device Brand: | Telit |
| Device Type: | GT863-PY |

[ Last 10 days Report ]  2804

Mobile Equipment JR6789 — Summary

| | |
|---|---|
| Mobile Equipment Aggregated Status | OK |
| Last Update | 20090729 11:32am |
| SIM Status | OK |
| Device Status | OK |
| Application Status | OK |

SIM

| | |
|---|---|
| MSISDN | 3358789001 |
| APN | Ibox.tim.it |
| Presence on Network | Present |
| Activation Status | Active |
| SMS Channel | OK |
| GPRS Channel | OK |

Application

| | |
|---|---|
| Module 1 status | OK |

[ Check Status Now ]  [ Show scheduling conf. ]

Device HW

| | |
|---|---|
| Device ID | JR6789 |
| Device Date Time | 20090803 11:12am |
| Last reset | 20090701 10:23am |
| Last configuration update | 20090711 11:35am |
| Operational Status | OK |
| Power supply level | High |
| Memory usage | Low |
| CPU load | Low |

Tree (2702):
- Selected Client: Telecom
  - VAS: Vehicle Tracking
  - VAS: Remote Surveillance
    - Project: TI-SPLB
      - Site: Rome (41.901375,12.501165)
        - Mobile Equipment: JR6789
          - Device HW: JR6789
          - SIM: 3358789001
          - Application: Mod.1   (3102)
        - Mobile Equipment: JR6790
        - Mobile Equipment: JR6791
      - Site: Rome (41.906964,12.485254)
  - VAS: Remote Metering
  - VAS: Personal Tracking
  - VAS: Health Diagnostics

Web Console

- Home
- Reports
  - Scheduled Report
  - Real time Report
- Search
  - Simple Search: [  ] OK
  - Advanced Search ☐ *Selected Client: Telecom*
- ☐ VAS: Vehicle Tracking
- ☐ VAS: Remote Surveillance
  - ☐ Project: TI-SPLB
    - ☐ Site: Rome (41.901375, 12.501165)
      - ☐ Mobile Equipment: JR6789
        - ☐ Device HW: JR6789
        - ☐ SIM: 3358789001
        - ☐ Application: Mod. 1
      - ☐ Mobile Equipment: JR6790
      - ☐ Mobile Equipment: JR6791
    - ☐ Site: Rome (41.906964, 12.485254)
- ☐ VAS: Remote Metering
- ☐ VAS: Personal Tracking
- ☐ VAS: Health Diagnostics

Mobile Equipment: JR6789
| | |
|---|---|
| Client: | Telecom |
| VAS: | Remote Surveillance |
| Project: | TI-SPLB |
| Site: | Rome (41.901375, 12.501165) |
| Device Brand: | Telit |
| Device Type: | GT863-PY |

Mobile Equipment JR6789
| Mobile Equipment Aggregated Status | Summary |
|---|---|
| Last Update | 20090729 11:32am |
| SIM Status | OK |
| Device Status | OK |
| Application Status | OK |

Device HW
| | |
|---|---|
| Device ID | JR6789 |
| Device Date Time | 20090803 11:12am |
| Last reset | 20090701 10:23am |
| Last configuration update | 20090711 11:35am |
| Operational Status | OK |
| Power supply level | High |
| Memory usage | Low |
| CPU load | Low |

Check Status Now

Log Messages
- [20090721184043]: Configuration error
- [20090721183911]: Low power supply level
- [20090701113011]: Configuration updated
- [20090701103031]: Reboot completed
- [20090701103011]: Device is rebooting
- [20090701103009]: Reboot command received — 3202

Download system log files   [Download]

[Clear log]

Web Console

- Home
- Reports
  - Scheduled Report
  - Real time Report
- Search
  - Simple Search: [    ] OK
  - Advanced Search

Mobile Equipment: JR6789
| | |
|---|---|
| Client: | Telecom |
| VAS: | Remote Surveillance |
| Project: | TI-SPLB |
| Site: | Rome (41.901375, 12.501165) |
| Device Brand: | Telit |
| Device Type: | GT863-PY |

Mobile Equipment JR6789
| | Summary |
|---|---|
| Mobile Equipment Aggregated Status | OK |
| Last Update | 20090729 11:32am |
| SIM Status | OK |
| Device Status | OK |
| Application Status | OK |

SIM
| | |
|---|---|
| MSISDN | 3358789001 |
| APN | Ibox.tim.it |
| Presence on Network | Present |
| Activation Status | Active |
| SMS Channel | OK |
| GPRS Channel | OK |

[Check Status Now]

Log Messages
[20090721184741]: GPRS Network error
[20090721184043]: Network Configuration error Download network log files  [Download] [Clear log]

Tree:
- Selected Client: Telecom
  - VAS: Vehicle Tracking
  - VAS: Remote Surveillance
    - Project: TI-SPLB
      - Site: Rome (41.901375, 12.501165)
        - Mobile Equipment: JR6789
          - Device HW: JR6789
          - SIM: 3358789001
          - Application: Mod.1
        - Mobile Equipment: JR6790
        - Mobile Equipment: JR6791
      - Site: Rome (41.906964, 12.485254)
  - VAS: Remote Metering
  - VAS: Personal Tracking
  - VAS: Health Diagnostics

Web Console

- Home
- Reports
  - Scheduled Report
  - Real time Report
- Search
  - Simple Search: [        ] OK
  - Advanced Search

Mobile Equipment: JR6789

| | |
|---|---|
| Client: | Telecom |
| VAS: | Remote Surveillance |
| Project: | TI-SPLB |
| Site: | Rome (41.901375,12.501165) |
| Device Brand: | Telit |
| Device Type: | GT863-PY |

[Last 10 days Report]

Mobile Equipment JR6789

| | Summary |
|---|---|
| Mobile Equipment Aggregated Status | OK |
| Last Update | 20090729 11:32am |
| SIM Status | OK |
| Device Status | OK |
| Application Status | OK |

SIM

| | |
|---|---|
| MSISDN | 3358789001 |
| APN | ibox.tim.it |
| Presence on Network | Present |
| Activation Status | Active |
| SMS Channel | OK |
| GPRS Channel | OK |

Application

| | |
|---|---|
| Module 1 status | OK |

[Check Status Now]

Device HW

| | |
|---|---|
| Device ID | JR6789 |
| Device Date Time | 20090803 11:12am |
| Last reset | 20090701 10:23am |
| Last configuration update | 20090711 11:35am |
| Operational Status | OK |
| Power supply level | High |
| Memory usage | Low |
| CPU load | Low |

FIG. 37

Web Console

- Home
- Reports
  - Scheduled Report
  - Real time Report
- Search
  - Simple Search: [    ] OK
  - Advanced Search

Results

| Check | Device ID | MSISDN | Device Type | Device Brand | Client | VAS | Project | Site | Last update | Status |
|---|---|---|---|---|---|---|---|---|---|---|
| ☐ | DR1721 | 3345481000 | IP Camera | Genetec | Telecom | Remote Surveillance | TI-SPLB | Rome (41.906964,12.485254) | 20090730 11:30am | NOT Present |
| ☐ | DR1722 | 3342381040 | IP Camera | Genetec | Telecom | Remote Surveillance | TI-SPLB | Rome (41.906964,12.485254) | 20090720 06:30pm | OK |
| ☐ | DR1723 | 3345481123 | IP Camera | Exacq | Telecom | Remote Surveillance | TI-SPLB | Rome (41.906964,12.485254) | 20090729 10:20am | OK |
| ☐ | DR1724 | 3345423400 | IP Camera | Exacq | Telecom | Remote Surveillance | TI-SPLB | Rome (41.906964,12.485254) | 20090728 07:30am | OK |

[Check Status Selected]  [Check Status All]

Results 1 - 4 of about 4
Page |<< <1> >|

FIG. 38

Web Console

- Home
  - Scheduling status check
  - Alert page

Client: [▼]     Device Type: [IP Camera ▼]

[Submit]   [Clear]

| Schedule Check | Device ID | MSISDN | Device Type | Device Brand | Client | VAS | Project |
|---|---|---|---|---|---|---|---|
| ☐ | DR1721 | 3345481000 | IP Camera | Genetec | Telecom | Remote Surveillance | TI-SPLB |
| ☐ | DR1722 | 3342381040 | IP Camera | Genetec | Telecom | Remote Surveillance | TI-SPLB |
| ☐ | DR1723 | 3345481123 | IP Camera | Exacq | Telecom | Remote Surveillance | TI-SPLB |
| ☐ | DR1724 | 3345423400 | IP Camera | Exacq | Telecom | Remote Surveillance | TI-SPLB |

Results 1-4 of about 4
Page |<< 1 >>|

○ Detailed Scheduling   ○ Distributed Scheduling

[Schedule Status Check]   [Schedule Status Check All]

FIG. 44

Web Console

- Home
  - Scheduling status check
  - Alert page

Selected Client: Telecom Italia X

- VAS: Vehicle Tracking
- VAS: Remote Surveillance
- VAS: Remote Metering
- VAS: Personal Tracking
- VAS: Health Diagnostics

| Schedule Check | Device ID | MSISDN | Device Type | Device Brand | Client | VAS | Project |
|---|---|---|---|---|---|---|---|
| ☐ | DR1721 | 3345481000 | IP Camera | Genetec | Telecom | Remote Surveillance | TI-SPLB |
| ☐ | DR1722 | 3342381040 | IP Camera | Genetec | Telecom | Remote Surveillance | TI-SPLB |
| ☐ | DR1723 | 3345481123 | IP Camera | Exacq | Telecom | Remote Surveillance | TI-SPLB |
| ☐ | DR1724 | 3345423400 | IP Camera | Exacq | Telecom | Remote Surveillance | TI-SPLB |

Results 1 - 4 of about 4
Page |<< 1 >> >|

○ Detailed Scheduling   ○ Distributed Scheduling

[ Schedule Status Check ]   [ Schedule Status Check All ]

Web Console

- Home
  - Scheduling status check
  - Alert page

Scheduling

| | |
|---|---|
| Minute | 5, 15, 25, 35, 45, 55 |
| Hour | 1am, 2am, 3am, 4am, 5am, 6am |
| Day of the month | None |
| Month | Jul |
| Day of the week | Sat, Sun |

[Submit] [Clear]

Web Console

- Home
  - Scheduling status check
  - Alert page

Scheduling

Time range
From [1am]  To [6am]

Frequency
⦿ Daily  ◯ Weekly  ◯ Monthly

[Submit]  [Clear]

FIG. 47

MACHINE TO MACHINE ARCHITECTURE

PRIORITY CLAIM

This application is a continuation application of U.S. application Ser. No. 15/688,475, filed Aug. 28, 2017, which is a continuation application of U.S. application Ser. No. 15/294,346, filed Oct. 14, 2016, which is a continuation application of U.S. application Ser. No. 12/777,015, filed May 10, 2010, which claims the priority benefit of EPO Application No. 10425035.2, filed Feb. 15, 2010, the contents of both of which are incorporated herein by reference in their entirety.

BACKGROUND OF THE INVENTION

Technical Field

This application relates to a service provisioning and device management platform. In particular, this application relates to providing a platform for remotely hosting services that allows the services to manage and monitor an immense array of different types of devices, as well as collect and track data sent to and from the devices.

Related Art

The rapid development of telecommunications technologies has allowed providers of a wide range of services to manage and control devices remotely. While remote control and management of devices has its advantages, service providers constantly develop new services which require control and management of new types of devices in an effort to stay competitive in the market. In the past, the platforms for managing and controlling the devices were proprietary and once they were developed, the platforms were only able to support the devices and/or services for which they were originally contemplated. If the service provider wished to add support for a new device or service, the service provider would have to expend considerable resources to alter an existing platform or develop a new platform providing support for the new device/service. The situation becomes acute as the market endlessly demands more services and support for newer and more types of devices. The service providers are forced to constantly alter existing platforms or develop new platforms which support the new devices and services, which is time consuming and expensive. Implementing a flexible platform that provides support for virtually any type of service and device is a difficult technical challenge.

SUMMARY

A machine-to-machine communication platform provides technical solutions to the technical problems of implementing locally managed vertical services in a flexible, open manner, while connecting to virtual any external device. The communication platform is not restricted to interoperation with limited types of devices. Instead, the communication platform provides a communication manager that implements a device independent communication facility for connecting to, communicating with, and controlling virtually any external device. Furthermore, the communication platform includes a rules engine through which the communication platform hosts and manages third party vertical solutions that interact with the external devices. A third party gateway provides the third parties with access to the communication platform. As a result, the third parties may define, configure, and monitor custom vertical solutions that are locally hosted in the communication platform.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 27 shows a web console interface with an example tree view object.

FIG. 28 shows a web consoler interface with the tree view object expanded to list projects.

FIG. 29 shows a web console interface with the tree view object expanded to show sites belonging to projects.

FIG. 30 shows a web console interface with the tree view object expanded to show equipments specifically associated to a selected site.

FIG. 31 shows a web console interface with the tree view object expanded to show detailed status information links for selected equipments.

FIG. 32 shows a web console interface with a data log download button.

FIG. 33 shows a subscriber identity module (SIM) detailed status window.

FIG. 37 shows an example of a status display page.

FIG. 38 shows an example of a search result interface.

FIG. 44 shows an example administration page resulting from the selection of a device type.

FIG. 45 shows an administration page with a tree view object displaying services provided to a client.

FIG. 46 shows a detailed scheduling page.

FIG. 47 shows a distributed scheduling page.

DETAILED DESCRIPTION OF THE PREFERRED EMBODIMENTS

Figure 1:
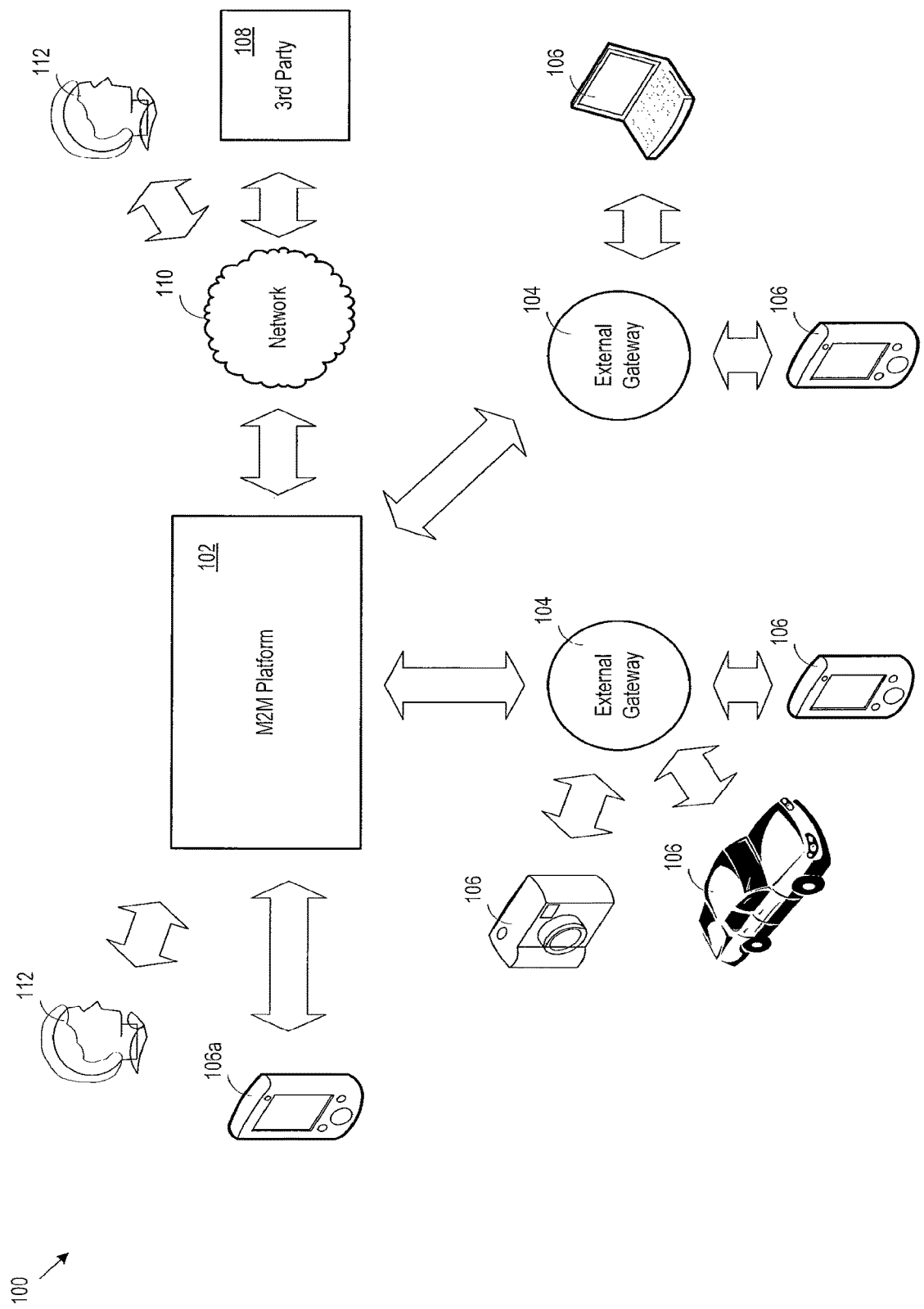
FIG. 1 shows an overview of a machine to machine architecture ("architecture").

FIG. 1 shows an overview of a machine to machine architecture ("architecture") 100. In the architecture 100, a machine to machine platform ("Platform") 102 communicates with a wide range of devices 104 through external gateways 106. The Platform 102 may also communicate with the devices 104 directly (e.g., without communicating through a gateway). The Platform 102 may host various services which use the devices 106 that communicate with the Platform 102. The services may include custom services implemented and hosted in the Platform 102 for third parties 108. The third parties 108 may access Platform 102 through the network 110. The network 110 may be any type of computer or telecommunications network, such as the Internet. Users may also access the Platform 102 through the network 110, or the users may also access the Platform 102 locally. Through the network 110, the third parties 108 and the users 112 may have world-wide access to the Platform 102. The devices 106 may include any types of devices/sensors/apparatus/systems which may communicate with the Platform 102, such as cellular phones, pagers, automobile engine control units, tire pressure monitoring system, health care monitoring systems, security systems, video cameras, photographic cameras, or other devices.

Figure 2:
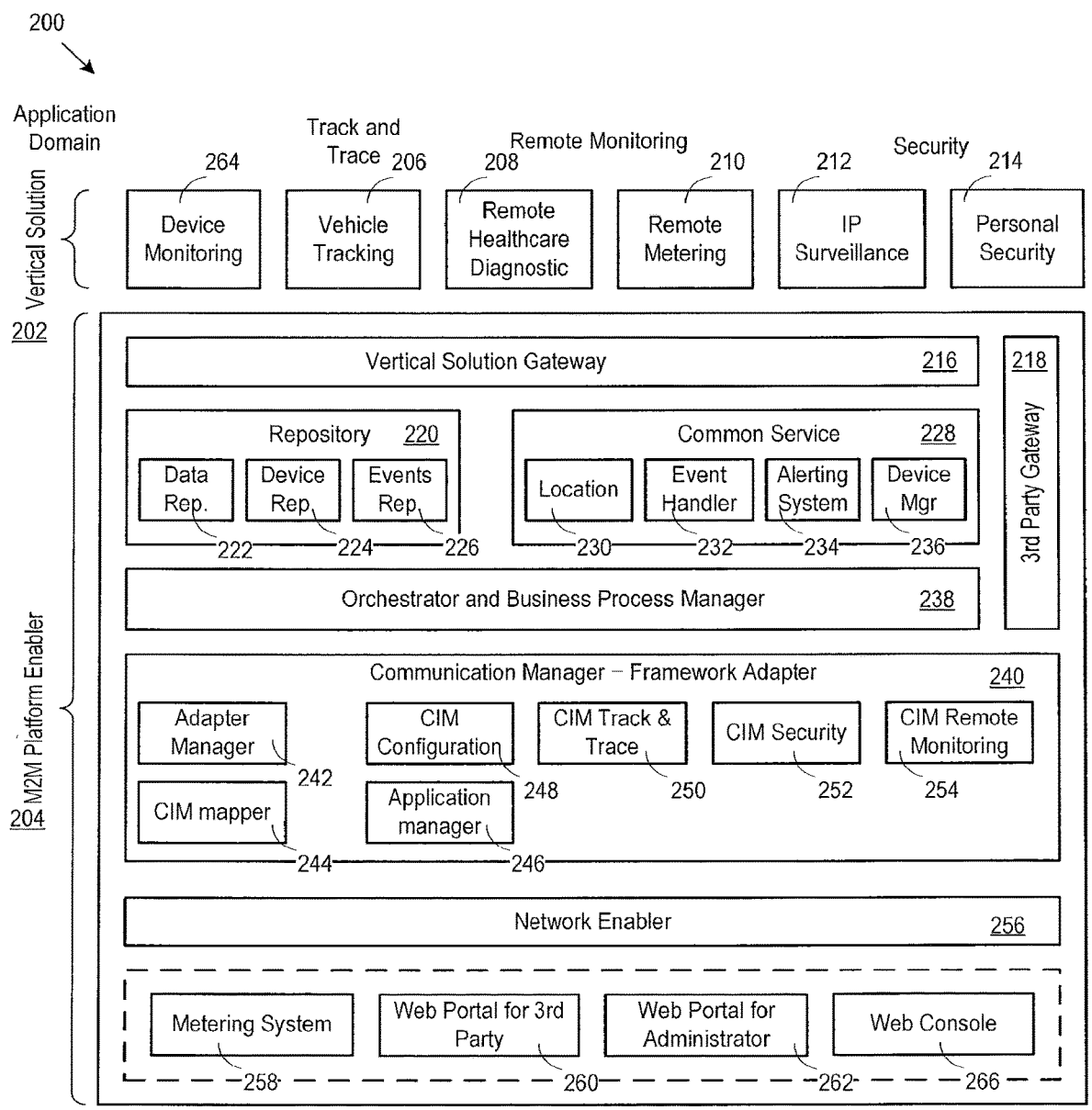
FIG. 2 shows an embodiment of the Machine to Machine Platform.

FIG. 2 shows an embodiment 200 of the Machine to Machine Platform 102. The Platform 102 is largely divided into two sections: the vertical solution section 202 and the Machine to Machine Platform enabler section 204. The vertical solutions 202 are the applications or services hosted by the platform 102. The vertical solutions 202 may define, view, and/or manage rules for dispatching sampling data sent from the devices 106 based on the rules associated with them. The services provided by the vertical solutions 202 may include, for example, vehicle tracking 206, remote healthcare diagnostic 208, remote metering 210, IP surveillance 212, personal security 214, or any other services service providers may implement. The Platform 102 provides the capabilities needed to rapidly create, deliver and manage new vertical solutions 202. The Platform 102 includes four core functionalities: 1) device management, 2) device monitoring, 3) data capture and 4) accounting.

Device management is a set of technologies, protocols and standards used to allow the remote management of devices 106. Users 112 or third parties 108 may use the device management functionality to update device firmware or operating systems, install applications, or fix bugs, using a wireline or wireless interface to the Platform 102. The device management functionality allows the configuration of the devices 106, including, as examples, configuring the devices for first time use, enabling features of the device, and disabling the features. The device management functionality also allows changes to be made to settings and parameters of the devices 106, provide for new software and/or bug fixes to be loaded on the devices, and provide firmware upgrades and lifecycle management of the devices. The device management functionality may be provided via a web portal or web service interfaces that allow third parties to perform device management operations.

The device management functionality works in conjunction with one of the repositories 220, the a device repository 224, which contains, for each specific device 106, the configurable settings and the configuration XML which are used to configure the device 106. The device repository 224 manages the specific configurable XML and the Open Mobile Alliance (OMA) configuration XML. The device repository 224 is also able to store update packages used to upgrade the device firmware or software.

Device monitoring functionality provides device diagnostics and fault management functions. The diagnostics and fault management not only refers to the hardware issues, but also encompasses other elements of the device 106, such as the SIM card, device hardware, and application modules which. The device diagnostics component of the device monitoring functionality is able to analyze log files, the presence of the device 106 on the network and the data regarding the status of the device. The fault management component evaluates predetermined rules and performs actions according to the rules. Examples of possible actions are: sending short messaging service messages (SMS) or emails to notify an event or an alarm to the user 112, third party service provider 108 or other interested entities; triggering a workflow; generating a real-time report on the status of the device 106; or other actions that may be defined by the predetermined rules. The fault management component of the device monitoring functionality allows a user 112 or the third party service provider 108 to configure the rules on the fly, and the actions work in conjunction with the alerting system 234. The alerting system 234 is a component of the Platform 102 which notifies alerts to the users 112 or third party service provider 108 through SMS, emails, and/or web-alerts. The users 112 or third parties 108 may display reports and alarms from a web portal. The reports may be chart reports, dashboards, or other reports. Some examples of information displayed by the reports are: number/percentage of device 106 in fault status and number/percentage of device 106 in stand-by status.

Platform 102 also provides data capture functionality by providing functions to take data received from devices 106 and dispatch the data to third party service provider 108 or processing components of the Platform 102, or to store the data in a data repository 222. The data repository 222 may store detailed data received from the devices 106. Some examples of types of data stored are alarm and data regarding status of the device 106. Service operational data and/or image/video data are dispatched to third parties 108, vertical solutions 202 and are stored in their specific repositories is the set of repositories 220.

The components of the Platform 102 may trace usages of various types to support the accounting functionality. The accounting functionality may be provided by a flow Business Process manager. The accounting functionality may also be provided by integrating with a third party accounting system. Examples of usages traced are usage of services, number of SMSs sent, number of notified events and amount of data traffic generated. The Platform 102 may be integrated with a metering system to provide support for the accounting functionality. The metering system may be a standalone component from the Platform 102 which may be invoked via Remote Method Invocation (RMI) or Simple Object Access Protocol (SOAP).

The machine to machine platform 102 may comprise various logical components which implement the functionalities described in the preceding paragraphs. The vertical solution gateway 216 communicates with the orchestrator and business process manager 238 to allow communication between the rest of the Platform 102 and the vertical solutions 202.

Third party gateway component 218 provides capabilities to perform inbound and outbound request authorization, authentication criteria management and request dispatching. This component provides web services and APIs that allow vertical solutions 202 and third parties 108 (and their customers) to perform all functionalities of the Platform 102 (for example, subscription/unsubscription of device on the Platform 102, activation/deactivation of services, configuration of device, data retry, check status of device, and metering). Web services and APIs are classified based on application domains. Each service hosted on the Platform 102 may be associated with an application domain. An application domain may be associated with many services. Application domains will be described in further detail below.

Repositories 220 may include various repositories for storing data or configuration information used for the various components of the Platform 102. The repositories 220 may be implemented as a single database with a plurality of tables or may be implemented as separate databases for specific functions. Examples of repositories 220 include data repository 222, device repository 224 and the events repository 226. Data repository 222 manages the asset of the Platform 102, such as devices 106, their SIM cards and their configuration. Data repository 222 also supports the subscription and provisioning functionalities.

Components of the common services components 228 provide functionalities which may be shared for hosing various services. Common services components 228 may include a location component 230, an event handler 232, an alerting system 234 and a device management component 236.

The orchestrator and business process manager (Process Manager) 238 communicates directly or indirectly with all the components of the Platform 102 to orchestrate the functionalities of the Platform 102. Communication manager 240 receives and transforms messages from the devices 106 into messages which may be understood by various components of the Platform. The functionalities of the communications manager 240 also may be implemented in the external gateways 104, to which the devices 106 may be connected.

The network enabler 256 may communicate with the communication manager 240 to allow the Platform 102 to connect to the telecommunications network or other networks on which the Platform 102 communicates with the devices 106. The network enabler 256 is the component responsible for enabling communications between the Platform 102 and the telecommunications network using various communications standards, such as SMSC, GGSN. LEA and Mail.

The platform 102 may also be integrated with the metering system 258 for tracking usage data, while the web portals 260 and 262 allow third party users and administrators, respectively to access the functionalities provided by the Platform 102. Each web portal 260 and 262 includes two different areas. An administration area allows for third party administrators to administrate and maintain third party projects, devices 106 and data. A project is a logical group of devices 106. A device management area of the web portals 260 and 262 allows the third party users to upload new firmware or delta firmware, visualize the actual configuration of the device 106, and set new values for configuration parameters by directly inputting the values or by uploading a new XML configuration file.

The communication manager 240 is a component responsible for communication between the devices 106 and the Platform 102 and between external gateways 104 and the Platform 102. The communication manager 240 allows the Platform 102 to communicate with the devices 106 using a common language independent from the particular device and specific for the application domain. In an embodiment, such common language may be a version of XML, a Machine to Machine (M2M) XML format. The translation to and from the M2M XML format is performed using Stylesheets. Using a Stylesheet, the communication manager 240 may translate messages received from devices 106 into the M2M XML format, and also translate the M2M XML message originating from the Platform 102 into a message which the recipient device 106 may understand. Support for a new device may be performed by inserting a new Stylesheet into the repositories 220.

Device management component 236 is one of the common service components 228. The device management component 236 implements the device management functionality discussed above. This component is responsible for device management functionalities, including implementing any desired server specification (e.g., the Open Mobile Alliance Device Management OAM DM) for communicating with the devices 106.

A device monitoring component 264, one of the vertical solutions 202, implements parts or all of the device monitoring functionality described above. This component provides the business logic and the functionalities to analyze the log errors from the devices 106, the presence of devices and data regarding the status of the devices. The fault management logic may utilize the event handler 232 and sends the alarms to the alerting system 234 and generates reports in real-time regarding the status of the devices 106. The third party service provider user may access a monitoring web console 266 to monitor and control selectable data, view any parameters as a trend graph and to configure, visualize and handle alarms.

The event handler 232 is one of the common services 228, which manages events/alarms that the devices 106 send to the Platform 102 (external events) or events/alarms generated by the Platform 102 (internal events). The event handler 232 works in conjunction with the rules repository, which may be one of the repositories 220, to send triggers to the vertical solutions 202. The Alerting system 234 notifies the alerts to the user 112 and/or the third parties 108 via SMS, email or web-alerts. The location component 230 provides geographic information system functionalities, such as view map, geocoding, and tracking. This component also provides a map indicating the locations of projects and devices 106 on a monitor area of the monitoring web console 266.

Metering system 258, web portals 260 and 262, and the web console 266 may be implemented in the Platform 102, stand alone systems integrated with the Platform 102, or stand alone third party solutions.

Figure 3:
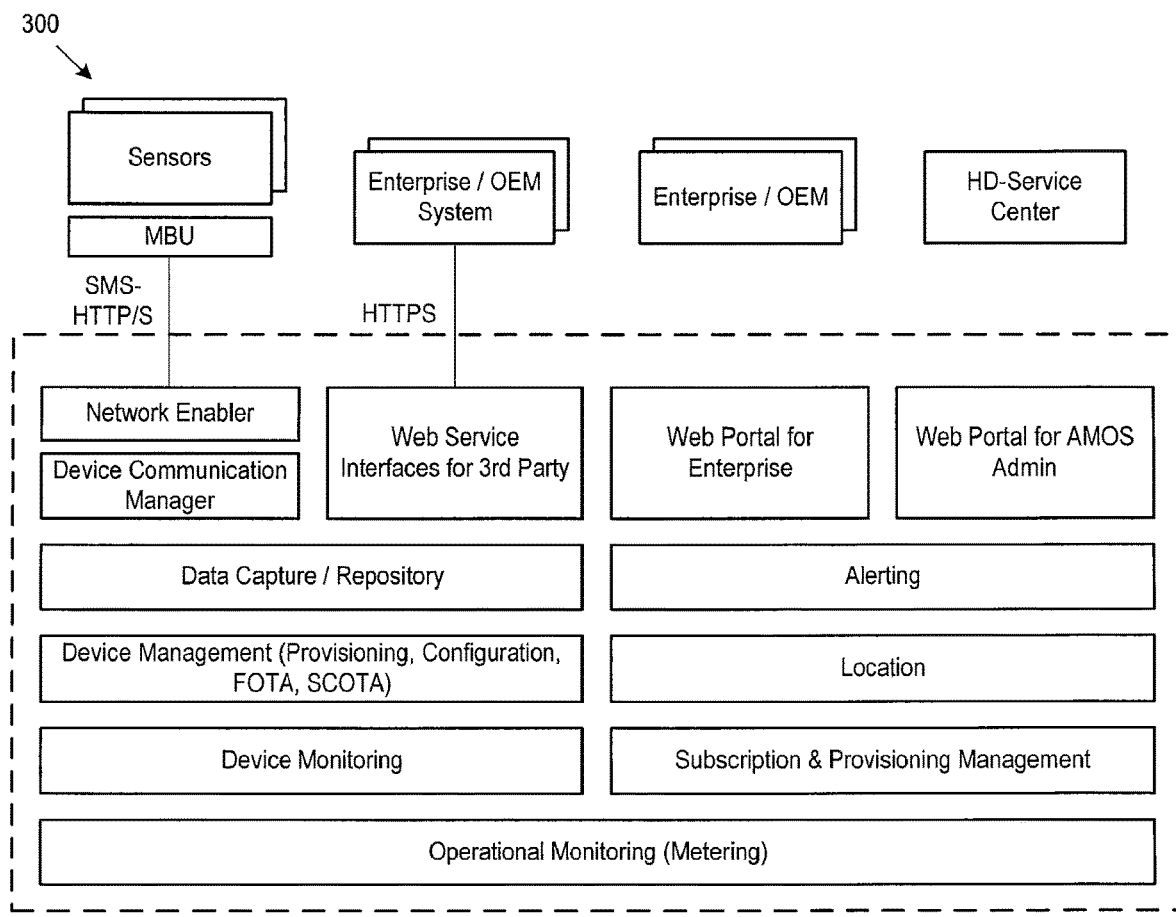
FIG. 3 shows an overview of various features of the architecture.

FIG. 3 shows the Platform 102 from a functionalities point of view 300. The funcdtionalities shown in FIG. 3 are described in more detail at other points in this document.

Figure 4:
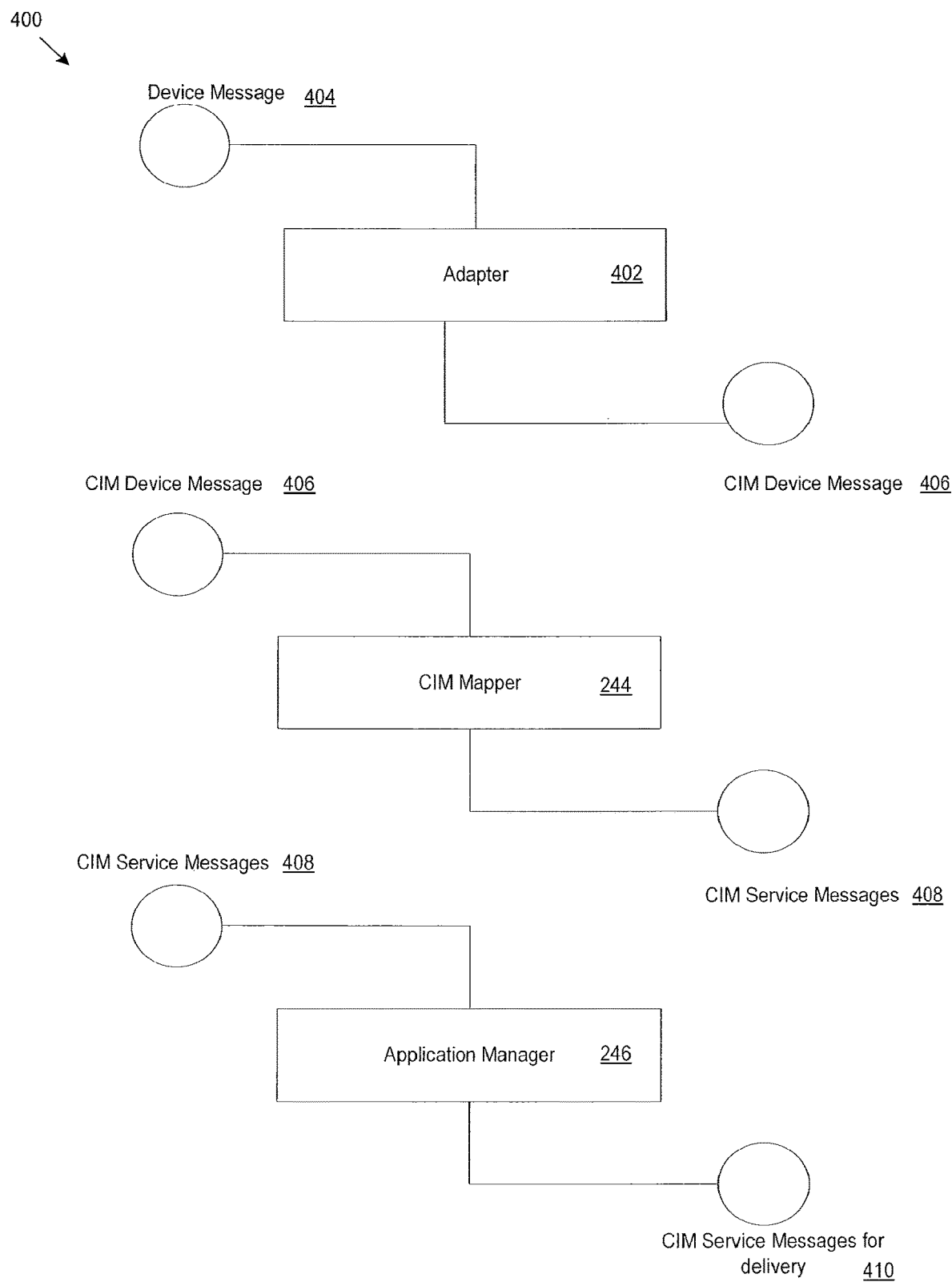
FIG. 4 shows a device messaging and delivery model which a communication manager implements.

FIG. 4 shows a device messaging and delivery model 400 which the communication manager 240 implements. The communication manager 240 may support a specific communication model for communicating between the Platform 102 and the devices 106 and manages devices 106 of any technology. The communication manager 240 creates a level of abstraction that allows describing the devices 106 from a behavioral and physical point of view in order to obtain a homogenous view of all devices 106, independent of their underlying technologies. The communication manager 240 includes an adapter manager 242, a CIM mapper 244, and an application manager 246. The adapter manager 242 manages adapters 402. An adapter 402 specific for processing the data 404 received from a device converts the data into a Common Information Module (CIM) device message 406. The adapter 402 is also able to convert the CIM device message 406 into the device message 404. The CIM mapper 244 may transform the CIM device message 406 into a CIM service message 408, and vice versa. The application manager 246 takes the CIM service message 408 and prepares CIM service messages 410 which are ready to be delivered to corresponding applications.

A communication model implementing a protocol between the Platform 102 and the devices 106 may be provided. A specific library may be managed in order to provide support for devices not compliant with the communication model.

In an embodiment of the communication model, messages communicated to and from the devices 106 and the Platform 102 may be classified based on their purposes. Table 1 shows the message types and the callers and the recipients identified for each message types.

TABLE 1

| MessageType | Caller | Recipient |
| --- | --- | --- |
| ConfigurationCommand | Platform | Device |
| ConfigurationQuery | Platform | Device |
| ConfigurationQuery | Device | Platform |
| Event | Device | Platform |
| ApplicationQuery | Platform | Device |
| Acknowledge | Platform | Device |
| Acknowledge | Device | Platform |

A message of MessageType ConfigurationCommand may be used to set up or update the value of a configuration parameter of a device 106. Depending on the application domain, messages of this MessageType could effectively become an application command. For example within the home automation context, in order to turn off all lights in an apartment, the Platform 102 could send a ConfigurationCommand for a parameter "Light Status" with the value "OFF_ALL". Such message gives the command turn off for all apartment lights to the home automation device.

A message of MessageType ConfigurationQuery may be used by the Platform 102 to request the current device configuration or vice versa.

A message of MessageType Event may be used when the device 106 triggers a condition and sends relevant information to the Platform 106.

A message of MessageType ApplicationQuery may be used by the Platform 102 to perform a data request to a device 106. The type or content of data requested depends on the definition of the application domain.

A message of MessageType Acknowledge may be used to commit a previous communication.

The application domain represents the classification of messages based on the application context ownership. In other words, the application domain identifies a family of messages. In this way, it is possible to authorize the dispatch of events coming from devices 106 only for those third parties 108 that have subscribed to the application domain to which the event belongs. For example, a monitoring service provider should be subscribed to the monitoring application domain before receiving monitoring events. Other examples of application domains are: vehicle tracking, security, home automation, vending machine management, remote metering (AMR/AMI, remote monitoring & control), remote health diagnostics and configuration. The domain configuration is a common domain used for configuration purposes. However, some configuration actions could be required only for a particular application domain.

A Protocol Data Unit (PDU) may be part of the communication model which may be used for interfaces exposed by the platform 102 to the device 106 and vice versa. Each request/response message may include the PDU. A PDU may define the following:

Request: set of parameters provided by the device 106 or the platform 102 which initiates the communication to the recipient. There are several types of requests as explained below in order to manage synchronous and asynchronous communication scenarios.

Response: set of parameters provided by the recipient of a previous synchronous request.

Table 2 shows an example of parameters for the "Requests" and the "Responses":

TABLE 2

| Request | Response |
|---|---|
| requestType | responseStatus |
| caller | conversationID |
| Timestamp | Payload |
| Priority | protocolVersion |
| Expires | |
| Recipient | |
| conversatioID | |
| Payload | |
| protocol Version | |

The following are examples of possible values for the parameter "requestType":

GET: used by the platform 102 or device 106 in order to request a resource to the recipient in a synchronous or in an asynchronous mode. If the physical channel does not support bidirectional channel, the communication is forced to be asynchronous. In some cases, if the asynchronous mode is not suitable for a business process, it could be assumed that the response is not required.

POST: Used by the platform 102 or the device 106 to set or update the status of the recipient.

Reply: Used in asynchronous scenarios in order to communicate the response to a previous request.

Notify: Used when the caller wants to notify the availability of resource. Usually "Notify" will follow a GET request in order to obtain the resource.

The physical channels of the communication model may be SMS or HTTP/HTTPS over GPRS. SMS is always used by the platform 102 when the Platform needs to initiate the communication with the device 106. SMS supports only asynchronous communications. HTTP/HTTPS over GPRS is used by the device 106 to communication triggered events but also is used by the Platform 102 to send responses to the devices upon previous requests.

Table 3 shows examples of possible combinations between PDU, caller recipient, messageType, and the physical channel.

TABLE 3

| PDU | Caller | MessageType | Physical Channel | Recipient |
|---|---|---|---|---|
| Async. POST | Platform | ConfigurationCommand | SMS | Device |
| Async. GET | Platform | ConfigurationQuery | SMS | Device |
| Async. GET | Platform | ApplicationQuery | SMS | Device |
| Sync. Response | Platform | Acknowledge | HTTPs | Device |
| Async. Notify | Platform | ConfigurationCommand | SMS | Device |
| Sync. Reply | Device | Acknowledge | HTTPs | Platform |
| Sync./Async GET | Device | ConfigurationQuery | HTTPs | Platform |
| Sync. POST | Device | Event | HTTPs | Platform |
| Sync. Reply | Device | Event | HTTPs | Platform |

Referring back to FIG. 4, the CIM Service Messages 410 ready for delivery are grouped into application domains, based on the application context ownership. The CIMs corresponding to the application domain the messages belong to processes the corresponding messages.

Figure 5:
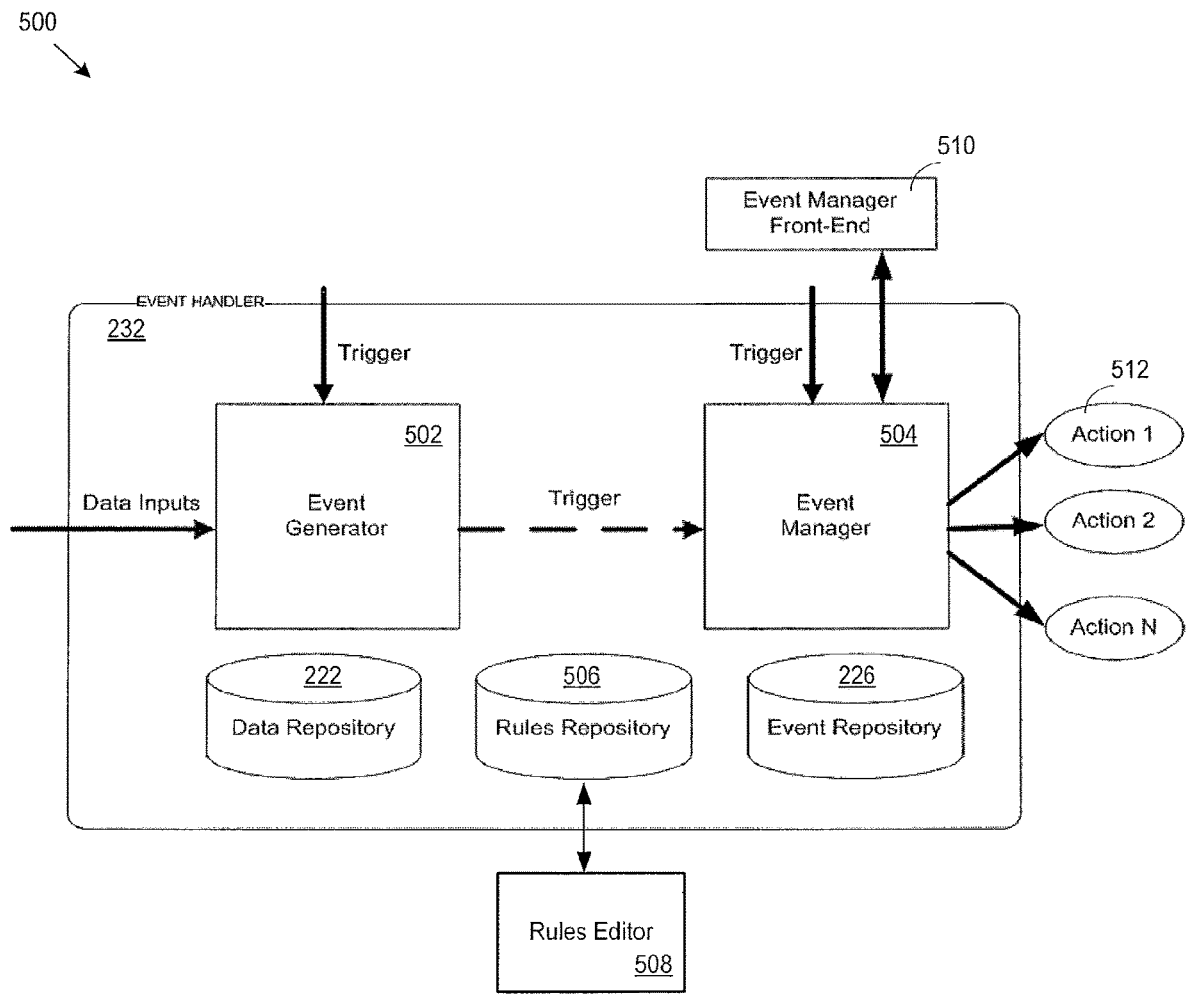
FIG. 5 shows a high level architecture of the event handler.

FIG. 5 shows a high level architecture 500 of the event handler 232. The event handler 232 manages the events/alarms sent by the devices 106 to the platform 102 or events/alarms created by the platform. The event handler includes an event generator 502, event manager 504, events repository 226, rules repository 506, data repository 222, rules editor 508, and an events manager front-end 510.

The task of the event generator 502 component is to verify, through predefined rules and questioning selected sources of information available (in databases, responses from web services, and other sources), whether or not to generate an alarm.

The role of the event manager 504 is to manage the life cycle of events. Event repository 226 stores all the events, even those already closed. The rules repository 506 stores all the default rules. Data repository 222 may be used as the data dictionary that the event handler 232 may reference during the assessment of the rules contained in the rules repository 506. These data can equally be data in a database, responses to web services invocations internal or external to the platform, etc. The rules editor 508 is an interface, made available by the Platform 102 for defining new rules and the managing existing rules. The rules editor 508, normally provided by commercial BRMS, provides interfaces for the definition and population of the rules repository 224. Through interfaces (web services) made available by the Platform 102 in the event handler 232, the event manager front end 510 provides third party service provider users the ability to see in detail the all the events and the possibility to manage the life cycle (create new event, closing event, and other parts of the life cycle) of the events. For example, part of the event manager front end 510 could be a graphical user interface (GUI) available to an operator of a control room to view the details of an event and ask to close an event the system safety has been verified.

As examples, an event may include the following attributes:
Event id
Event type
Event status
Creation method (internal/external)
Event creation timestamp
Last status change timestamp
Parent event id (optional)
Event owner id (component/operator)
Event parameters Among the main objectives of the event manager 232 is to handle the event: to decide what action to take once an event is created and in what order (event-reaction workflow). The event-reaction will be undertaken on the basis of the attributes of the event, with particular reference to the type of event and subject to the particular value assumed by the parameters that accompany it (event parameters). The actions 512 performed in response to the event may include sending emails, sending SMS, invoking web services, and creating a child event.

Figure 6A:
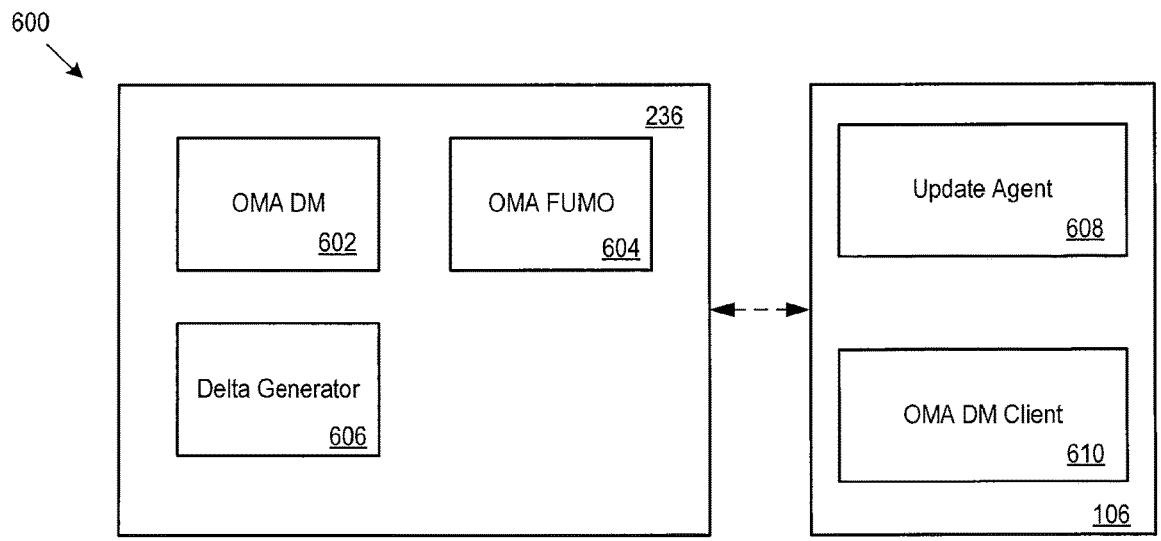
FIG. 6A shows an implementation of the device management component.

FIG. 6A shows an implementation 600a of the device management component 236. The device management component 236 implements the device management functionality. Of the devices 106, mobile phones 106a may be managed differently by the device management component 236 from other devices 106. The mobile management functionality to manage the mobile phones 106a may be provided for my integrating solutions such as Nokia™ Siemens™ device management solution or Afaria™ Sybase™ device management solution. A custom solution may be implemented for the device management functionality for the devices 106 other than mobile phones 106a. However, the custom solution may also provide management functionality for the mobile phones 106a as well.

The device management component 236 implementing the custom solution supports the Firmware Over-The-Air (FOTA) process. The solution is also compliant to the OMA specifications. FOTA is a process that allows embedded software to be updated wirelessly, anywhere and at any time. A firmware includes all the software which enables a device operational. Unlike regular software, firmware is not customizable by the end user using the device.

The device management component 236 further includes an OMA-DM component 602, OMA-FUMO component 604, a delta generator 606 and an update agent 608. The OMD-DM 602, OMA-FUMO (Open Mobile Alliance— Firmware Update Management Object) 604 and the delta generator 606 components reside on the Platform 102. The OMA-DM component 602 is a component that implements the OMA DM 1.2 specification. The OMA DM 1.2 specification is a device management protocol for management of all small devices over the air. The OMA-FUMO component 604 is a component that implements the OMA FUMO 1.0 specification for updating firmware. The delta generator 606 may be software which compares two firmware versions and generates a delta package containing only the differences between the two firmware versions. The update agent 608 is a client side component which resides in firmware of devices 106 and applies the actual update to the firmware. The delta generator 606 and update agent 608 may be proprietary to each device, but are compliant to the OMA specifications. An OMA-DM client 610 may also be provided on the device 106 for communicating with the components of the device manager component 236 residing on the Platform 102. All the components of the device management component 236 may be implemented to support the linux operating system (OS).

The FOTA update cycle may generally follow a four stage process: 1) generating the firmware update (delta package); 2) transmitting and submitting the update to a firmware management server; 3) downloading the firmware to the device 106; and 4) updating the device by the update agent 608. The firmware management server may be the DMA-FUMO component 604. The device management component 236 may implement stages 2, 3 and 4 to support the linux OS. The device management 236 may also integrate proprietary solutions to implement support for all the stages 1-4.

Figure 6B:
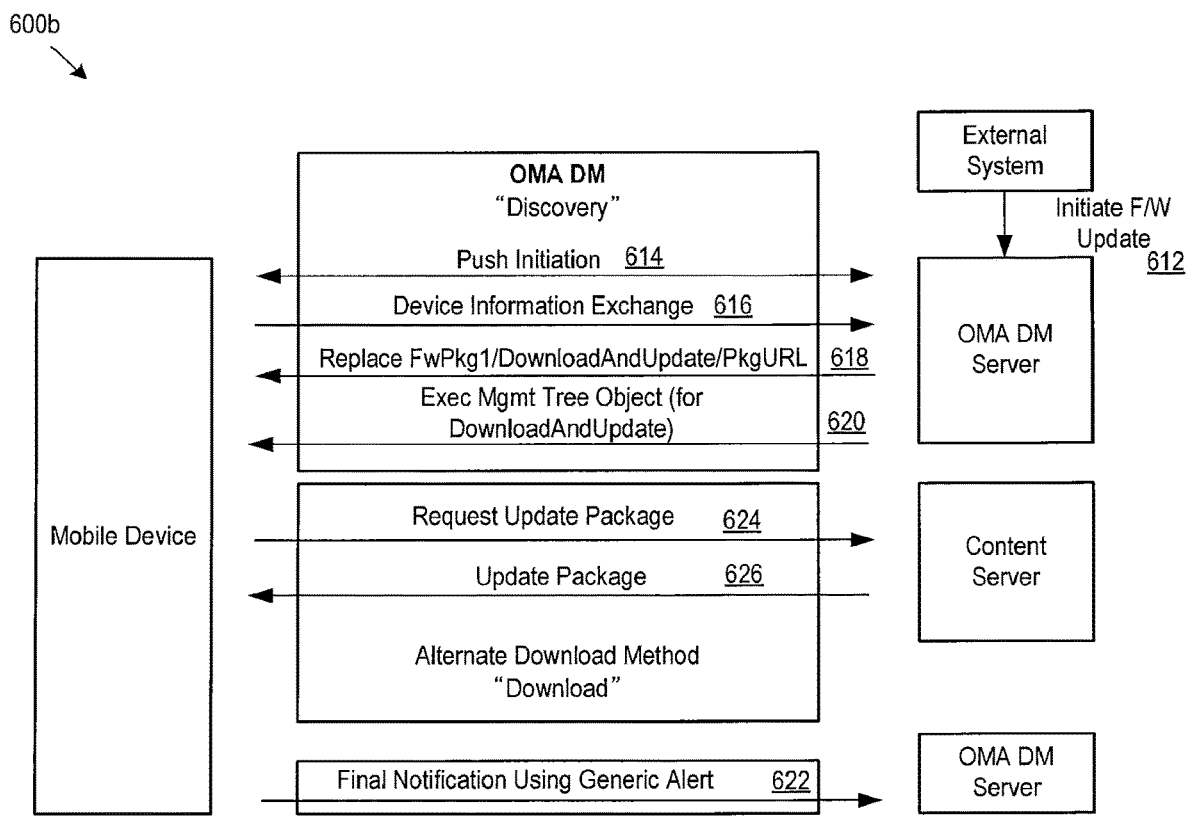
FIG. 6B shows an illustrated example describing a common procedure for a FOTA update cycle of a device.

FIG. 6B shows an example 600b describing a common procedure for a FOTA update cycle of a device 106. External systems or the Platform 102 send instructions to the device management component 236 to initiate a firmware update process (612). The device management component 236 sends an initiation signal to the device 106 (614), and the device responds with device information for verification (616). Afterwards, the device management component 236 sends the firmware update package and the instructions to update the firmware to the OMA-DM client 610 (618, 620). Once device 106 is updated with the new firmware, the device sends a final notification to the device management component 236 (622). Alternatively, the device 106 may initiate and send a request for an update package to the device management component 236 (624). In response, the device management component 236 may send the update package to the device management component 236 (626). Afterwards, the device 106 sends a final notification to the device management component 236 (622).

The device monitoring component 264 may implement the device monitoring functionality described above. The device monitoring component 264 verifies status, performance, fault condition and diagnostics analysis of the devices 106 in order to avoid/reduce business service outages/failures or in order to fulfill service level agreements between the service provider 108 and a user 112. The device monitoring component 264 allows the service provider 108 to be notified of device failures via emails or SMS, or through a web console 266 displaying a list of failed devices. The web console 266 may display the failed devices in a dashboard. The web console 266 may be part of the web portal 260 or 262.

The device monitoring component 264 may support trouble shooting of failed devices 106. To that end, the device monitoring component 264 may analyze separately each element of a device, such as the SIM card, the device hardware and firmware, and application modules. Other individual elements of a device 106 may be monitored individually as well.

Information monitored by the device monitoring component 264 may include status, such as OK, KO, ON, OFF, Stand by, Active, Not Active, or Not Defined. Network channel use, network presence, working condition, last configuration update date, and last reset (reboot) date may also be monitored. Network channel usage for all communications interfaces including SMS and GPRS may be monitored. Network presence indicates the presence of a SIM on an MNO network, such as GSM or GPRS. Working condition indicates whether or not the device is equipped with sensors to discover critical environment conditions such as temperature, humidity, or low power supply or other conditions. The monitored information may also include performance information such as average CPU usage and memory usage.

The device monitoring component 264 may also aggregate and report visualization of the monitored information. A user 108 or a third party service provider 108 may group all its own devices 106 or a subset of them by the status information. The user 112 or the third party service provider 108 may also group all is devices 106 by client, VAS, project, or site.

The device monitoring component 264 may further provide for KPI management and configuration of SLA such as real time graphical representation of device performance and tracking of fault condition in order to manage service levels. The component 264 further supports polling, trapping and real time request mechanisms. Polling refers to performing a scheduled query by the Platform 102 to the device 106. Trapping refers to triggering events by messages from the devices 106 based on predefined conditions, configurations or rules. The events also may be triggered by the device 106. Real time request refers to a user 112 or a third party service provider 108 making a real time monitoring request for all monitored entities. The real time request may be made through the web portals 260 or 262. The monitored entities may include any devices 106.

The device monitoring component 264 may also provide message notification of predefined events via SMS or email. The device 264 may further provide a high-level, business view of monitored devices.

FIGS. 7-20 show workflows of processes and actions implemented by the Orchestrator and Business Process Manager (Process Manger) 238. The Process Manager 238 may communicate directly or indirectly with all other components of the Platform 102 to provide the functionalities of the Platform.

Figure 7:
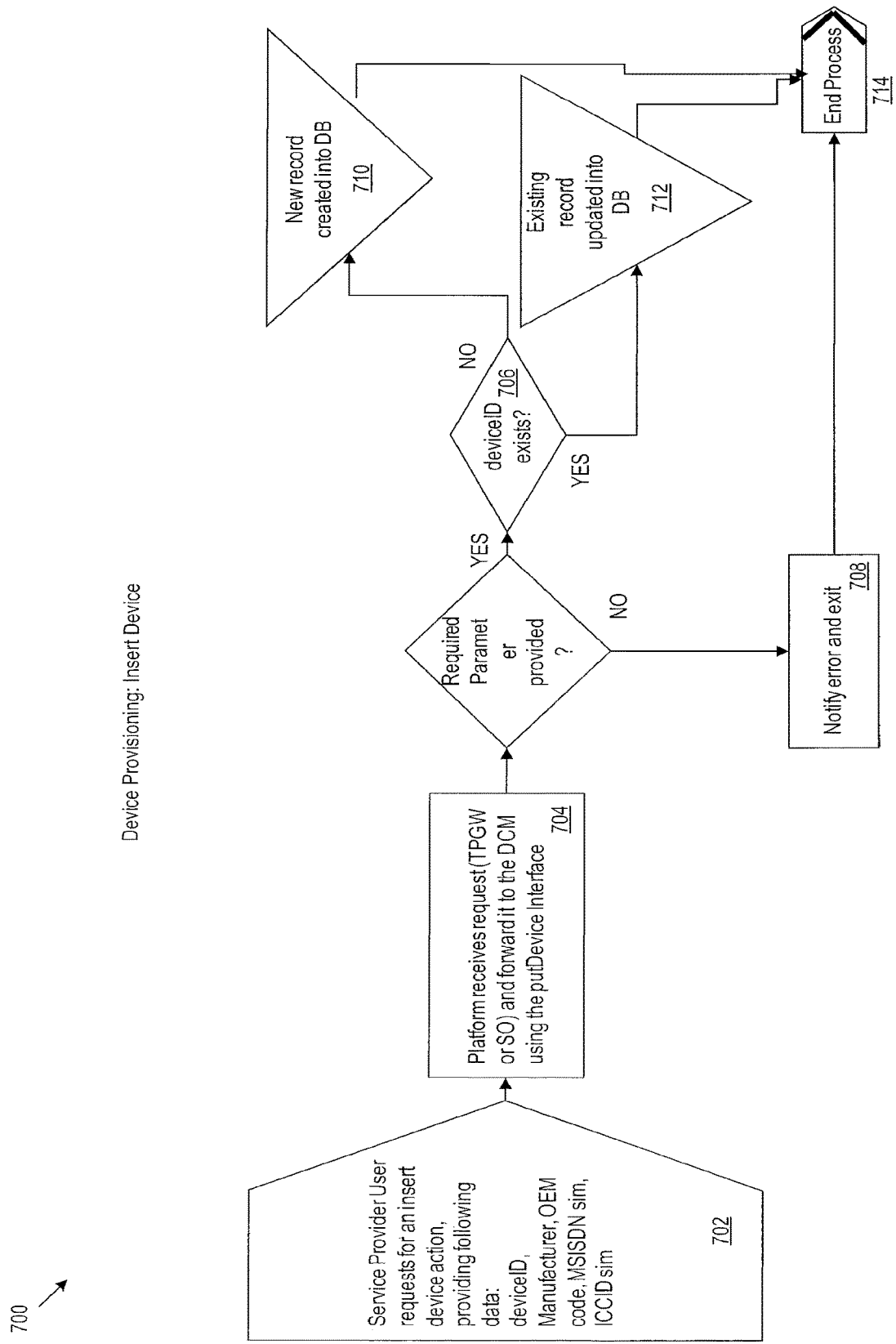
FIG. 7 shows a logic flow diagram for the insert device process of the device provisioning functionality.

FIG. 7 shows a logic flow diagram 700 for the insert device process of the device provisioning functionality discussed above. A user 112 or a third party service provider 108 may request for an insert device action to add a device to one of the device 106 communicating with the Platform 102 (702). Along with the request, the user 112 or the third party service provider 108 may provide the following data:

deviceID, Manufacturer, OEM code, MSISDN sim, ICCID sim. The Platform 102 receives the request and forwards the request to the Process Manager 238 (704). Platform 102 may receive the request through the third party gateway 218, vertical solution gateway 216, web portals 260/262, or the web console 266. The request may be forwarded using the using the insertDevice interface. If all the required parameters are provided, the Process Manager 238 determines whether or not the device ID exists in the device repository 224 (706). If all the required parameters are not provided, the Process Manager 238 notifies an error (708) and the insert device process ends (714). At step 706, if the deviceID does not exist in the device repository 224, a new record is created in the device repository 224. If the deviceID already exists in the device repository 224, the existing record corresponding to the deviceID in the device repository 224 is updated with the new information provided with the request (712), and the process ends (714).

Figure 8:
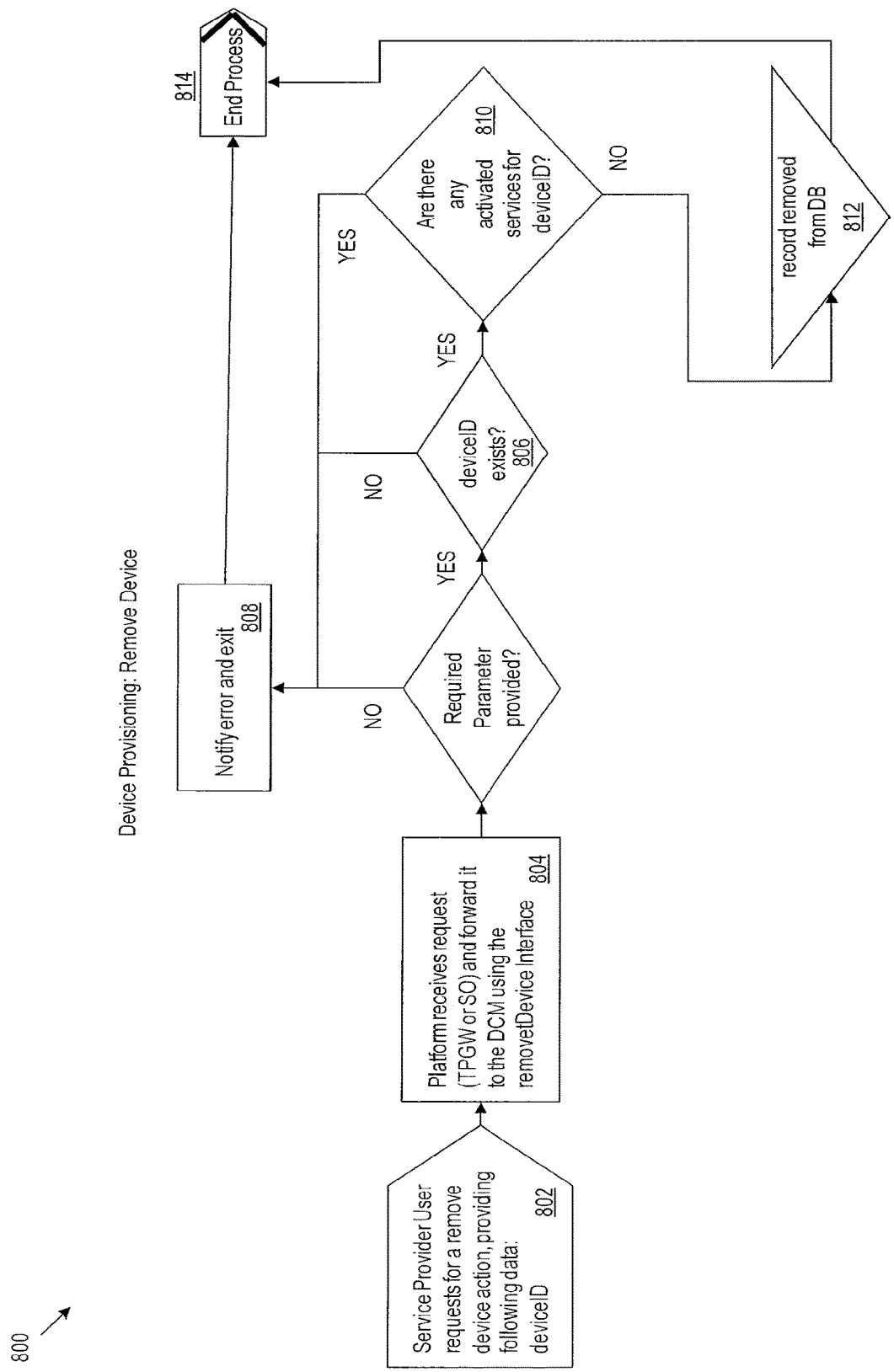
FIG. 8 shows a logic flow diagram for the remove device process of the device provisioning functionality.

FIG. 8 shows a logic flow diagram 800 for the remove device process of the device provisioning functionality. A user 112 or a third party service provider 108 may request for a remove device action to add a device to one of the device 106 communicating with the Platform 102 (802). Along with the request, the user 112 or the third party service provider 108 may provide the following data: deviceID. The Platform 102 receives the request and forwards the request to the Process Manager 238 (804). Platform 102 may receive the request through the third party gateway 218, vertical solution gateway 216, web portals 260/262, or the web console 266. The request may be forwarded using the removeDevice interface. If the required parameter is provided, the Process Manager 238 determines whether or not the deviceID exists in the device repository 224 (806). If the required parameter is not provided, the Process Manager 238 notifies an error (808) and the process ends (814). At step 806, if the deviceID exists in the device repository 224, the Process Manager 238 determines whether or not there are any activated services for the device corresponding to the deviceID (810). If there are no active devices, the record corresponding to the deviceID is removed from the device repository 224 (812) and the process ends (814). If there are active services for the device corresponding to the deviceID, the the Process Manager 238 notifies an error (808) and the process ends (814).

Figure 9:
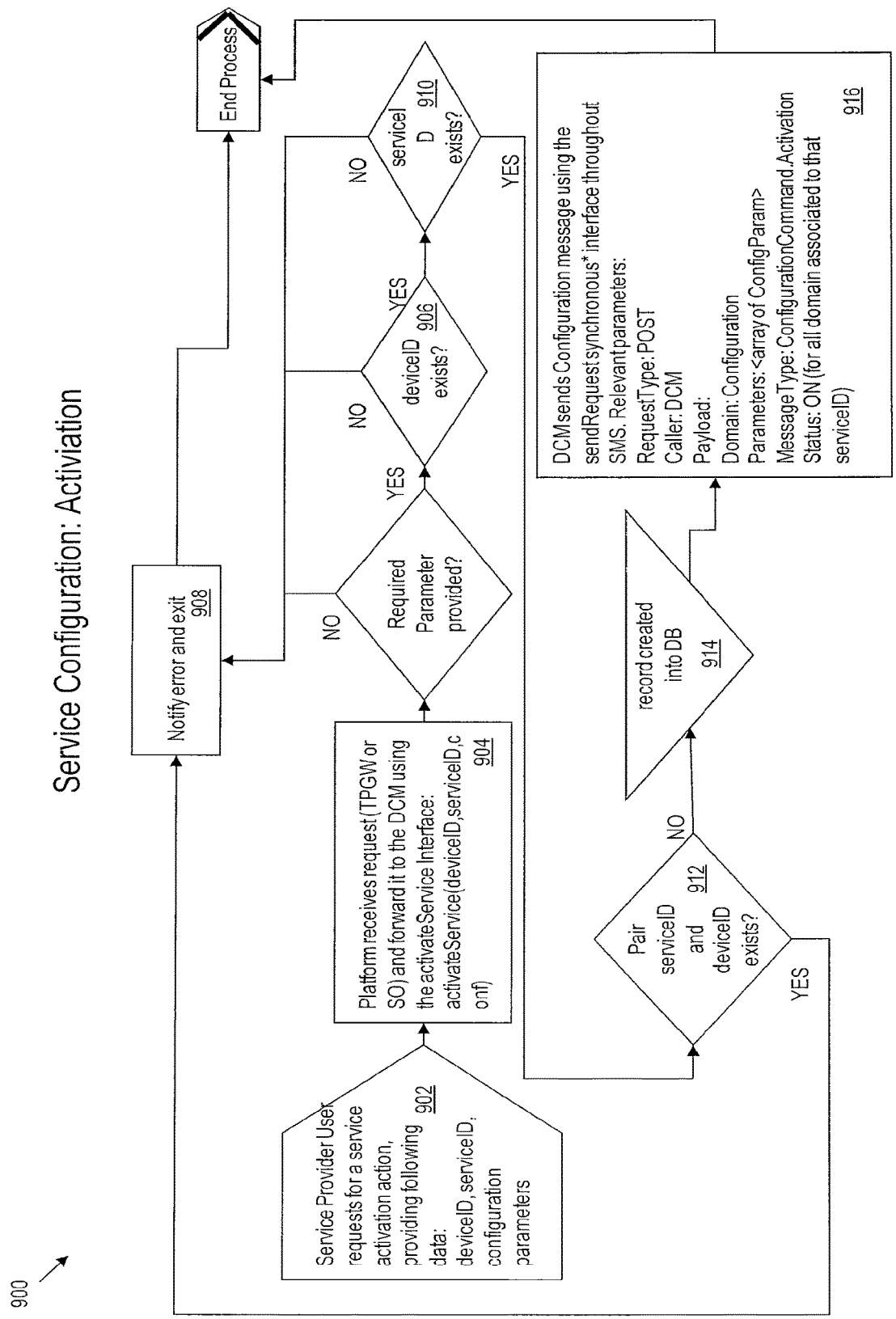
FIG. 9 shows a logic flow diagram for the activation process of a service configuration functionality.

FIG. 9 shows a logic flow diagram 900 for the activation process of a service configuration functionality. A user 112 or a third party service provider 108 may request for a service activation action to configure a device 106 to such that a service is activated for that device (902). Along with the request, the user 112 or the third party service provider 108 may provide the following data: deviceID, serviceId, configuration parameters. The Platform 102 receives the request and forwards the request to the Process Manager 238 (904). Platform 102 may receive the request through the third party gateway 218, vertical solution gateway 216, web portals 260/262, or the web console 266. The request may be forwarded using the activateService interface: activateService(deviceID, serviceId, conf). If all the required parameters are provided, the Process Manager 238 determines whether or not the deviceID exists in the device repository 224 (906). If the required parameter is not provided, the Process Manager 238 notifies an error (908) and the process ends (918). At step 906, if the deviceID exists in the device repository 224, the Process Manager 238 determines whether or not the serviceId exists in the device repository 224 (910). If the serviceID does not exist, the Process Manager 238 notifies an error (908) and the process ends (918). If a service ID exists, then the Process Manager 238 determines whether or not a record pairing the serviceID and the deviceID exists in the device repository 224 (912). If there is already such pair in the device repository 224, the Process Manager notifies an error (908) and the process ends (918). If there is no such pair in the device repository 224, a new record is created in the device repository pairing the serviceID and the deviceID (914). Next, the Process Manager 238 sends a Configuration message to the device 106 corresponding to the deviceID (916). The message may be sent using the sendRequest synchronous interface, with the following parameters:

RequestType: POST
Caller: DCM
Payload:
Domain: Configuration
Parameters: <array of ConfigParam>
MessageType: ConfiguraitonCommand.Activation
Status: ON (for all domain associated o that serviceID).
Afterwards, the process ends (918).

Figure 10:
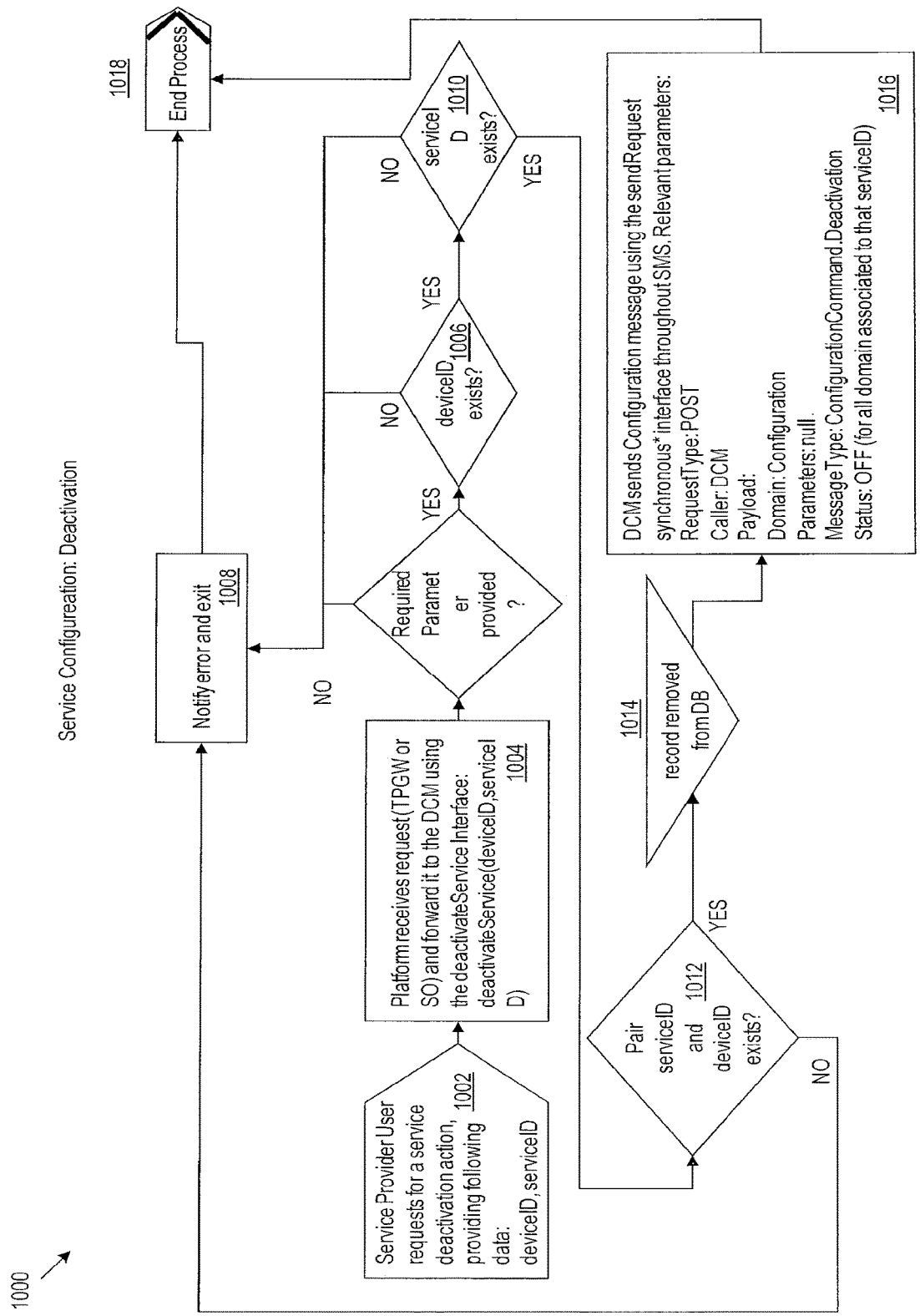
FIG. 10 shows a logic flow diagram for the deactivation process of the service configuration functionality.

FIG. 10 shows a logic flow diagram 1000 for the deactivation process of the service configuration functionality. A user 112 or a third party service provider 108 may request for a service deactivation action to configure a device 106 to such that a service is deactivated for that device (1002). Along with the request, the user 112 or the third party service provider 108 may provide the following data: deviceID, serviceId. The Platform 102 receives the request and forwards the request to the Process Manager 238 (1004). Platform 102 may receive the request through the third party gateway 218, vertical solution gateway 216, web portals 260/262, or the web console 266. The request may be forwarded using the deactivateService interface: deactivateService(deviceID, serviceId). If all the required parameters are provided, the Process Manager 238 determines whether or not the deviceID exists in the device repository 224 (1006). If the required parameter is not provided, the Process Manager 238 notifies an error (1008) and the process ends (1018). At step 1006, if the deviceID exists in the device repository 224, the Process Manager 238 determines whether or not the serviceId exists in the device repository 224 (1010). If the serviceID does not exist, the Process Manager 238 notifies an error (1008) and the process ends (1018). If a service ID exists, then the Process Manager 238 determines whether or not a record pairing the serviceID and the deviceID exists in the device repository 224 (1012). If there is no such pair in the device repository 224, the Process Manager notifies an error (1008) and the process ends (1018). If there is already such pair in the device repository 224, the record is removed from the device repository (1014). Next, the Process Manager 238 sends a Configuration message to the device 106 corresponding to the deviceID (1016). The message may be sent using the sendRequest synchronous interface via SMS, with the following parameters:

RequestType: POST
Caller: DCM
Payload:
Domain: Configuration
Parameters: null
MessageType: ConfiguraitonCommand.Deactivation
Status: OFF (for all domain associated o that serviceID).
Afterwards, the process ends (1018).

Figure 11:
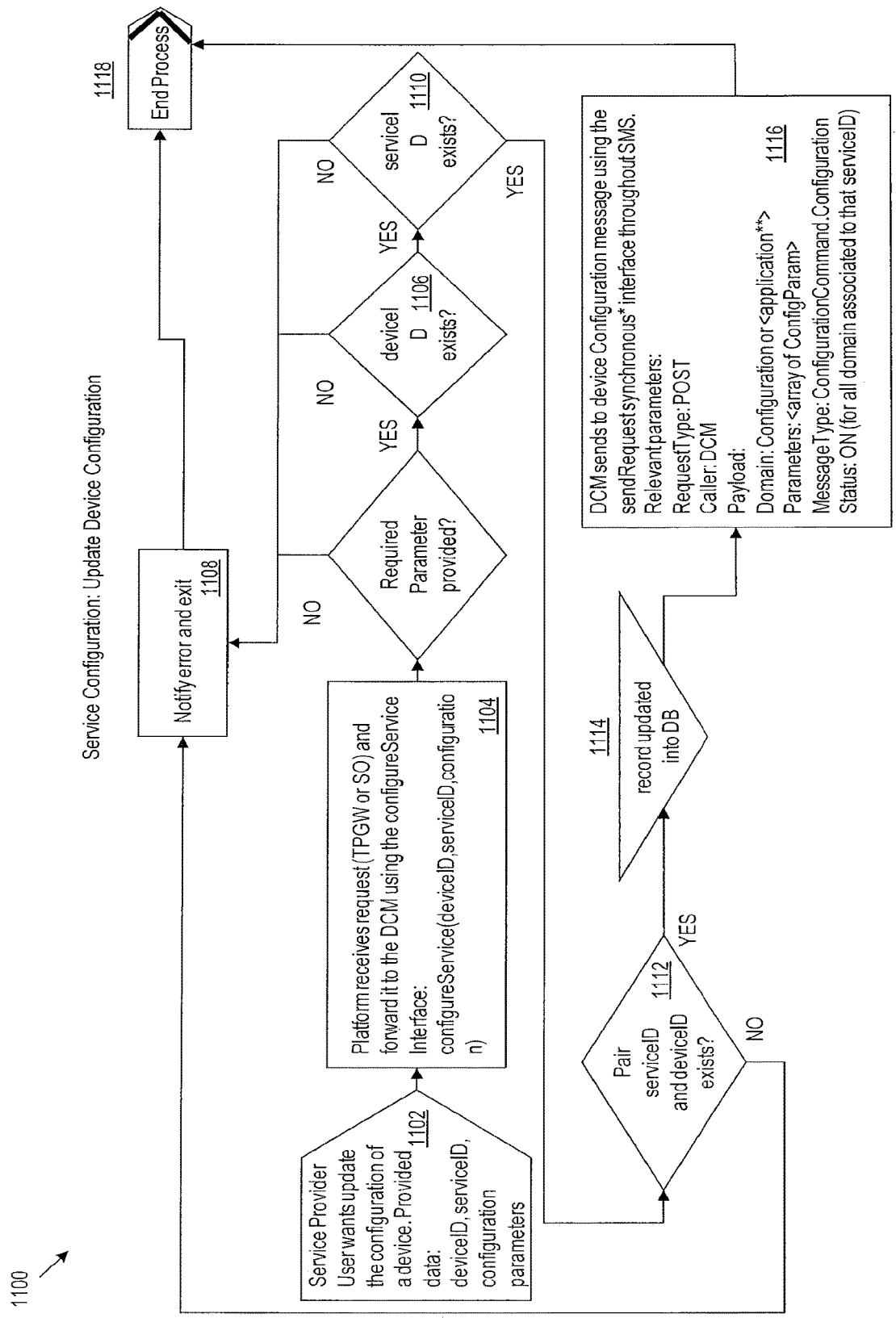
FIG. 11 shows a logic flow diagram for the update device configuration process of the service configuration functionality.

FIG. 11 shows a logic flow diagram 1100 for the update device configuration process of the service configuration functionality. A user 112 or a third party service provider 108 may request to update configuration of a device 106 (1102).

Along with the request, the user 112 or the third party service provider 108 may provide the following data: deviceID, serviceId, configuration. The Platform 102 receives the request and forwards the request to the Process Manager 238 (1104). Platform 102 may receive the request through the third party gateway 218, vertical solution gateway 216, web portals 260/262, or the web console 266. The request may be forwarded using the configureService interface: configureService(deviceID, serviceId, configuration). If all the required parameters are provided, the Process Manager 238 determines whether or not the deviceID exists in the device repository 224 (1106). If the required parameters are not provided, the Process Manager 238 notifies an error (1108) and the process ends (1118). At step 1106, if the deviceID exists in the device repository 224, the Process Manager 238 determines whether or not the serviceId exists in the device repository 224 (1110). If the deviceID does not exist, the Process manager 238 notifies an error (1108) and the process ends (1118). At (1110), if the serviceID does not exist, the Process Manager 238 notifies an error (1108) and the process ends (1118). If a service ID exists, then the Process Manager 238 determines whether or not a record pairing the serviceID and the deviceID exists in the device repository 224 (1112). If there is no such pair in the device repository 224, the Process Manager notifies an error (1108) and the process ends (1118). If there is already such pair in the device repository 224, the record is updated with the information provided with the request (1114). Next, the Process Manager 238 sends a Configuration message to the device 106 corresponding to the deviceID (1116). The message may be sent using the sendRequest synchronous interface via SMS, with the following parameters:

RequestType: POST
Caller: DCM
Payload:
Domain: Configuration (or Application, if the configuration is a command within a specific application domain)
Parameters: <array of ConfigParam>
MessageType: ConfiguraitonCommand.Configuration
Status: ON (for all domain associated o that serviceID).
Afterwards, the process ends (1118).

Figure 12:
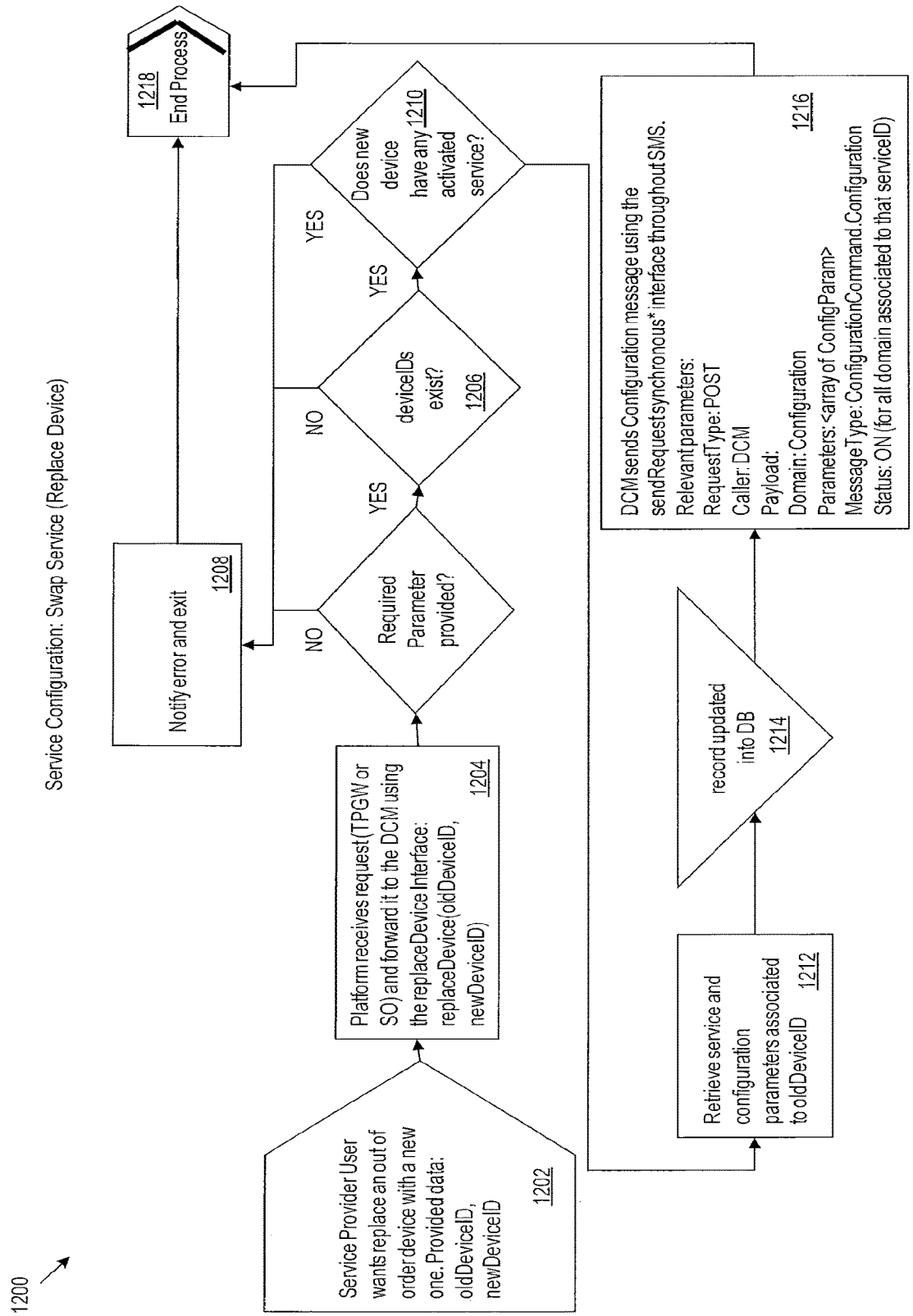
FIG. 12 shows a logic flow diagram for the swap service/replace device process of the service configuration functionality.

FIG. 12 shows a logic flow diagram 1200 for the swap service/replace device process of the service configuration functionality. A user 112 or a third party service provider 108 may request to replace a device 106 with a new device 106 (1202). Along with the request, the user 112 or the third party service provider 108 may provide the following data: oldDeviceID, newDeviceId. The Platform 102 receives the request and forwards the request to the Process Manager 238 (1204). Platform 102 may receive the request through the third party gateway 218, vertical solution gateway 216, web portals 260/262, or the web console 266. The request may be forwarded using the replaceDevice interface: replaceDevice (oldDeviceID, newDeviceId). If all the required parameters are provided, the Process Manager 238 determines whether or not the old and new deviceIDs exists in the device repository 224 (1206). If the required parameters are not provided, the Process Manager 238 notifies an error (1208) and the process ends (1218). At step 1206, if the old and new deviceIDs exists in the device repository 224, the Process Manager 238 determines whether or not the new device has any activated service (1210). If either of the deviceID does not exist in the device repository 224, the Process manager 238 notifies an error (1208) and the process ends (1218). At step 1210, if there are services activated for the new device, the Process Manager 238 notifies an error (1208) and the process ends (1218). If there are no services activated for the new device, then the Process Manager 238 retrieves the service and configuration parameters associated with the oldDeviceID from the device repository 224 (1212). Next, the record is updated in the device repository 224 to transfer the records from the old device to the new device (1214). Next, the Process Manager 238 sends a Configuration message to the device 106 corresponding to the deviceIDs (1216). The message may be sent using the sendRequest synchronous interface via SMS, with the following parameters:

RequestType: POST
Caller: DCM
Payload:
Domain: Configuration
Parameters: <array of ConfigParam>
MessageType: ConfigurationCommand.Configuration
Status: ON (for all domain associated o that serviceID).
Afterwards, the process ends (1218).

Figure 13:
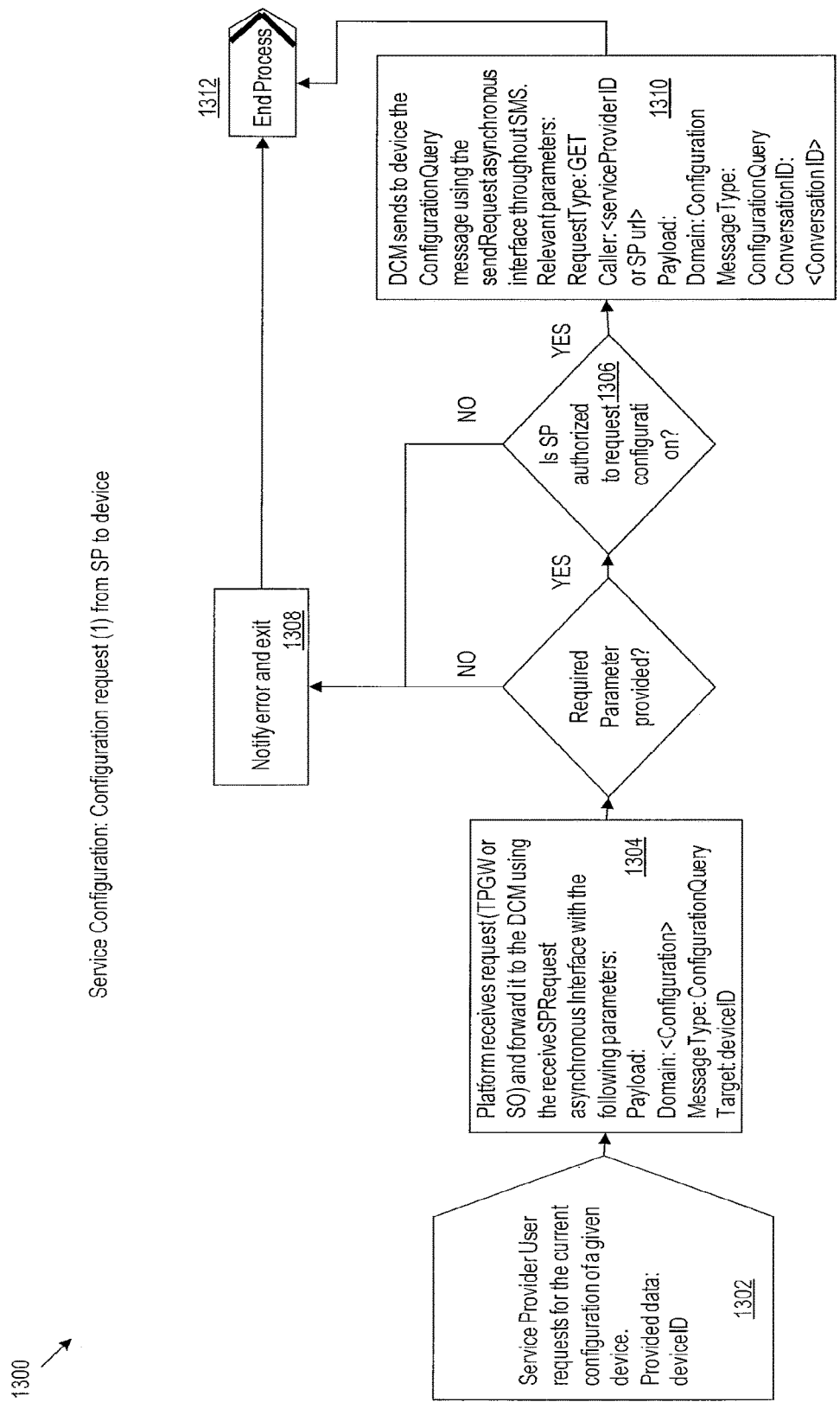
FIG. 13 shows a logic flow diagram for the configuration request (1) from SP to device process of the service configuration functionality.

FIG. 13 shows a logic flow diagram 1300 for the configuration request (1) from SP to device process of the service configuration functionality. A user 112 or a third party service provider 108 may request for the current configuration of a given device 106 (1302). Along with the request, the user 112 or the third party service provider 108 may provide the following data: deviceID. The Platform 102 receives the request and forwards the request to the Process Manager 238 (1304). Platform 102 may receive the request through the third party gateway 218, vertical solution gateway 216, web portals 260/262, or the web console 266. The request may be forwarded using the receiveSPRequest asynchronous with the following parameters:

Payload:
Domain: <Configuration>
MessageType: ConfigurationQuery
Target: deviceID If all the required parameters are provided, the Process Manager 238 determines whether or not the user 112 or the third party service provider 108 is authorized to request configuration (1306). If the required parameters are not provided, the Process Manager 238 notifies an error (1308) and the process ends (1312). At step 1306, if the user 112 or the third party service provider 108 is not authorized, the Process Manager 238 notifies an error (1308) and the process ends (1312). If the user 112 or the third party service provider 108 is authorized, the Process Manager 238 sends a ConfigurationQuery message to the device 106 corresponding to the deviceID (1310). The message may be sent using the sendRequest asynchronous interface via SMS, with the following parameters:

RequestType: GET
Caller: <serviceProvider ID or Service Provider URL>
Payload:
Domain: Configuration
MessageType: ConfigurationQuery
ConversationID: <ConversationID>
Afterwards, the process ends (1312).

Figure 14:
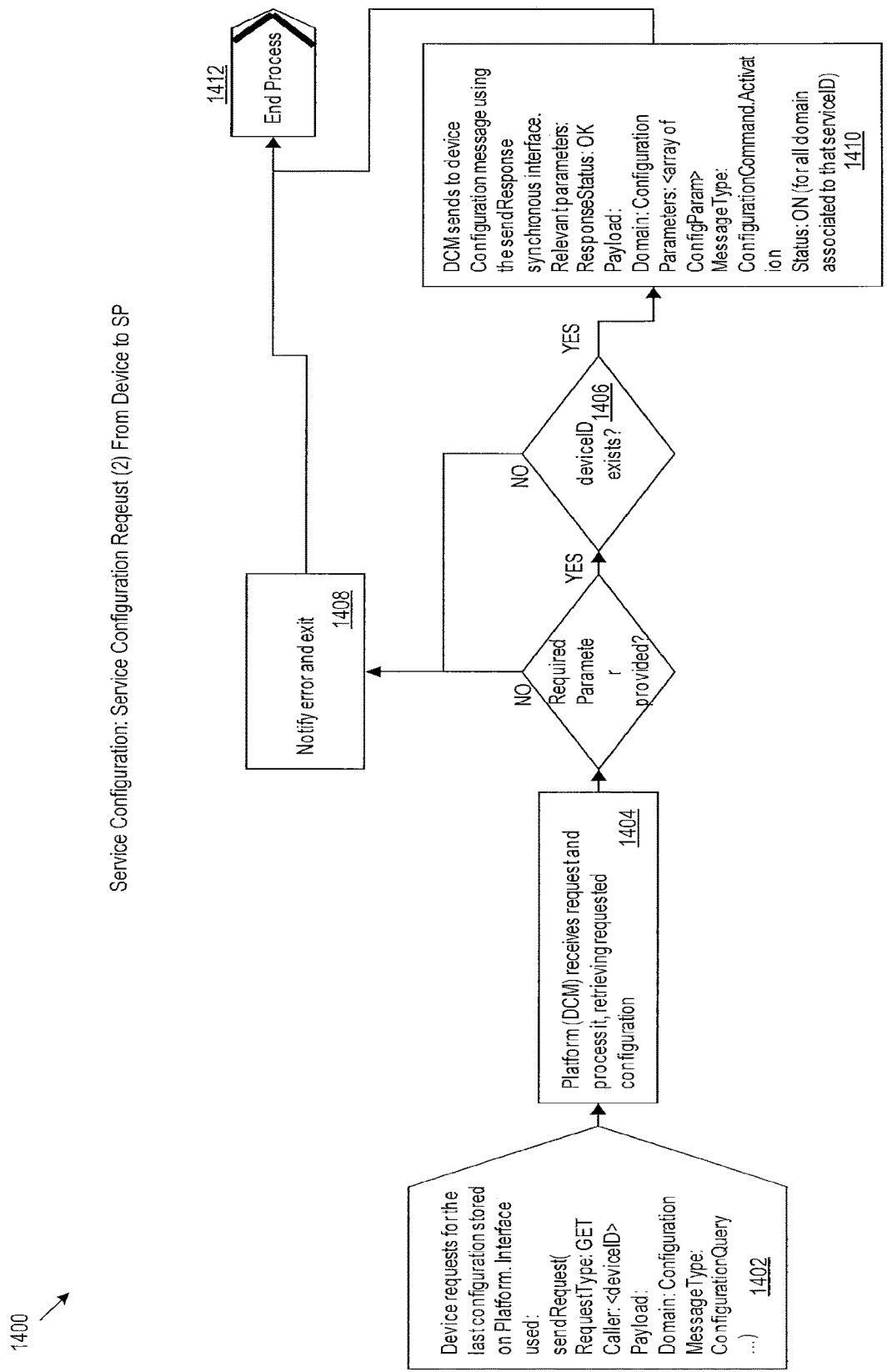
FIG. 14 shows a logic flow diagram for the configuration request (2) from device to SP process of the service configuration functionality.

FIG. 14 shows a flowchart 1400 for the configuration request (2) from device to SP process of the service configuration functionality. A device 106 may request for the last configuration stored on the Platform 102 (1402). The device 106 may send the request via the following interface:
sendRequest(
RequestType: GET
Caller: <deviceID>
Payload:
Domain: Configuration
MessageType: ConfigurationQuery

. . . )

The Platform 102 receives the request, processes the request, and retrieves the requested configuration (1404). If all the required parameters are provided, the Process Manager 238 determines whether or not the deviceID exists in the device repository 224 (1406). If the required parameters are not provided, the Process Manager 238 notifies an error (1408) and the process ends (1412). At step 1406, if the deviceID does not exist in the device repository 224, the Process Manager 238 notifies an error (1408) and the process ends (1412). If the deviceID exists, the Process Manager 238 sends a Configuration message to the device 106 corresponding to the deviceID (1410). The message may be sent using the sendRequest synchronous interface, with the following parameters:
 ResponseStatus: OK
 RequestType: GET
 Payload:
 Domain: Configuration
 Parameters: <array of ConfigParam>
 MessageType: ConfigurationCommand.Activation
 Status: ON (for all domain associated to that service ID)
Afterwards, the process ends (1412).

Figure 15:
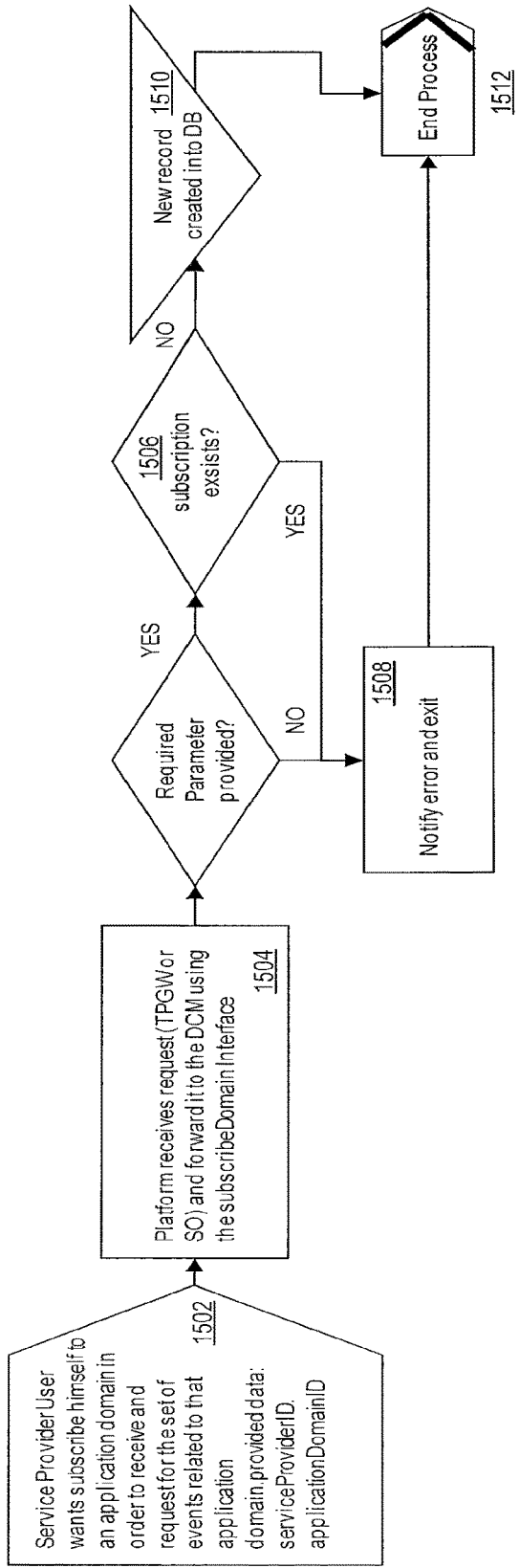
FIG. 15 shows a logic flow diagram for the subscription process of the service provider subscription functionality.

FIG. 15 shows a flowchart 1500 for the subscription process of the service provider subscription functionality. A user 112 or a third party service provider 108 may request for subscription to an application domain in order to receive and request for the set of events related to that application domain (1502). Along with the request, the user 112 or the third party service provider 108 may provide the following data: serviceProviderID, applicationDomainID. The Platform 102 receives the request and forwards the request to the Process Manager 238 (1504). Platform 102 may receive the request through the third party gateway 218, vertical solution gateway 216, web portals 260/262, or the web console 266. The request may be forwarded using the subscribeDomain Interface. If all the required parameters are provided, the Process Manager 238 determines whether or not the requested subscription already exists (1506). If the required parameters are not provided, the Process Manager 238 notifies an error (1508) and the process ends (1512). At step 1506, if subscription already exists, the Process Manager 238 notifies an error (1508) and the process ends (1512). If the requested subscription does not already exist, a new record is created in the device repository 224 (1510), and the process ends (1512).

Figure 16:
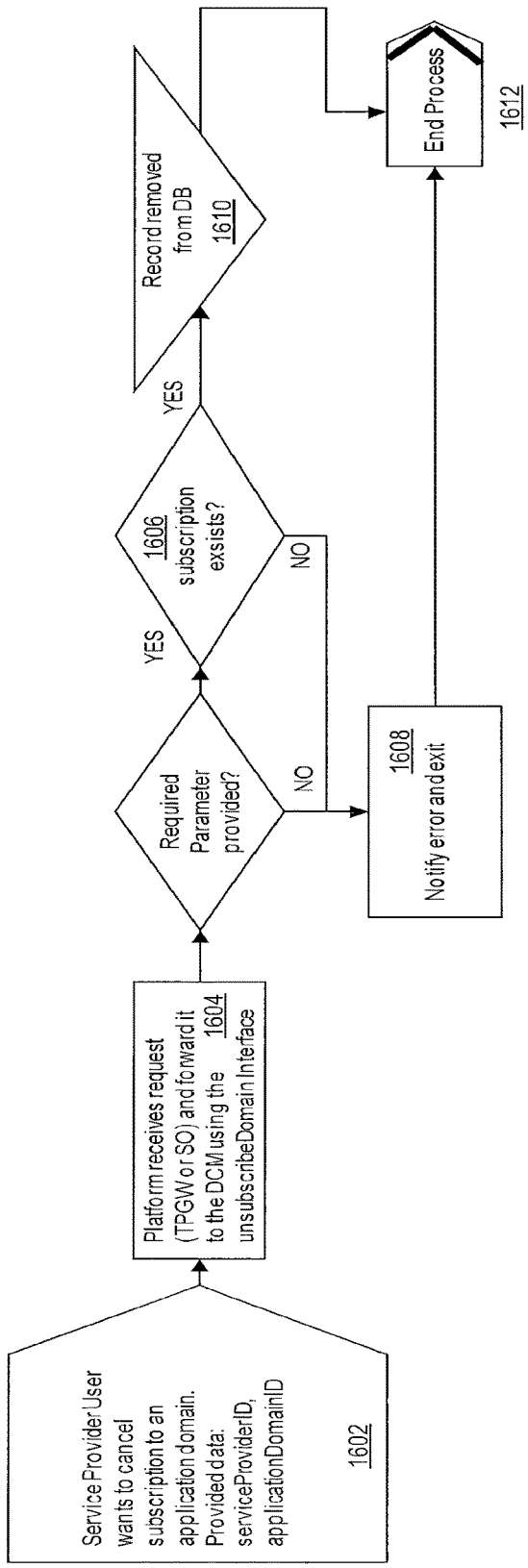
FIG. 16 shows a logic flow diagram for the cancel subscription process of the service provider subscription functionality.

FIG. 16 shows a flowchart 1600 for the cancel subscription process of the service provider subscription functionality. A user 112 or a third party service provider 108 may request to cancel subscription to an application domain (1602). Along with the request, the user 112 or the third party service provider 108 may provide the following data: serviceProviderID, applicationDomainID. The Platform 102 receives the request and forwards the request to the Process Manager 238 (1604). Platform 102 may receive the request through the third party gateway 218, vertical solution gateway 216, web portals 260/262, or the web console 266. The request may be forwarded using the unsubscribeDomain Interface. If all the required parameters are provided, the Process Manager 238 determines whether or not the requested subscription already exists (1606). If the required parameters are not provided, the Process Manager 238 notifies an error (1608) and the process ends (1612). At step 1606, if subscription does not exist, the Process Manager 238 notifies an error (1608) and the process ends (1612). If the requested subscription already exists, the record is removed from the device repository 224 (1610), and the process ends (1612).

Figure 17:
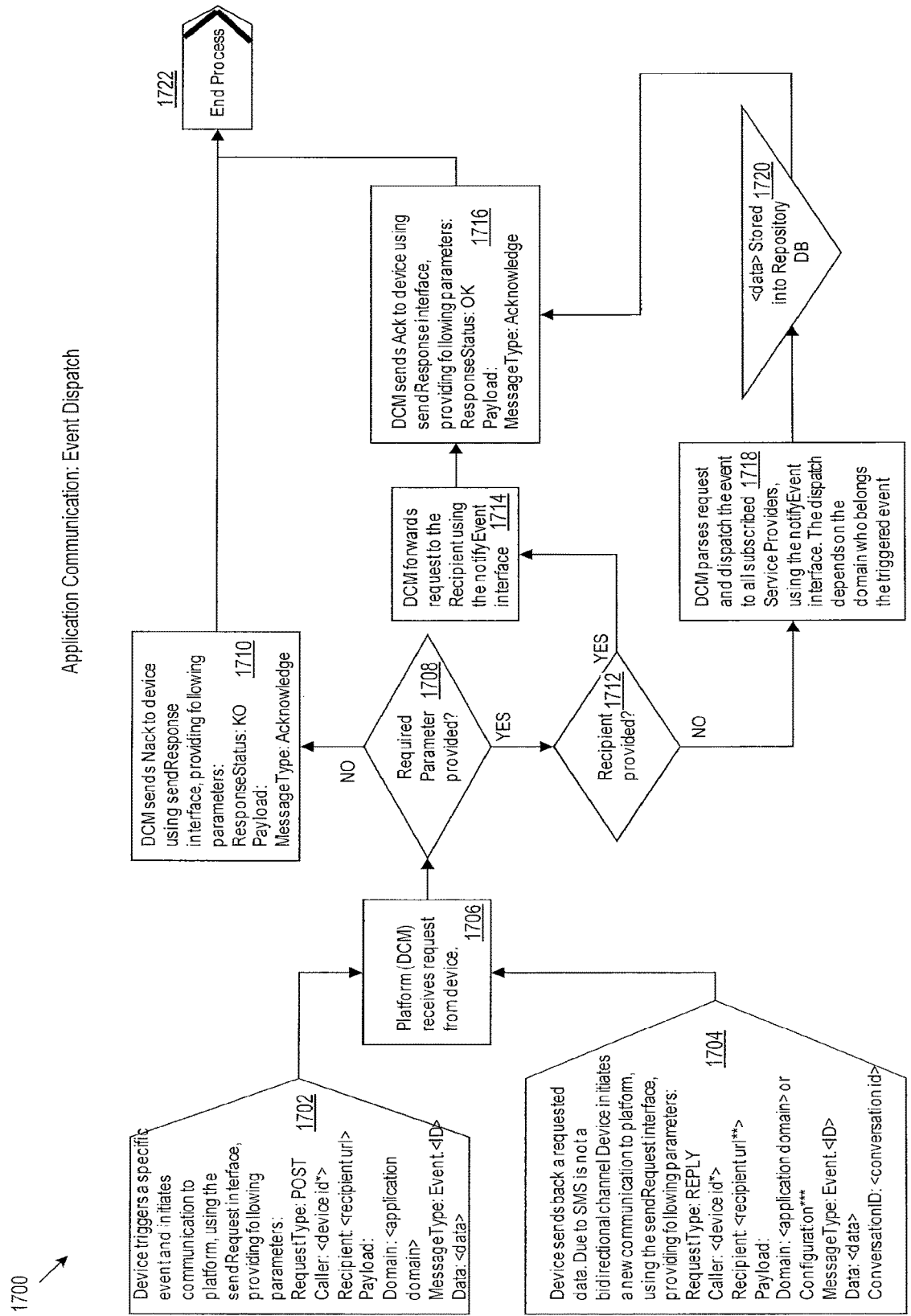
FIG. 17 shows a logic flow diagram for the event dispatch process of the application communication functionality.

FIG. 17 shows a flowchart 1700 for the event dispatch process of the application communication functionality. A device 106 may trigger a specific event and initiate communication to the Platform 102 (1702). The request may be made using the sendRequest interface with the following parameters:
 RequestType: POST
 Caller: <deviceID>
 Recipient: <recipient url>
 Payload:
 Domain: <application domain>
 MessageType: Event <ID>
 Data: <data>

A device 106 may also send back a requested data (1704). Since SMS is not a bidirectional channel, the Device 106 may initiate a new communication to the Platform 102, using the sendRequest interface with the following parameters:
 RequestType: REPLY
 Caller: <deviceID>
 Recipient: <recipient url>
 Payload:
 Domain: <application domain>
 MessageType: Event <ID>
 Data: <data>
 ConversationID: <conversation id>

The Platform 102 receives the messages from the device from steps 1702 or 1704 (1706), and determines whether or not required parameters are provided (1708). If the required parameters are not provided, the Platform 102 sends a NACK to the device 106 using the sendResponse interface with the following parameters (1710):
 ResponseStatus: KO
 Payload:
 MessageType: Acknowledge Subsequently the process ends (1722). If all the required parameters are provided, the Process Manager 238 determines whether or not a recipient is provided with the request (1712). If a recipient is provided, the Platform 102 forwards the request to the recipient using the notifyEvent interface (1714). Next, the Platform 102 sends an ACK signal to the device 106 using the sendResponse interface, along with the following parameters (1716):
 ResponseStatus: OK
 Payload:
 MessageType: Acknowledge Next, the process ends (1722). At step 1712, if no recipient is provided, the Platform 102 parses the request and dispatches the event to all subscribed service providers (including user 112 and/or third party service provider 108), using the notifyEvent interface (1718). The dispatch depends on the domain to which the triggered event belongs. Next, <data> is stored in the data repository 222, or other repositories 220 (1720). Afterwards, the Platform 102 sends an ACK signal to the device 106 using the sendResponse interface, along with the following parameters (1716):
 ResponseStatus: OK
 Payload:
 MessageType: Acknowledge Next, the process ends (1722).

Figure 18:
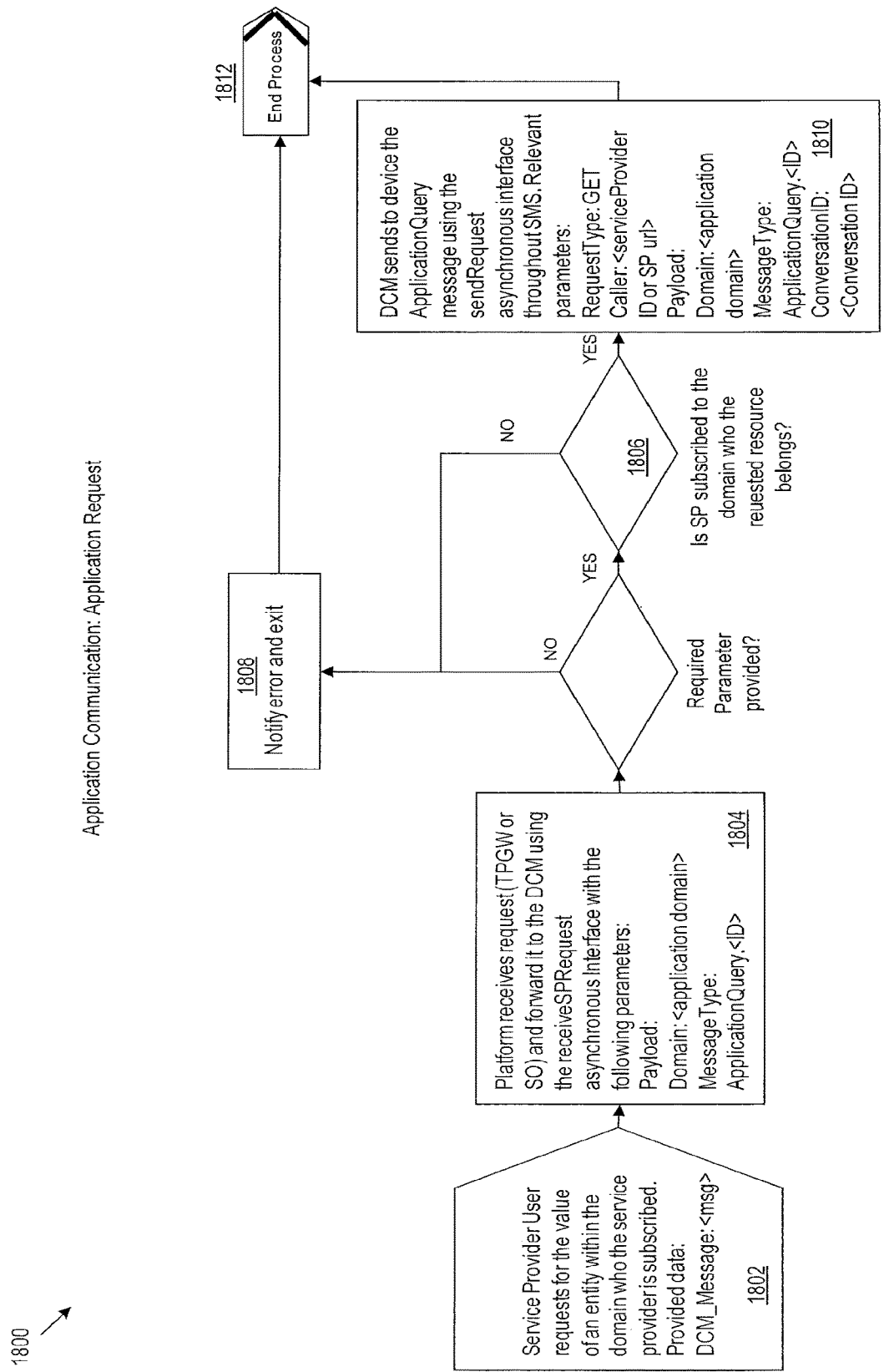
FIG. 18 shows a logic flow diagram for the application request process of the application communication functionality.

FIG. 18 shows a flowchart 1800 for the application request process of the application communication functionality. A user 112 or a third party service provider 108 may request for the value of an entity within the domain to which the user or the third party service provider subscribed (1802). The request may be sent with the data DCM_Message: <msg>. Next, the Platform 102 receives the request and forwards the request to the Process Manager 238 (1804). Platform 102 may receive the request through the third party gateway 218, vertical solution gateway 216, web portals 260/262, or the web console 266. The request may be forwarded using the receiveSPRequest asynchronous interface with the following parameters:
Payload:
Domain: <application domain>
MessageType:
ApplicationQuery: <ID>

If all the required parameters are provided, the Process Manager 238 determines whether or not the user 112 or the third party service provider 108 is subscribed to the domain to which the requested resource belongs (1806). If the required parameters are not provided, the Process Manager 238 notifies an error (1808) and the process ends (1812). At step 1806, if the user 112 or the third party service provider 108 is not subscribed to the domain to which the requested resource belongs, then the Process Manager 238 notifies an error (1808) and the process ends (1812). If the user 112 or the third party service provider 108 is subscribed to the domain, then the Process Manager 238 sends to the devices 106 the ApplicationQuery message using the sendRequest asynchronous interface via SMS (1810). The message is sent with the following parameters:
RequestType: GET
Caller: <serviceProviderID or Service Provider url>
Payload:
Domain: <application domain>
MessageType:
ApplicationQuery: <ID>
ConversationID: <ConversationID>
Next, the process ends (1812).

Figure 19:
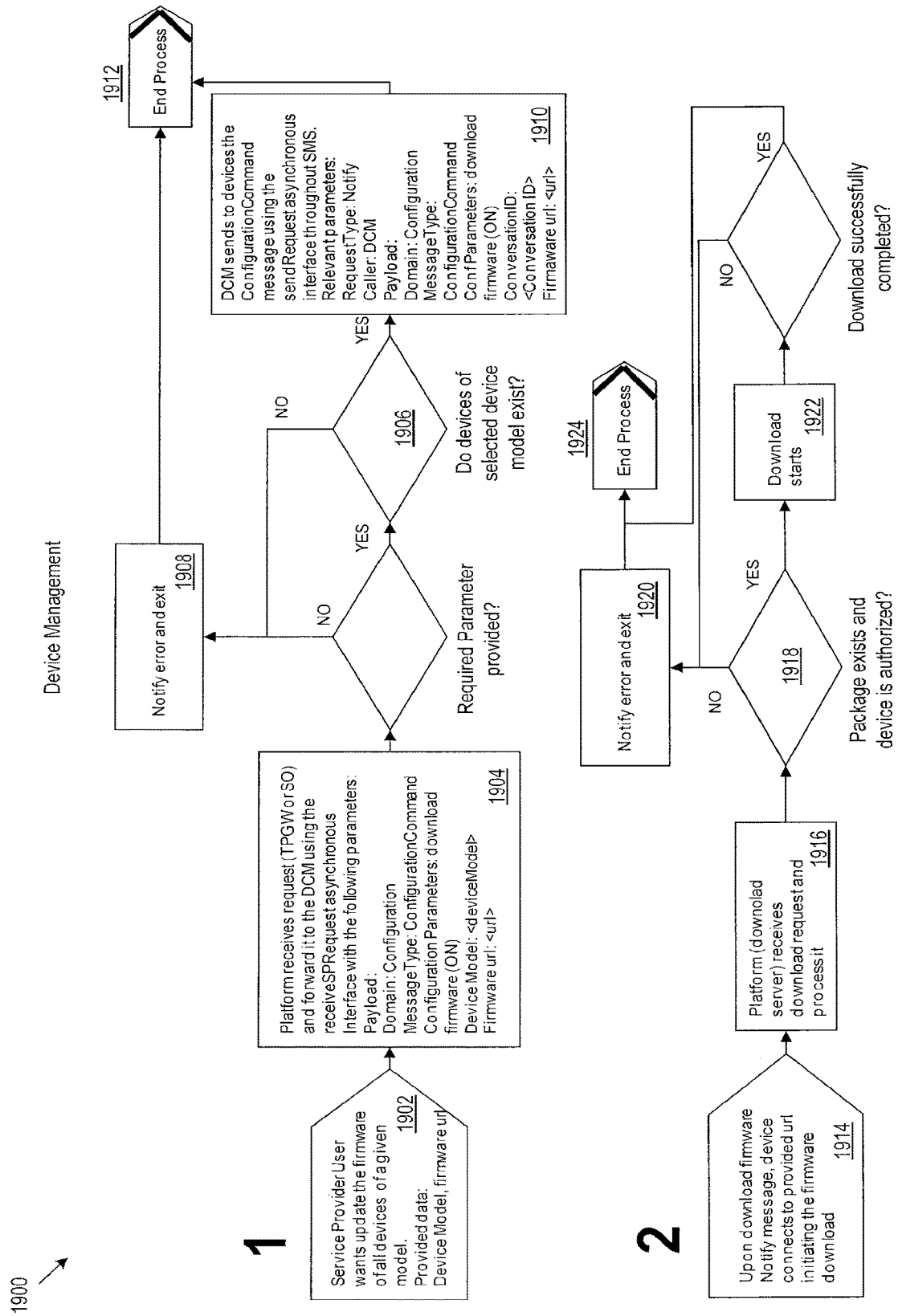
FIG. 19 shows a logic flow diagram of the device management process.

FIG. 19 shows the flowchart 1900 of the device management process. A user 112 or a third party service provider 108 may request to update the firmware of all devices 106 of a given model (1902). The request may be accompanied by the following data: Device Model, firmware url. Next, the Platform 102 receives the request and forwards the request to the Process Manager 238 (1904). Platform 102 may receive the request through the third party gateway 218, vertical solution gateway 216, web portals 260/262, or the web console 266. The request may be forwarded using the receiveSPRequest asynchronous interface with the following parameters:
Payload:
Domain: Configuration
MessageType: ConfigurationCommand
Configuration Parameters: download firmware (ON)
Device Model: <deviceModel>
Firmware url: <url>

If all the required parameters are provided, the Process Manager 238 determines whether or not the devices of the provided device model exists (1906). The determination may be done by searching the device repository 224. If the required parameters are not provided, the Process Manager 238 notifies an error (1908) and the process ends (1912). At step 1906, if devices of the provided device model do not exist, then the Process Manager 238 notifies an error (1908) and the process ends (1912). If such device exists, then the Process Manager 238 sends to the devices 106 the ConfigurationCommand message using the sendRequest asynchronous interface via SMS (1910). The message is sent with the following parameters:

RequestType: Notify
Caller: DCM
Payload:
Domain: Configuration
MessageType: ConfigurationCommand
ConfParameters:download firmware (ON)
ConversationID: <ConversationID>
Firmware url: <url>
Next, the process ends (1912).

Upon receiving a download firmware notify message from the Platform 102, a device 106 may connect to a provided url to initiate downloading of firmware (1914). The platform 102 may receive the download request from the device 106 and processes the request (1916). Next the Platform 102 determines whether or not the firmware download package exists and whether or not the device requesting the download is authorized (1918). If no package is available for download or if the device is not authorized, the Platform 102 notifies an error (1920) and the process ends (1924). If a package is available and the device is authorized, then the download begins (1922). If the download is successful, then the process ends (1924). If the download is not successful, then the Platform 102 notifies an error (1920) and the process ends (1924).

Figure 20:
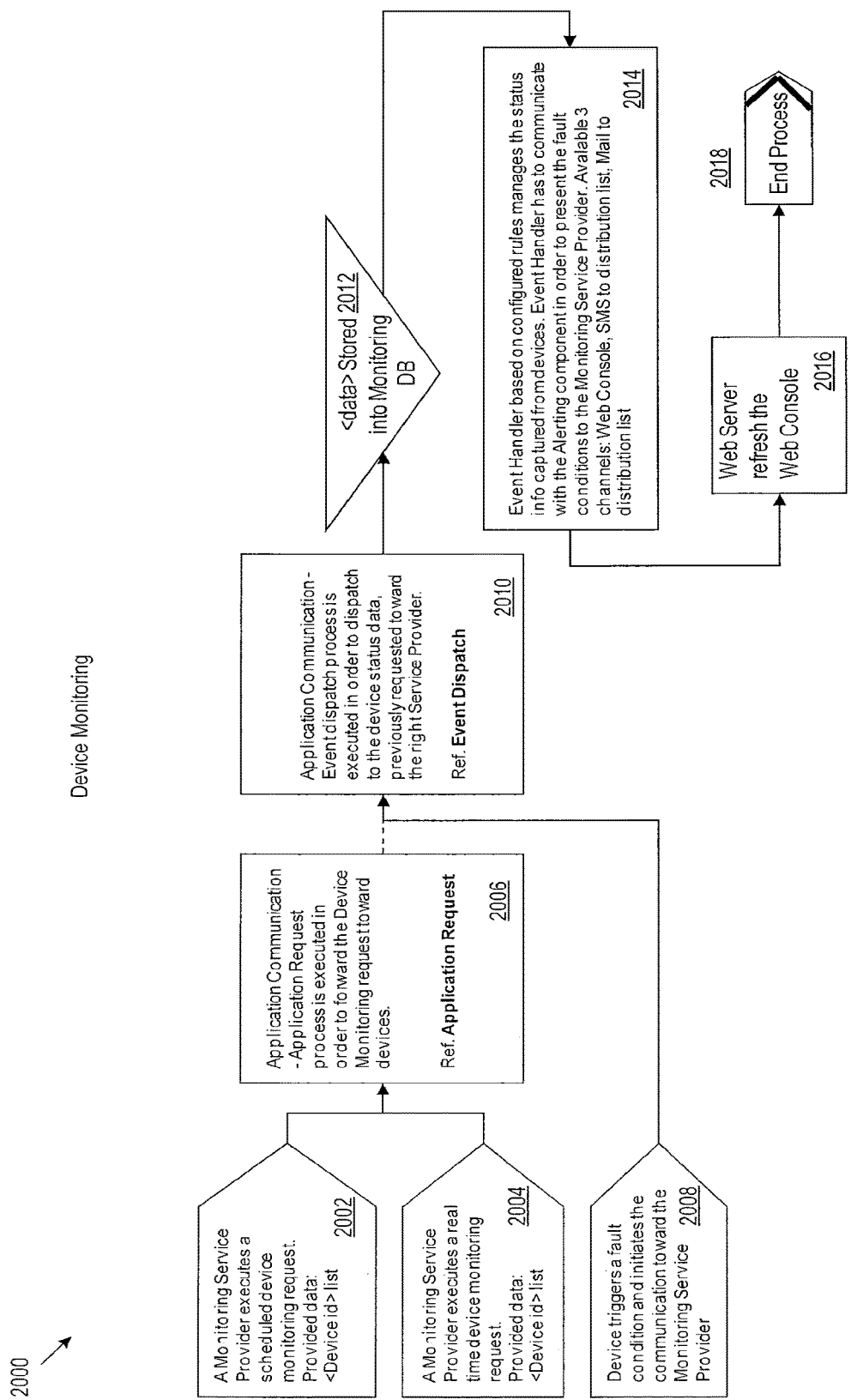
FIG. 20 shows a logic flow diagram of a device monitoring process.

FIG. 20 shows a flowchart 2000 of a device monitoring process. A monitoring service provider—a vertical solution 202 such as the device monitoring component 264 or other vertical solution provided by a third party service provider 108 which provides monitoring service—may execute a scheduled device monitoring request (2002). The request may be accompanied by the following data: <device id> list. The monitoring service provider may also execute a real time device monitoring request (2004). The request may be accompanied by the following data: <device id> list. After the request of either steps 2002 or 2004 are executed, the Application Communication-Application Request process is executed in order to forward the device monitoring requests to the devices 106 (2006).

A device 106 may trigger a fault condition and initiate communication to a monitoring service provider (2008). Next, Application Communication—Event Dispatch process is executed in order to dispatch to the device 106 status data which were previously requested to a service provider (2010). Next, data is stored into a monitoring repository which may be one of the repositories 220 (2012). Data stored in the monitoring repository may be data received from the devices 106 in response to the device monitoring request or data sent to the device in response to a fault condition. Then, the event handler component 232, based on predefined rules, manages the status information captured from the devices 106 (2014). The event handler 232 communicates with the alerting component 234 in order to present the fault conditions to the monitoring service provider. Three exemplary channels of communicating the fault conditions are: displaying on the web console 266, sending SMS messages to a distribution list, and mailing to a distribution list. In the case of using the web console 266, the web console is refreshed to display the fault condition (2016), and the process ends (2018).

The various interfaces described above are exposed and used by the Platform 102 to communicate with the devices 106 or vertical solutions 202. The interfaces may be asynchronous or synchronous interfaces such as SMS, HTTP, SOAP, or SOAP with call back.

The communication manager 240 is described in further detail below.

Devices 106 interacting with the platform 102 may send their messages/samplings to communication manager 240. The communication manager 240 may expose on /M2MWEB/receiver the com.company.amos.m2m.dcm.web.StandardDeviceServlet servlet. Once a message is received by the servlet, then an appropriate adapter is selected to extract data from the message and produce a device message 406. Adapters may be stored in a M2M_DCM repository, which may be one of repositories 220. The adaptors may be stored in the M2M_DCM repository according to the following hierarchy of categorization:

Device→Model→Model_adaptors→Adapters (by communication channel).

Once the device message 406 is produced, then the message is transformed by a transformer 244 into a standard, high-abstraction level service message 408 which may be understood by rest of the components of the Platform 102. The transformer may be stored in the M2M_DCM repository, and may be stored in the M2M_DCM.DeviceToSvcMsgTransformer table. A suitable transformer is selected by matching the nameSpaceURI parameter contained in the message and the M2M_DCM.DeviceToSvcMsgTransformer.expression field. The message 406 is transformed into a service message 408 by invoking the transform( ) method of the selected transformer. Once the message is transformed, the transformed service message 408 may be sent to the Process Manager 238 for delivery to appropriate components of the Platform 102. The application manager 246 described with reference to FIG. 4 may be integrated with the Process Manager 238.

An exemplary process for providing support for a new device model named MyNewModel by manufacturer DUMMY is provided below.

First, the M2M_DCM repository is configured. The record (DUMMY) is inserted into M2M_DCM.Manufacturer table. Next, the record (N, MyNewModel, DUMMY) is inserted into M2M_DCM.Model table, where N is the key of the M2M_DCM.Model table. N is a progressive number. In this example, the value 4 will be used. Then, the record (4,1) is inserted into the M2M_DCM.Model_adapter table. 1 is the key of one adapter specified in the M2M_DCM.Adapters table.

A new transformer is also needed. The purpose of a transformer is to transform the message received from a device 106 into a standard message to be sent to the Process Manager 238 or other components of the Platform 102. Every transformer extends directly or indirectly from the com.company.amos.m2m.dcm.msgprocessing.Message Transformer class.

In case of an XSL transformer, an example of its implementation is com.company.amos.m2m.dcm.msgprocessing.impl. AbstractXslTransformer. AbstractXslTransformer is an abstract class and it is extended by implementing the getXslt( ) method that returns the path of XSLT transformer file. The transformer produces, in the output, an XML which is validated against the XSD file dcmMessage.xsd shown below in Table 4:

TABLE 4

```
<?xml version="1.0" encoding="UTF-8"?>
<xs:schema                    xmlns:xs="http://www.w3.org/2001/XMLSchema"
elementFormDefault="qualified">
<xs:element name="DCMDOCUMENT">
<xs:complexType>
<xs:sequence>
<xs:element maxOccurs="unbounded" ref="EVENT"/>
</xs:sequence>
<xs:attribute name="version" use="optional" type="xs:string"/>
</xs:complexType>
</xs:element>
<xs:element name="EVENT">
<xs:complexType>
<xs:sequence>
<xs:element ref="TIMESTAMP" minOccurs="1" maxOccurs="1"/>
<xs:element ref="DEVICE" minOccurs="1" maxOccurs="1"/>
<xs:element ref="TRANSACTION_ID" minOccurs="1" maxOccurs="1"/>
<xs:element ref="TRIGGER" minOccurs="1" maxOccurs="1"/>
<xs:element maxOccurs="unbounded" ref="RAW_DATA"/>
</xs:sequence>
</xs:complexType>
</xs:element>
<xs:element name="TIMESTAMP" type="xs:dateTime"/>
<xs:element name="DEVICE" type="ID"/>
<xs:element name="TRANSACTION_ID" type="xs:string"/>
<xs:element name="TRIGGER">
<xs:complexType>
<xs:complexContent>
<xs:extension base="ID">
<xs:sequence>
<xs:element minOccurs="0" ref="DETAIL"/>
</xs:sequence>
</xs:extension>
</xs:complexContent>
</xs:complexType>
</xs:element>
<xs:element name="DETAIL" type="xs:string"/>
<xs:element name="RAW_DATA">
<xs:complexType>
<xs:sequence>
<xs:element maxOccurs="unbounded" ref="PARAM"/>
```

TABLE 4-continued

```
</xs:sequence>
<xs:attribute name="impl" use="optional" type="xs:string"/>
<xs:attribute name="type" use="required" type="xs:string"/>
</xs:complexType>
</xs:element>
<xs:element name="PARAM">
<xs:complexType>
<xs:attribute name="name" use="required" type="xs:string"/>
<xs:attribute name="value" use="required" type="xs:string"/>
<xs:attribute name="javatype" use="required" type="xs:string"/>
</xs:complexType>
</xs:element>
<xs:complexType name="ID">
<xs:sequence>
<xs:element ref="ID" minOccurs="1" maxOccurs="1"/>
</xs:sequence>
</xs:complexType>
<xs:element name="ID" type="xs:string"/>
</xs:schema>
```

Next, a new record is inserted into the M2M_DCM.DeviceToSvcMsgTransformer table. For example, if the new name of the transformer class is com.company.amos.m2m.dcm.msgprocessing.impl. MyNewXslTransformer, and the root node of XML to be transformed is intercepted by XPath Query //:dummy-service[@domain='sampling'], then the record (//:dummy-service[@domain='sampling'], com.company.amos.m2m.dcm.msgprocessing.impl. MyNewXslTransformer) is inserted into the M2m_DCM.DeviceToSvcMsgTransformer table.

To completely support a new device type in the Platform 102, some configuration has to be executed also on the Process Manager 238 component:

insert into the M2M_AIB.device_type table the new device type, insert into the M2M_AIB.repository table appropriate configuration, and insert into the M2M_AIB.repository_group association between repository and groups.

The M2M_AIB database may be one of the repositories 220 which may store configuration information for the Platform 102.

The Platform 102 may store data sent from devices in dedicated tables of repositories such as data repository 222. The M2M_AIB database may be one such repository. Tables for storing data has a primary key field named id_base defined as:

```
PRIMARY KEY ('id_base'), KEY 'fk_1 _base1' ('id_base'),
CONSTRAINT ' fk_1 _base1' FOREIGN KEY ('id_base')
REFERENCES
'base' ('id_base')
```

Figure 21:
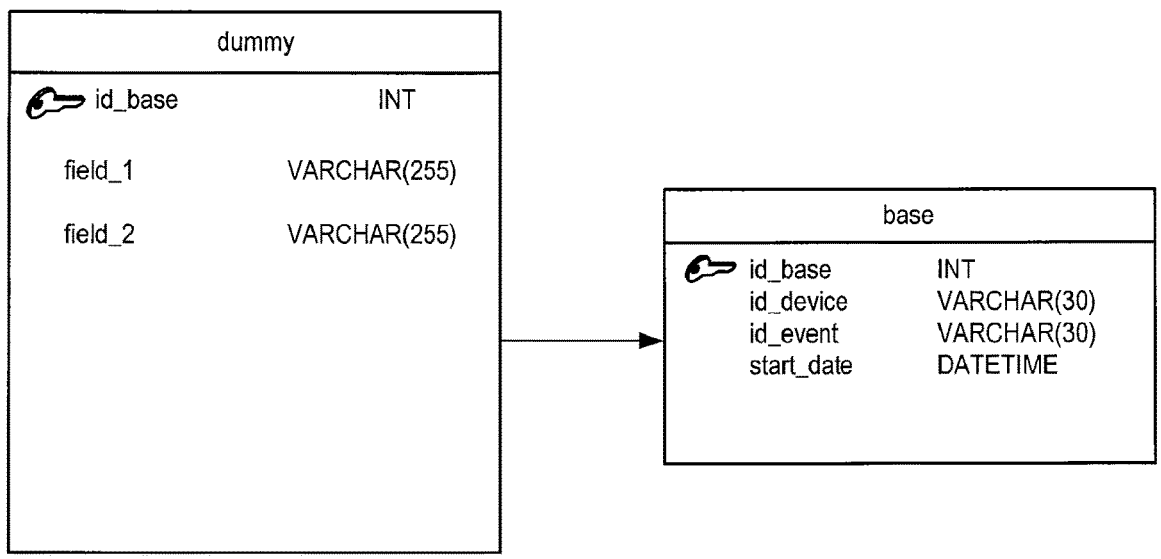
FIG. 21 shows an example of a data collection table.

FIG. 21 shows an example 2100 of a data collection table. An example of a new device type DUMMY data collection table may be defined as:

```
CREATE TABLE 'dummy' (
'id_base' int(11) NOT NULL,
'field_1' varchar(255) default NULL,
'field_2' varchar(255) default NULL,
PRIMARY KEY ('id_base'),
KEY 'fk_home_metering_base1' ('id_base'),
CONSTRAINT 'fk_home_metering_base1' FOREIGN KEY ('id_base')
REFERENCES 'base'
```

-continued

```
('id_base') ON DELETE NO ACTION ONUPDATE NO ACTION
) ENGINE=InnoDB DEFAULT CHARSET=latin1;
```

The Platform 102 may use JPA (Java Persistence API) to manage data access. M2M-DAL module manages access to M2M_AIB DB.

Once the data collection table has been created, a POJO class with JPA annotations is created in the package com.company.amos.m2m.dal.entity.

The Platform 102 exposes data access as web services. To perform that task, particularly to identify POJO attributes to return, a custom annotation is used: com.company.amos.m2m.dal.entity.Exclude. @Exclude annotation is set on methods of the POJO that doesn't return the value of one of the attributes we have to expose.

For the table dummy the annotated POJO may be implemented as shown in Table 5:

TABLE 5

```
@Entity
@Table(name = "dummy")
public class Dummy implements java.io.Serializable {
private static final long serialVersionUID = -8228360678364527411L;
private int idBase;
private Base base;
private String field1;
private String field2;
public Dummy( ){
}
public Dummy(Base base) {
this.base = base;
}
public Dummy(Base base, String field1, String field2) {
this.base = base;
this.field1 = field1;
this.field2 = field2;
}
@GenericGenerator(name = "generator", strategy = "foreign", parameters
=
@Parameter(name = "property", value = "base"))
@Id
@GeneratedValue(generator = "generator")
@Column(name = "id_base", unique = true, nullable = false)
@Exclude
public int getIdBase( ) {
return this.idBase;
}
@Exclude
public void setIdBase(int idBase) {
this.idBase = idBase;
}
```

TABLE 5-continued

```
@OneToOne(fetch = FetchType.LAZY)
@PrimaryKeyJoinColumn
@Exclude
public Base getBase( ) {
return this.base;
}
@Exclude
public void setBase(Base base) {
this.base = base;
}
@Column(name = "field_1", length = 255)
public String getField1( ) {
return field1;
}
@Exclude
public void setField1(String field1) {
this.field1 = field1;
}
@Column(name = "field_2", length = 255)
public String getField2( ) {
return field2;
}
@Exclude
public void setField2(String field2) {
this.field2 = field2;
}
}
```

The details of the event handler 232 are further described below.

A third party service provider 108 or a user 112 may access the event handler 232 by calling the webservices interface exposed by the Platform 102 through the third party gateway 218. The event handler manages and processes events by using rules, actions and functions.

A Rule is a logical expression characterized by (customerId, serviceId, deviceId) and a set of associated Actions. The third party service provider 108 or the user 112 can associate a Rule to one or more device 106. A Rule can have one or more Actions associated with it.

The logical expression must be provisioned by a third party service provider 108 or a user 112 and can be composed of zero or more Functions.

A Function is a complex logical expression provided by event handler 232. For each service hosted by the Platform 102 exists a set of Field with which a third party service provider 108 or a user 112 may compose a logical expression. A Field is an entity characterizing the associated Service. If logical expression evaluation is positive than the set of Actions associated to specified Rule is executed.

An Action is a task provided by the event handler 232 and can be associated to zero or N input Parameter.

Logical Expression

Logical expression can be composed of logical operators, Fields, Functions. Fields can be retrieved by findFields service. Functions can be retrieved by findFunctions service.

In a logical expression a field is expressed by syntax ${fieldName} where fieldName is the name of field. In a logical expression a function can be expressed by syntax #functionName(input1, input2) where functionName is the name of the function and input1, input2 are input parameters of the function.

Table 6 shows some examples of logical expressions:

TABLE 6

| Description | Rule |
|---|---|
| if checkStatus is TRUE then execute actions | ${checkstatus} == true |
| if a sampling is received then execute actions | ${baseid} |

TABLE 6-continued

| Description | Rule |
|---|---|
| if the field temperature of a sampling is greater than 30 degrees then execute actions | ${temperature} > 30 |

Action

An Action is a task provided by the event handler 232 and can be associated with zero or N input Parameters.

A list of available Actions is provided by the findActionAndParamiters service.

Rule

A Rule is a logical expression characterized by (customerId, serviceId, deviceId) and a set of associated Actions. A third party service provider 108 or a user 112 can associate a Rule with one or more Devices. A Rule can have one or more Actions associated.

To create a new rule, a third party service provider 108 or a user 112 can invoke the addRule service.

Once a rule is created, the third party service provider 108 or the user 112 may:
    a. modify associated logical expression by calling modifyRuleExpression service,
    b. deactivate the rule by calling deactiveRule service,
    c. add a new Action by calling addActionService, or
    d. activate the rule by calling activeRule service.

Table 7 shows examples of XML messages that are exchanged between the Platform 102 and the devices 106 or external gateways 104.

TABLE 7

```
<?xml version="1.0" encoding="UTF-8"?>
-    <home-metering          domain="sampling"
  xmlns="http://www.domotica.com">
- <event id="SAMPLING" detail="">
    <timestamp>2010-01-13T12:50:00.000</timestamp>
    <senderMacAddress
      protocol="IEEE">008098E91FA2</senderMacAddress>
    <consumption unit="kWh">0.483</consumption>
    <voltage unit="V">111.9</voltage>
    <current unit="A">0.055</current>
  </event>
- <event id="SAMPLING" detail="">
    <timestamp>2010-01-13T12:51:00.000</timestamp>
    <senderMacAddress
      protocol="IEEE">008098E91FA2</senderMacAddress>
    <consumption unit="kWh">0.483</consumption>
    <voltage unit="V">222.9</voltage>
    <current unit="A">0.078</current>
  </event>
- <event id="SAMPLING" detail="">
    <timestamp>2010-01-13T12:52:00.000</timestamp>
    <senderMacAddress
      protocol="IEEE">008098E91FA2</senderMacAddress>
    <consumption unit="kWh">0.583</consumption>
    <voltage unit="V">333.9</voltage>
    <current unit="A">0.078</current>
  </event>
  </home-metering>
  <?xml version="1.0" encoding="UTF-8" ?>
-    <home-metering          domain="sampling"
  xmlns="http://www.domotica.com">
- <event id="SAMPLING" detail="">
    <timestamp>2010-01-11T12:50:00.000</timestamp>
    <senderMacAddress protocol="IEEE">333</senderMacAddress>
    <presence>1</presence>
  </event>
  </home-metering>
  <?xml version="1.0" encoding="UTF-8" standalone="no" ?>
-    <home-metering    xmlns="http://www.domotica.com"
  domain="sampling">
- <event detail="" id="SAMPLING">
    <timestamp>2009-11-18T14:46:37.093</timestamp>
```

TABLE 7-continued

```
<senderMacAddress protocol="IEEE">333L</senderMacAddress>
<lightLevel unit="LUM">16.0</lightLevel>
</event>
- <event detail="" id="SAMPLING">
  <timestamp>2009-11-18T14:46:39.062</timestamp>
  <senderMacAddress protocol="IEEE">333T</senderMacAddress>
  <temperature unit="C">31.5</temperature>
</event>
- <event detail="" id="SAMPLING">
  <timestamp>2009-11-18T14:46:39.171</timestamp>
  <senderMacAddress protocol="IEEE">333H</senderMacAddress>
  <humidity unit="%">39.3</humidity>
</event>
</home-metering>
```

Device Map

The Platform 102 may create and maintain a device map for keeping track of all the devices 106 in communication with the Platform for efficient management of the devices. The device map may identify the devices in communication with the Platform 102. For each identified device 106, the device map may indicate the channels the device uses to communicate with the platform 102, and whether the device acts only as a sensor which is only able to transmit information to the Platform, whether the device may only receive commands from the Platform, or whether the device may receive commands and act as a sensor. The device map may also contain other information which may be used for managing the devices 106. The device map may be stored in one of the repositories 220, such as the device repository 224.

The Platform may receive the information necessary to populate the device map directly from the devices 106. The Platform 102 also may receive the necessary information from the external gateways 104, which collects the information from the devices 106 connected to itself, and submits the collected information to the Platform. In one embodiment, rather than just relaying the information, the external gateways 104 may create a device map of all the devices 106 connected to itself and forward the map to the Platform 102, which in turn aggregates the maps received from other external gateways to create a complete device map of all the devices 106 connected to the Platform.

Web Services

Third party gateway component 218 provides a web services interface that specifies the services exposed to 3rd parties. In one implementation, the link between the Web services and external systems of the third party gateway component 218 is simple object access protocol (SOAP) over HTTPS/1.1 or SOAP over HTTP/1.1. HTTPS or HTTP may be used as the transport protocol for the SOAP messages. Within a single HTTPS/HTTP connection, request and response messages may operate in a synchronous mode such that SOAP requests are made by Web Service client applications which are then processed by Web Service applications and an appropriate SOAP response is returned. The client making the request may wait until a response has been received before sending another request. Multiple parallel HTTPS/HTTP connections may exist for a Web Service enabling multiple requests to be processed concurrently.

In one implementation, external systems connecting to the third party gateway component 218 Web Services are authenticated using SSL client certificates. Application level username/password combination may be used as another layer of customer authentication and this application level authentication may be used in particular for to authenticate internal systems. The external systems connecting to the third party gateway component 218 may be systems operated by the third party service provider 108 or user 112.

The third party gateway component 218 Web services include a data access Web Service that provides methods to manage and monitor devices. In particular, the methods of the data access Web Service allow extraction of information about executed on devices, such as the commands remove, replace, put, configure, and events related to devices such as presence and power On/Off events.

Figure 22:
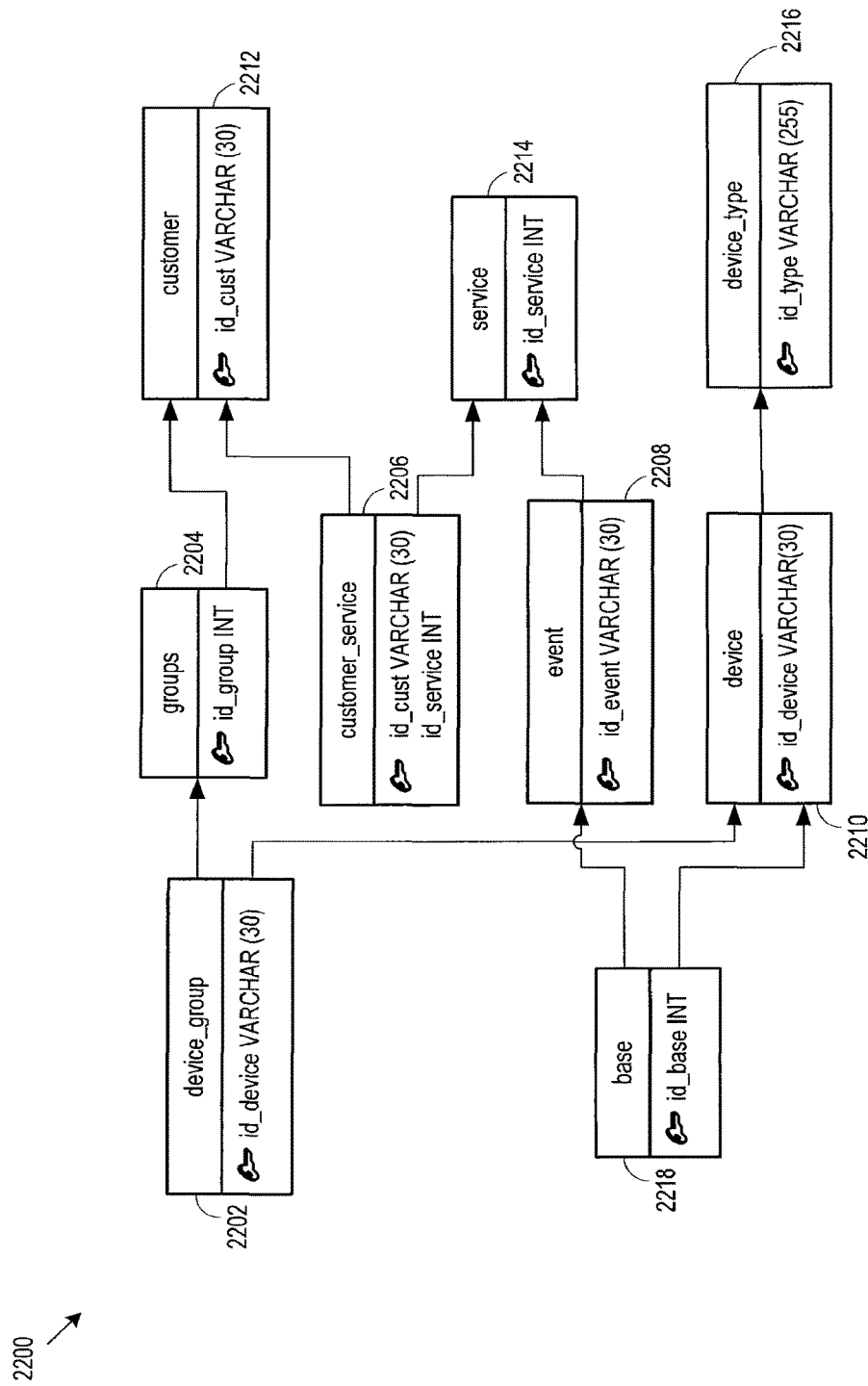
FIG. 22 shows an example of a data access Web service data model employed by the data access Web service.

FIG. 22 shows an example of a data access Web service data model 2200 employed by the data access Web service. The data access Web service data model shows the relationship between various platform entities that allow the data access Web service to define and extract information. The data access Web service data model includes a device group entity 2202, a groups entity 2204, a customer service entity 2206, an event entity 2208, a device entity 2210, a customer entity 2212, a service entity 2214, a device type entity 2216, and a base entity 2218.

The data access Web service exposes methods including: findCommandByDeviceId; findEventByDeviceId; findEventDetail; and findEventDetailsByDeviceId.

Table 8 shows an example findCommandByDeviceId request message for the findCommandByDeviceId method which retrieves a command list for a specified device and parameters.

TABLE 8 findCommandByDeviceId Request Message

| DATA ELEMENT | TYPE | MANDATORY | SIZE | DESCRIPTION |
|---|---|---|---|---|
| commandType | String | N | 30 | used to identify the type of operation on a device, a service or in general on an event |
| deviceId | String | Y | 30 | the identifier of a specific device |
| fromDate | dateTime | N | | used to extract a command list from a specific date |
| status | String | Y | 30 | indicates the actual state of a device (Provisioned, active etc.) |
| toDate | dateTime | N | | used to extract a command list until a specific date |
| transactionId | string | Y | 255 | indicates a transaction identifier inside system 100 |

Table 9 shows an example findCommandByDeviceId response message for the findCommandByDeviceId method.

TABLE 9 findCommandByDeviceId Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description of the error code. |
| statusCode | int | Y | 11 | Describes the status associated to the error code (0 = success; 1 = error) |
| commandId | int | N | 11 | identifier of the specific command found by the request |
| commandType | String | N | 30 | describes the type of command found by the request |
| lastDate | dateTime | N | | Most recent date on which the command was executed |
| status | String | N | 30 | The field contains the result of the specific command |

Table 10 shows an example findEventByDeviceId request message for the findEventByDeviceId method which retrieves an event list for a specified device and parameters.

TABLE 10 findEventByDeviceId Request Message

| DATA ELEMENT | TYPE | MANDATORY | SIZE | DESCRIPTION |
|---|---|---|---|---|
| deviceId | String | Y | 30 | the identifier of a specific device |
| eventType | String | N | 50 | Identifier of an event |
| fromDate | dateTime | N | | used to extract a command list from a specific date |
| toDate | dateTime | N | | used to extract a command list until a specific date |
| transactionId | string | Y | 255 | The field indicates a transaction identifier inside M2M system |

Table 11 shows an example findEventByDeviceId response message for the findEventByDeviceId method.

TABLE 11 findEventByDeviceId Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |

TABLE 11-continued findEventByDeviceId Response Message

| DATA ELEMENT | TYPE | MANDATORY | SIZE | DESCRIPTION |
|---|---|---|---|---|
| statusCode | int | Y | 11 | Describes the status associated to the error code (0 = success; 1 = error) |
| eventId | int | N | 11 | the identifier of the specific event found by the request |
| commandType | String | N | 30 | describes the type of command found by the request |
| eventType | String | N | 30 | describes the type of event found by the request |
| lastDate | dateTime | N | | Most recent date on which the event was verified |

Table 12 shows an example findeventDetail request message for the findeventDetail method which retrieves an event details list for a specified device and parameters.

TABLE 12 findeventDetail Request Message

| DATA ELEMENT | TYPE | MANDATORY | SIZE | DESCRIPTION |
|---|---|---|---|---|
| eventId | String | N | 30 | the identifier of a specific event |
| transactionId | String | Y | | indicates a transaction identifier inside the system 100 |

Table 13 shows an example findeventDetail response message for the findeventDetail method.

TABLE 13 findeventDetail Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |
| name | String | N | 50 | The field is the name of a parameter configuration |
| value | String | N | 50 | The field is the value of a parameter configuration |

Table 14 shows an example findEventDetailByDeviceId request message for the findEventDetailByDeviceId method which retrieves an event details list for a specified device ID.

TABLE 14 findEventDetailByDeviceId Request Message

| DATA ELEMENT | TYPE | MANDATORY | SIZE | DESCRIPTION |
|---|---|---|---|---|
| deviceId | String | Y | 30 | the identifier of a specific device |
| eventType | String | N | 50 | Identifier of an event |
| fromDate | dateTime | N | | used to extract a command list from a specific date |
| toDate | dateTime | N | | The field is used to extract a command list until a specific date |
| transactionId | string | Y | 255 | The field indicates a transaction identifier inside M2M system |

Table 15 shows an example findEventDetailByDeviceId response message for the findEventDetailByDeviceId method.

TABLE 15 findEventDetailByDeviceId Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |
| name | String | N | 50 | the name of a parameter configuration |
| value | String | N | 50 | the value of a parameter configuration |

Figure 23:
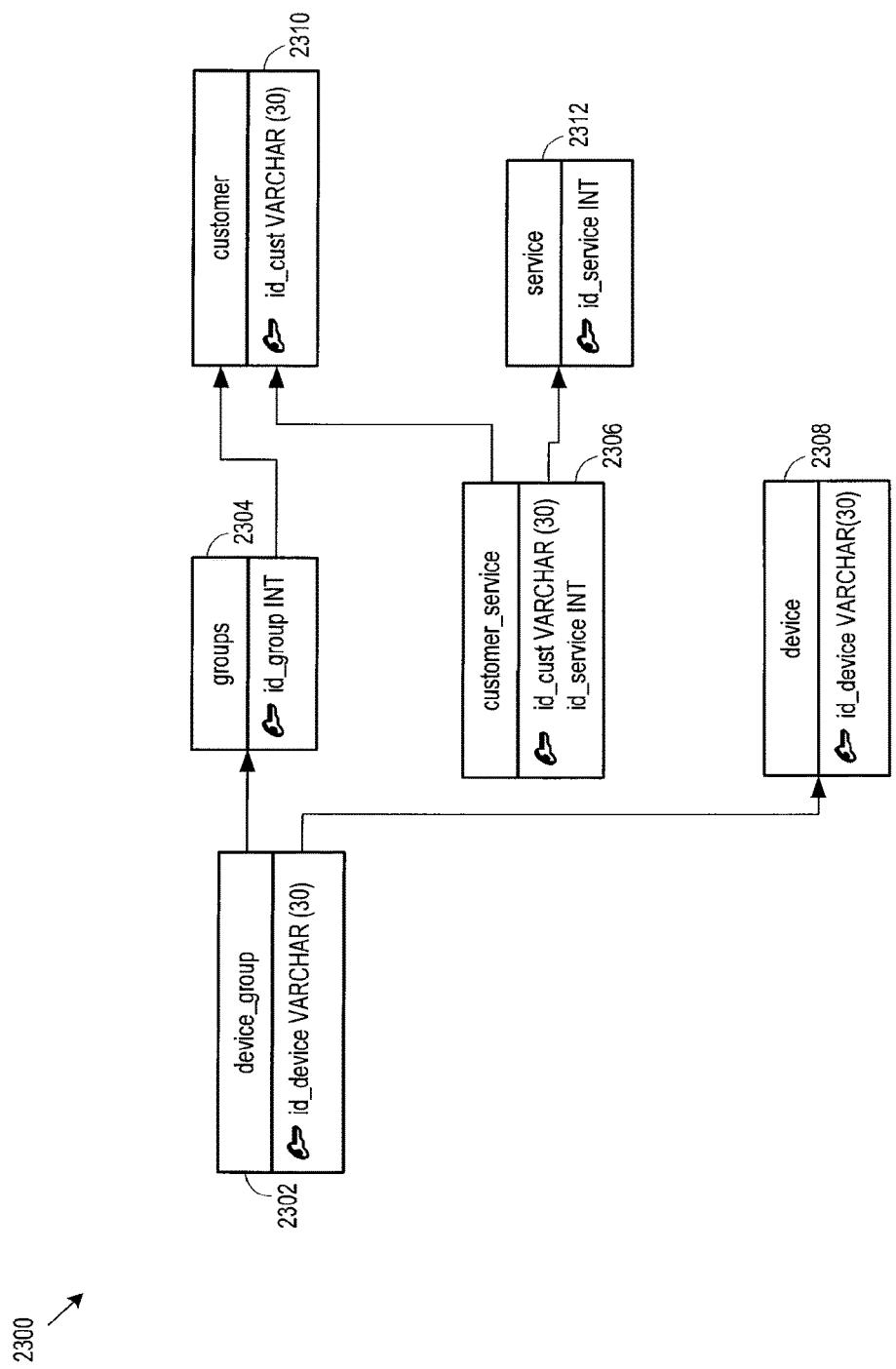
FIG. 23 shows an example of the device manager Web service data model.

Third party gateway component 218 provides a device manager Web service. FIG. 23 shows an example of the device manager Web service data model 2300 which defines relationships between various platform entities that allow the device manager Web service to define and extract information. The device manager Web service data model includes a device group entity 2302, a groups entity 2304, a customer service entity 2306, a device entity 2308, a customer entity 2310, and a service entity 2312.

The device manager Web service provides methods to manage devices and provision new devices (e.g., configuration of the device, and enabling and disabling features), configure devices (e.g., changes to settings and parameters of the device), and remote management of devices (e.g., remove/replace a device), and activating a service. The exposed methods from the device manager Web service include: activate; checkStatus; configure; configureByDetails; deactivate; insertDevice; removeDevice; and replaceDevice.

Table 16 shows an example activate request message for the activate method which activates a service for a specified device.

TABLE 16

Activate Request Message

| DATA ELEMENT | TYPE | MANDATORY | SIZE | DESCRIPTION |
|---|---|---|---|---|
| configurationId | int | N | 11 | identifier of an existing configuration |
| customerId | String | Y | 30 | identifier of specific customer |
| deviceId | String | Y | 30 | identifier of specific device |
| serviceId | int | Y | 11 | identifier of specific service |
| transactionId | string | Y | 255 | indicates a transaction identifier inside the system 100 |

Table 17 shows an example activate response message for the activate method.

TABLE 17

Activate Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 18 shows an example checkStatus request message for the checkStatus method which sends a checkStatus request to a specified device.

TABLE 18 checkStatus Request Message

| DATA ELEMENT | TYPE | MANDATORY | SIZE | DESCRIPTION |
|---|---|---|---|---|
| configurationId | int | N | 11 | identifier of an existing configuration |
| customerId | String | Y | 30 | identifier of specific customer |
| deviceId | String | Y | 30 | identifier of specific device |
| serviceId | int | Y | 11 | identifier of specific service |
| transactionId | string | Y | 255 | indicates a transaction identifier inside the system 100 |

Table 19 shows an example checkStatus response message for the checkStatus method.

TABLE 19

| | | checkStatus Response Message | | |
|---|---|---|---|---|
| DATA ELEMENT | TYPE | MANDATORY | SIZE | DESCRIPTION |
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 20 shows an example configure request message for the configure method which configures a device by selecting a configuration.

TABLE 20

| | | configure Request Message | | |
|---|---|---|---|---|
| DATA ELEMENT | TYPE | MANDATORY | SIZE | DESCRIPTION |
| configurationId | int | N | 11 | identifier of an existing configuration |
| customerId | String | Y | 30 | identifier of specific customer |
| deviceId | String | Y | 30 | identifier of specific device |
| serviceId | int | Y | 11 | identifier of specific service |
| transactionId | string | Y | 255 | indicates a transaction identifier inside M2M system |

Table 21 shows an example configure response message for the checkStatus method.

TABLE 21

| | | configure Response Message | | |
|---|---|---|---|---|
| DATA ELEMENT | TYPE | MANDATORY | SIZE | DESCRIPTION |
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 22 shows an example configureByDetails request message for the configureByDetails method which configures a device by providing configuration parameters.

TABLE 22

| | | configureByDetails Request Message | | |
|---|---|---|---|---|
| DATA ELEMENT | TYPE | MANDATORY | SIZE | DESCRIPTION |
| name | String | Y | 50 | the name of a parameter configuration |
| value | String | Y | 50 | the value of a parameter configuration |
| customerId | String | Y | 30 | the identifier of a specific customer |
| deviceId | String | Y | 30 | the identifier of a specific device |
| serviceId | int | Y | 11 | the identifier of a specific service |
| transactionId | String | M | 255 | indicates a transaction identifier inside the system 100 |

Table 23 shows an example configureByDetails response message for the configureByDetails method.

TABLE 23

| | | configureByDetails Response Message | | |
|---|---|---|---|---|
| DATA ELEMENT | TYPE | MANDATORY | SIZE | DESCRIPTION |
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 24 shows an example deactivate request message for the deactivate method which deactivate a service for a specified device.

TABLE 24

| | | deactivate Request Message | | |
|---|---|---|---|---|
| DATA ELEMENT | TYPE | MANDATORY | SIZE | DESCRIPTION |
| configurationId | int | N | 11 | identifier of an existing configuration |
| customerId | String | Y | 30 | identifier of specific customer |
| deviceId | String | Y | 30 | identifier of specific device |
| serviceId | int | Y | 11 | identifier of specific service |
| transactionId | string | Y | 255 | indicates a transaction identifier inside a system 100 |

Table 25 shows an example deactivate response message for the deactivate method.

TABLE 25 deactivate Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 26 shows an example insertDevice request message for the insertDevice method which executes the provisioning of a new device.

TABLE 26 insertDevice Request Message

| DATA ELEMENT | TYPE | MANDATORY | SIZE | DESCRIPTION |
|---|---|---|---|---|
| customerId | String | Y | 30 | identifier of specific customer |
| deviceId | String | Y | 30 | identifier of specific device |
| deviceType | String | Y | 255 | specifies the device type |
| groupId | int | Y | 11 | identifier of the group owning the customer |
| iccid | String | N | 20 | the sim iccd |
| ipAddress | String | N | 255 | the ip address of the device |
| msisdn | String | N | 15 | the phone number associated to the sim |
| transactionId | String | Y | 255 | indicates a transaction identifier inside the system 100 |

Table 27 shows an example insertDevice response message for the insertDevice method.

TABLE 27 insertDevice Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 28 shows an example removeDevice request message for the removeDevice method which removes an existing device.

TABLE 28 removeDevice Request Message

| DATA ELEMENT | TYPE | MANDATORY | SIZE | DESCRIPTION |
|---|---|---|---|---|
| customerId | String | Y | 30 | The field identifier of specific customer |
| deviceId | String | Y | 30 | The field identifier of specific device |
| transactionId | String | M | 255 | The field indicates a transaction identifier inside M2M system |

Table 29 shows an example removeDevice response message for the removeDevice method.

TABLE 29 removeDevice Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 30 shows an example replaceDevice request message for the replaceDevice method which places a device with the new device. In one implementation, and the new device must be in the provision status.

TABLE 30 replaceDevice Request Message

| DATA ELEMENT | TYPE | MANDATORY | SIZE | DESCRIPTION |
|---|---|---|---|---|
| customerId | String | Y | 30 | identifier of specific customer |
| old Device | String | Y | 30 | identifier of an existing device |
| newDevice | String | Y | 30 | identifier of specific new device |
| transactionId | String | Y | 255 | indicates a transaction identifier inside the system 100 |

Table 31 shows an example replaceDevice request message for the replaceDevice method.

TABLE 31 replaceDevice Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |

TABLE 31-continued replaceDevice Response Message

| DATA ELEMENT | TYPE | MANDATORY | SIZE | DESCRIPTION |
|---|---|---|---|---|
| errorDesc | String | Y | 255 | Contains the description if the error code. |
| statusCode | int | Y | 11 | Describes the status associated to the error code (0 = success; 1 = error) |

Third party gateway component 218 provides an event handler Web service provides methods to manage the events and alarms that devices send to the platform (e.g., external events) any events generated by the platform (e.g., internal events). In particular, the methods of the event handler Web service: Retrieve alarms and notification of alarms; and Manage rule definitions and execution.

Figure 24:
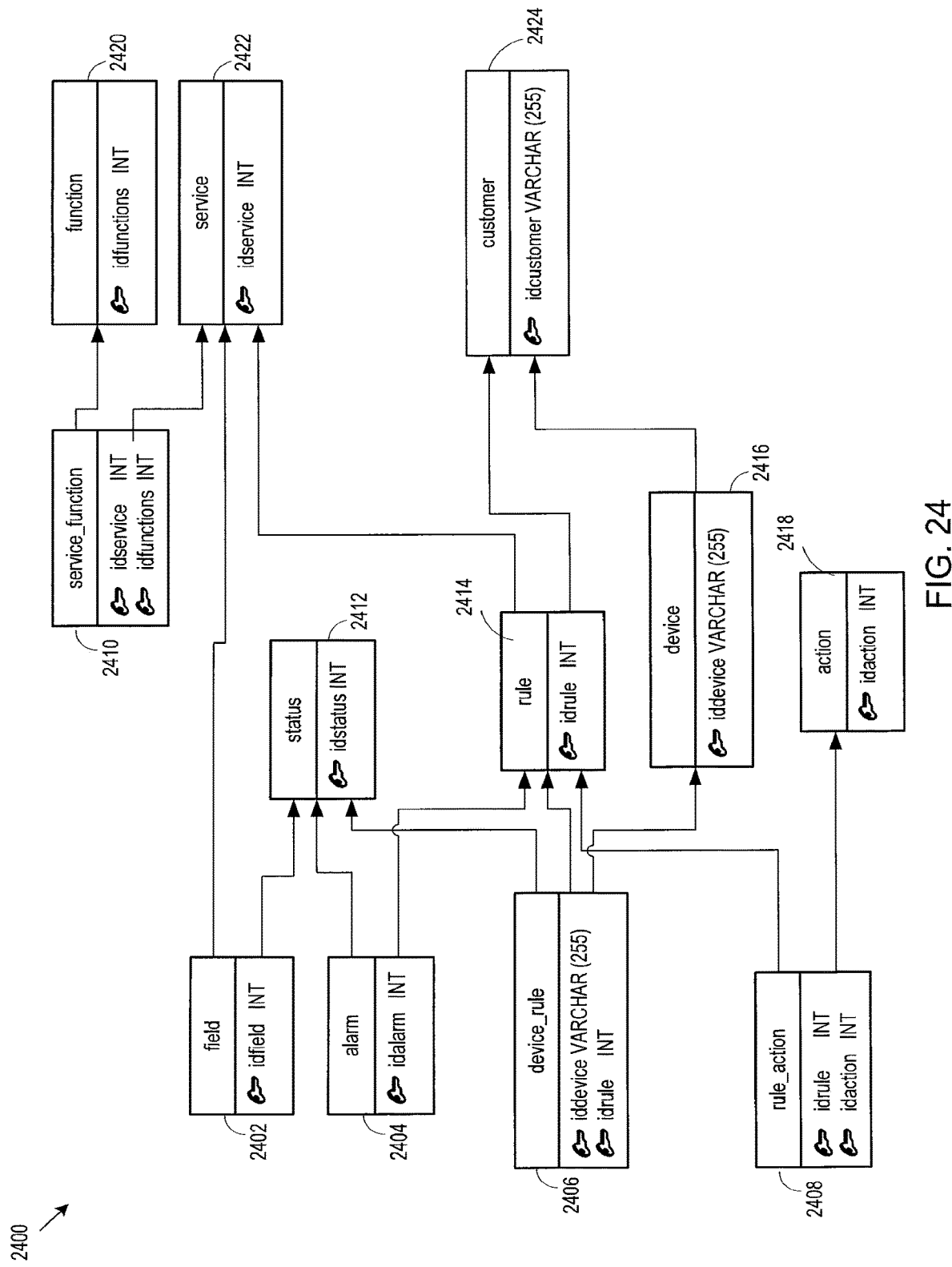
FIG. 24 shows an example of the event handler Web service data model.

FIG. 24 shows an example of the event handler Web service data model 2400 which defines relationships between various platform entities that allow the event handler Web service to define and extract information. The event handler Web service data model 2400 includes a field entity 2402, an alarm entity 2404, a device rule entity 2406, a rule action entity 2408, a service among and entity 2410, a status entity 2412, a rule entity 2414, a device entity 2416, an action entity 2418, a function entity 2420, a service entity 2422, and a customer entity 2424.

In one implementation, the exposed methods from the event handler Web service include: activeRule; addAction; addRule; deactiveRule; fineActionsAndParameters; findAlarms; findFields; findFunction; findRules; modifyRuleExpression; modifyRule; removeAction; and removeRule.

Table 32 shows an example activeRule request message for the activeRule method which activates a rule for specified devices.

TABLE 32 activeRule Request Message

| DATA ELEMENT | TYPE | MANDATORY | SIZE | DESCRIPTION |
|---|---|---|---|---|
| devices | String | Y | 255 | identifies a device |
| ruleName | String | Y | 255 | the name of a rule associated with a specific device |
| transactionId | String | Y | 255 | indicates a transaction identifier inside the system 100 |

Table 33 shows an example activeRule response message for the activeRule method.

TABLE 33 activeRule Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |

TABLE 33-continued activeRule Response Message

| DATA ELEMENT | TYPE | MANDATORY | SIZE | DESCRIPTION |
|---|---|---|---|---|
| errorDesc | String | Y | 255 | Contains the description if the error code. |
| statusCode | int | Y | 11 | Describes the status associated to the error code (0 = success; 1 = error) |

Table 34 shows an example addAction request message for the addAction method which adds an action to a specified rule.

TABLE 34 addAction Request Message

| DATA ELEMENT | TYPE | MANDATORY | SIZE | DESCRIPTION |
|---|---|---|---|---|
| actionName | String | Y | 255 | The field is the name of an action |
| key | String | N | 255 | The field is a parameter key |
| value | String | N | 255 | The field is a parameter value |
| ruleName | String | Y | 255 | The field is an existing rule name |
| transactionId | String | Y | 255 | The field indicates a transaction identifier inside M2M system |

Table 35 shows an example addAction response message for the addAction method.

TABLE 35 addAction Response Message

| DATA ELEMENT | TYPE | MANDATORY | SIZE | DESCRIPTION |
|---|---|---|---|---|
| errorCode | int | Y | 11 | contains the code returned by the request. |
| errorDesc | String | Y | 255 | Contains the description if the error code. |
| statusCode | int | Y | 11 | Describes the status associated to the error code (0 = success;1 = error) |

Table 36 shows an example addRule request message for the addRule method which adds a new rule and associated actions to a specified device.

TABLE 36 addRule Request Message

| DATA ELEMENT | TYPE | MANDATORY | SIZE | DESCRIPTION |
|---|---|---|---|---|
| actionName | String | Y | 255 | the name of an action |
| customerId | String | Y | 30 | identifier of a specific client |
| description | String | N |  |  |
| devices | String | Y | 255 | a device |

TABLE 36-continued addRule Request Message

| DATA ELEMENT | TYPE | MANDATORY | SIZE | DESCRIPTION |
|---|---|---|---|---|
| expression | String | Y | | a logical expression associated to the rule. |
| name | String | Y | 255 | the name of the rule |
| key | String | N | 255 | a parameter key |
| value | String | N | 255 | a parameter value |
| serviceName | String | Y | 255 | the name of a service |
| transactionId | String | Y | 255 | indicates a transaction identifier inside the system 100 |

Table 37 shows an example addRule response message for the addRule method.

TABLE 37 addRule Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success;1 = error) |

Table 38 shows an example deactiveRule request message for the deactiveRule method which deactivates a specified rule for all associated devices.

TABLE 38 deactiveRule Request Message

| DATA ELEMENT | TYPE | MANDATORY | SIZE | DESCRIPTION |
|---|---|---|---|---|
| devices | String | Y | 255 | The field is a device |
| ruleName | String | Y | 255 | The field is the name of a rule associated with one or more device |
| transactionId | String | Y | 255 | The field indicates a transaction identifier inside M2M system |

Table 39 shows an example deactiveRule response message for the deactiveRule method.

TABLE 39 deactiveRule Response Message

| DATA ELEMENT | TYPE | MANDATORY | SIZE | DESCRIPTION |
|---|---|---|---|---|
| errorCode | int | Y | 11 | contains the code returned by the request. this code |

TABLE 39-continued deactiveRule Response Message

| DATA ELEMENT | TYPE | MANDATORY | SIZE | DESCRIPTION |
|---|---|---|---|---|
| errorDesc | String | Y | 255 | may indicate either error or success. Contains the description if the error code. |
| statusCode | int | Y | 11 | Describes the status associated to the error code (0 = success;1 = error) |

Table 40 shows an example findActionsAndParameters request message for the findActionsAndParameters method which retrieves all actions and associated parameters available.

TABLE 40 findActionsAnd Parameters Request Message

| DATA ELEMENT | TYPE | MANDATORY | SIZE | DESCRIPTION |
|---|---|---|---|---|
| transactionId | String | Y | 255 | indicates a transaction identifier inside the system 100 |

Table 41 shows an example findActionsAndParameters response message for the findActionsAndParameters method.

TABLE 41 findActionsAnd Parameters Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success;1 = error) |
| name | String | N | 255 | the name of an action |
| param | String | N | 255 | a parameter type |

Table 42 shows an example findAlarms request message for the findAlarms method which retrieves all alarms by specified parameters.

TABLE 42 findAlarms Request Message

| DATA ELEMENT | TYPE | MANDATORY | SIZE | DESCRIPTION |
|---|---|---|---|---|
| baseId | int | N | 11 | the identifier of an entity |
| deviceId | String | N | 255 | the device identifier |
| from | dateTime | N | | the date from to start the search |

TABLE 42-continued findAlarms Request Message

| DATA ELEMENT | TYPE | MANDATORY | SIZE | DESCRIPTION |
|---|---|---|---|---|
| ruleName | String | N | 255 | the name of a rule |
| serviceName | String | N | 255 | the name of a service |
| statusType | String | N | 45 | the Status of an Alarm |
| to | dateTime | N | | the date to end the search |
| transactionId | String | Y | 255 | indicates a transaction identifier inside the system 100 |

Table 43 shows an example findAlarms response message for the findAlarms method.

TABLE 43 findAlarms Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success;1 = error) |
| baseId | int | N | 11 | the identifier of an entity |
| creationDate | dateTime | N | | the alarm date creation |
| lastModifyDate | dateTime | N | | the last modify date for the alarm |
| ruleName | String | N | 255 | the rule name |
| statusType | String | N | 45 | the Status of an Alarm |

Table 44 shows an example findFields request message for the findFields method which retrieves the list of fields a user can build a rule for a specified service.

TABLE 44 findFields Request Message

| DATA ELEMENT | TYPE | MANDATORY | SIZE | DESCRIPTION |
|---|---|---|---|---|
| serviceName | String | Y | 255 | the name of a service |
| transactionId | String | Y | 255 | indicates a transaction identifier inside M2M system |

Table 45 shows an example findFields response message for the findFields method.

TABLE 45 findFields Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success;1 = error) |
| fields | String | N | 255 | The field is a string with it is possible create a rule |

Table 46 shows an example findFunctions request message for the findFunctions method which retrieves the list of functions a user can compose a rule with for a specified service.

TABLE 46 findFunctions Request Message

| DATA ELEMENT | TYPE | MANDATORY | SIZE | DESCRIPTION |
|---|---|---|---|---|
| serviceName | String | Y | 255 | The field is the name of a service |
| transactionId | String | Y | 255 | The field indicates a transaction identifier inside M2M system |

Table 47 shows an example findFunctions response message for the findFunctions method.

TABLE 47 findFunctions Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success;1 = error) |
| functions | String | N | 255 | the function with which user can compose a rule |

Table 48 shows an example findRules request message for the findRules method which retrieves rules by customer and service.

TABLE 48

| findRules Request Message | | | | |
|---|---|---|---|---|
| DATA ELEMENT | TYPE | MANDATORY | SIZE | DESCRIPTION |
| customerId | String | N | 255 | The field is the identifier of a customer |
| deviceId | String | N | 255 | The field is the identifier of a device |
| serviceName | String | N | 255 | The field is the name of a service |
| transactionId | String | Y | 255 | The field indicates a transaction identifier inside M2M system |

Table 49 shows an example findRules response message for the findRules method.

TABLE 49

| findRules Response Message | | | | |
|---|---|---|---|---|
| DATA ELEMENT | TYPE | MANDATORY | SIZE | DESCRIPTION |
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |
| creationDate | dateTime | N | | the creation date of the rule |
| description | String | N | 255 | the description of the rule |
| expression | String | N | 65535 | the logical expression of the rule |
| lastModifyDate | dateTime | N | | the last modify date of the rule |
| name | String | N | 255 | the name of the rule |

Table 50 shows an example modifyRule request message for the modifyRule method which modifies an expression for a specified rule.

TABLE 50

| modifyRule Request Message | | | | |
|---|---|---|---|---|
| DATA ELEMENT | TYPE | MANDATORY | SIZE | DESCRIPTION |
| expression | String | Y | 65535 | the logical expression of the rule |
| ruleName | String | Y | 255 | the name of the rule |
| transactionId | String | Y | 255 | indicates a transaction identifier inside the system 100 |

Table 51 shows an example modifyRule response message for the modifyRule method.

TABLE 51

| modifyRule Response Message | | | | |
|---|---|---|---|---|
| DATA ELEMENT | TYPE | MANDATORY | SIZE | DESCRIPTION |
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 52 shows an example removeAction request message for the removeAction method which removes an association between an action and a rule.

TABLE 52

| removeAction Request Message | | | | |
|---|---|---|---|---|
| DATA ELEMENT | TYPE | MANDATORY | SIZE | DESCRIPTION |
| actionName | String | Y | 255 | an action name |
| key | String | N | 255 | a parameter key |
| value | String | N | 255 | a parameter value |
| ruleName | String | Y | 255 | the name of the rule |
| transactionId | String | N | 255 | indicates a transaction identifier inside the system 100 |

Table 53 shows an example removeAction response message for the removeAction method.

TABLE 53

| removeAction Response Message | | | | |
|---|---|---|---|---|
| DATA ELEMENT | TYPE | MANDATORY | SIZE | DESCRIPTION |
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 54 shows an example removeRule request message for the removeRule method which removes a specified rule and associated entities.

Table 54

| | removeRule Request Message | | | |
|---|---|---|---|---|
| DATA ELEMENT | TYPE | MANDATORY | SIZE | DESCRIPTION |
| transactionId | String | Y | 255 | the identifier of an existing transaction |

Table 55 shows an example removeRule response message for the removeRule method.

TABLE 55

| | removeRule Response Message | | | |
|---|---|---|---|---|
| DATA ELEMENT | TYPE | MANDATORY | SIZE | DESCRIPTION |
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Figure 25:
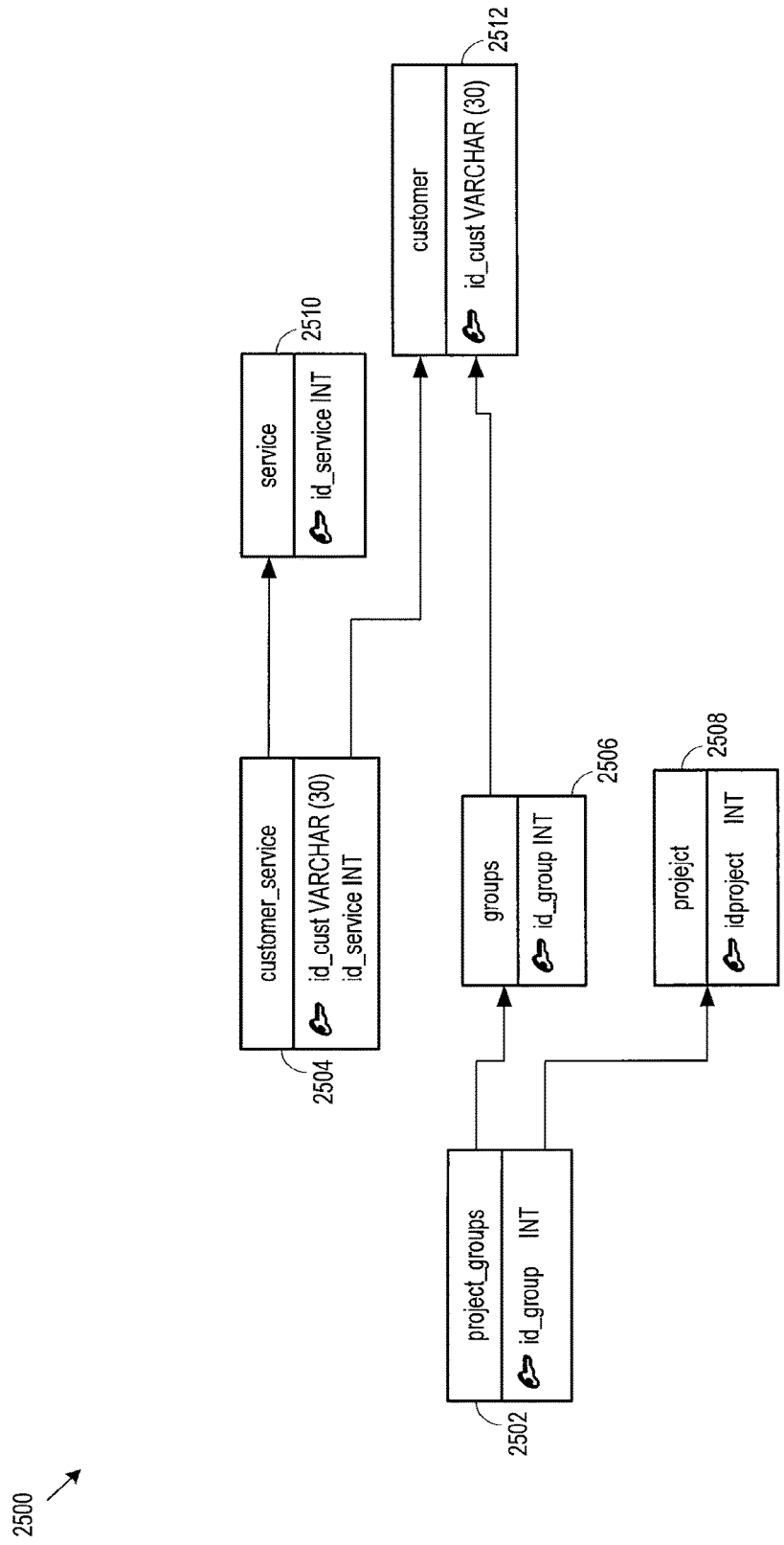
FIG. 25 shows an example of the system configuration Web service data model.

FIG. 25 shows an example of the system configuration Web service data model 2500 which defines relationships between various platform entities that allows the system configuration Web service to define and extract information. The system configuration Web service data model 2500 includes a project groups entity 2502, a customer service entity 2504, a groups entity 2506, a project entity 2508, a service entity 2510, and a customer entity 2512.

The system configuration Web service provides methods to manage relationships between customers, services, groups and projects. In particular the methods of the system configuration Web service: Associate/Disassociate groups and projects; and Activate/Deactivate services for customers. The exposed methods from the system configuration Web service include: associateGroupToProject; customerDomainSubscription; customerDomainUnsubscription; and deassociateGroupFromProject.

Table 56 shows an example groupProject request message for the groupProject method which associates a group and a project specified in the request.

TABLE 56

| | groupProject Request Message | | | |
|---|---|---|---|---|
| DATA ELEMENT | TYPE | MANDATORY | SIZE | DESCRIPTION |
| groupId | int | Y | 10 | the identifier of a specific group |
| projectId | int | Y | 10 | the identifier of a specific project |
| transactionId | String | Y | 255 | indicates a transaction identifier inside M2M system |

Table 57 shows an example groupProject response message for the groupProject method.

TABLE 57

| | groupProject Response Message | | | |
|---|---|---|---|---|
| DATA ELEMENT | TYPE | MANDATORY | SIZE | DESCRIPTION |
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 58 shows an example customerDomainSubscription request message for the customerDomainSubscription method which activates a service for the customer specified in the request.

TABLE 58

| | customerDomainSubscription Request Message | | | |
|---|---|---|---|---|
| DATA ELEMENT | TYPE | MANDATORY | SIZE | DESCRIPTION |
| customerId | string | Y | 30 | the identifier of a specific custumer |
| serviceId | int | Y | 10 | the identifier of a specific service |
| transaction Id | String | Y | 255 | indicates a transaction identifier inside the system 100 |

Table 59 shows an example customerDomainSubscription response message for the customerDomainSubscription method.

TABLE 59

| | customerDomainSubscription Response Message | | | |
|---|---|---|---|---|
| DATA ELEMENT | TYPE | MANDATORY | SIZE | DESCRIPTION |
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 60 shows an example customerDomainUnsubscription request message for the customerDomainUnsubscription method which deactivates a service for a specified customer in the request.

TABLE 60 customerDomainUnsubscription Request Message

| DATA ELEMENT | TYPE | MANDATORY | SIZE | DESCRIPTION |
|---|---|---|---|---|
| customerId | string | Y | 30 | The field is the identifier of a specific custumer |
| serviceId | int | Y | 10 | The field is the identifier of a specific service |
| transaction Id | String | Y | 255 | The field indicates a transaction identifier inside M2M system |

Table 61 shows an example customerDomainUnsubscription response message for the customerDomainUnsubscription method.

TABLE 61 customerDomainUnsubscription Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 62 shows an example deassociateGroupFromProject request message for the deassociateGroupFromProject method which disassociate a group and a project specified in the request.

TABLE 62 deassociateGroupFromProject Request Message

| DATA ELEMENT | TYPE | MANDATORY | SIZE | DESCRIPTION |
|---|---|---|---|---|
| groupId | int | Y | 10 | the identifier of a specific group |
| projectId | int | Y | 10 | the identifier of a specific project |
| transaction Id | String | Y | 255 | indicates a transaction identifier inside the system 100 |

Table 63 shows an example deassociateGroupFromProject response message for the deassociateGroupFromProject method.

TABLE 63 deassociateGroupFrom Project Response Message

| DATA ELEMENT | TYPE | MANDATORY | SIZE | DESCRIPTION |
|---|---|---|---|---|
| errorCode | int | Y | 11 | contains the code returned by the request. this code may indicate either error or success. |
| errorDesc | String | Y | 255 | Contains the description if the error code. |
| statusCode | int | Y | 11 | Describes the status associated to the error code (0 = success; 1 = error) |

Table 64 shows an example list of response codes that may be returned in the send responses from each web service.

TABLE 64 response codes

| Code | Type | Text | Description |
|---|---|---|---|
| 1000 | Error code | request successful done | Successfully executed |
| 1001 | Error code | events was not found by device id: | An error was occurred or nothing was found by the request |
| 1002 | Error code | commands was not found by device id: . . . Fields was not found for service: . . . Functions was not found service: Customer with id " . . . " was not found Service with name " . . . " was not found Rules was not found "Device with id " . . . " was not found" Rule with name " . . . " was not found Alarms was not found Action with name " . . . " was not found | An error was occurred or nothing was found by the request |
| 0 | Status Code | — | Success (associated to the errorCode 1000) |
| 1 | Status Code | — | Error ( associated with any erroCode that indicates error 1001-1002 etc.) |
| 1008 | Error Code | check status request already opened, wait for request's expire | An error was occurred or nothing was found by the request |
| 2001 | Error Code | | IB generic error |
| 2101 | Error Code | | IB- Data Access generic error |
| 2102 | Error Code | | Error generated by an invocation to CSM |
| 2103 | Error Code | event not found by id: . . . commands was not found by device id: . . . No Group with specified ID found No project with specified ID found No customer with specified ID found No service with specified ID found Some Device associated to Service with status ACTIVE or ACTIVATION_IN_PROGRESS exists for specified Customer | Bad input parameters |

TABLE 64-continued response codes

| Code | Type | Text | Description |
|---|---|---|---|
| 2104 | Error Code | | Error generated by an invocation to DCM |
| 2105 | Error Code | | IB-Data Access generic error |
| 2106 | Error Code | | |
| 2107 | Error Code | | a file specified in Repository table can not be found |
| 2108 | Error Code | | Error generated by an invocation to EH |
| 2109 | Error Code | events was not found by device id: . . . | IB element not found |
| 4001 | Error Code | | Event Handler generic error |
| 4002 | Error Code | | Event Handler Bad Input parameter |
| 4003 | Error Code | | Event Handler no value found |
| 3001 | Error Code | | DCM generic error |
| 3002 | Error Code | | DCM bad input parameter |

Table 65 shows an example listing of a DataAccess.wsdl.

TABLE 65

DataAccess.wsdl

```
<?xml version="1.0" encoding="UTF-8"?>
<definitions name="DataAccessInterface"
targetNamespace="http://services.infobroker.m2m.amos.company.com"
xmlns:tns="http://services.infobroker.m2m.amos.company.com"
xmlns:ns1="infobroker.m2m.amos.company.com/eventType"
xmlns:xsd="http://www.w3.org/2001/XMLSchema"
xmlns:ns2="infobroker.m2m.amos.company.com/eventId"
xmlns:soap="http://schemas.xmlsoap.org/wsdl/soap/"
xmlns="http://schemas.xmlsoap.org/wsdl/">
<types>
<xs:schema targetNamespace="infobroker.m2m.amos.company.com/eventType"
version="1.0"
xmlns:ns1="http://services.infobroker.m2m.amos.company.com"
xmlns:xs="http://www.w3.org/2001/XMLSchema">
<xs: import namespace="http://services.infobroker.m2m.amos.company.com"/>
<xs:element name="event Type" type="ns1:eventType"/>
</xs:schema>
<xs:schema targetNamespace="infobroker.m2m.amos.company.com/eventId"
version="1.0"
xmlns:xs="http://www.w3.org/2001/XMLSchema">
<xs:element name="eventId" type="xs:int"/>
</xs:schema>
<xs:schema targetNamespace="http://services.infobroker.m2m.amos.company.com"
version="1.0" xmlns:ns1="infobroker.m2m.amos.company.com/eventType"
xmlns:ns2="infobroker.m2m.amos.company.com/eventId"
xmlns:tns="http://services.infobroker.m2m.amos.company.com"
xmlns:xs="http://www.w3.org/2001/XMLSchema">
<xs:import namespace="infobroker.m2m.amos.company.com/eventType"/>
<xs:import namespace="infobroker.m2m.amos.company.com/eventId"/>
<xs:complexType name="subscribeRequest">
<xs:sequence>
<xs:element name="customerId" type="xs:string"/>
<xs:element name="deviceId" type="xs:string"/>
<xs:element name="eventId" type="xs:int"/>
<xs:element name="transactionId" type="xs:string"/>
</xs:sequence>
</xs:complexType>
<xs:complexType name="dataAccessResponse">
<xs:sequence>
<xs:element minOccurs="0" name="errorCode" type="xs:int"/>
<xs:element minOccurs="0" name="errorDesc" type="xs:string"/>
<xs:element minOccurs="0" name="statusCode" type="xs:int"/>
</xs:sequence>
</xs:complexType>
<xs:complexType name="commandRequest">
<xs:sequence>
<xs:element minOccurs="0" name="commandType" type="tns:commandTypes"/>
<xs:element name="deviceId" type="xs:string"/>
<xs:element minOccurs="0" name="fromDate" type="xs:dateTime"/>
<xs:element minOccurs="0" name="status" type="tns:statusType"/>
<xs:element minOccurs="0" name="toDate" type="xs:dateTime"/>
<xs:element name="transactionId" type="xs:string"/>
</xs:sequence>
</xs:complexType>
<xs:complexType name="commandResponse">
<xs:complexContent>
```

TABLE 65-continued

DataAccess.wsdl

```
<xs:extension base="tns:dataAccessResponse">
<xs:sequence>
<xs:element maxOccurs="unbounded" minOccurs="0" name="commands" nillable="true"
type="tns:command"/>
</xs:sequence>
</xs:extension>
</xs:complexContent>
</xs:complexType>
<xs:complexType name="command">
<xs:sequence>
<xs:element minOccurs="0" name="commandId" type="xs:int"/>
<xs:element minOccurs="0" name="commandType" type="xs:string"/>
<xs:element minOccurs="0" name="lastDate" type="xs:dateTime"/>
<xs:element minOccurs="0" name="status" type="xs:string"/>
</xs:sequence>
</xs:complexType>
<xs:complexType name="eventRequest">
<xs:sequence>
<xs:element name="deviceId" type="xs:string"/>
<xs:element minOccurs="0" ref="ns1:eventType"/>
<xs:element minOccurs="0" name="fromDate" type="xs:dateTime"/>
<xs:element minOccurs="0" name="toDate" type="xs:dateTime"/>
<xs:element name="transactionId" type="xs:string"/>
</xs:sequence>
</xs:complexType>
<xs:complexType name="eventResponse">
<xs:complexContent>
<xs:extension base="tns:dataAccessResponse">
<xs:sequence>
<xs:element maxOccurs="unbounded" minOccurs="0" name="events" nillable="true"
type="tns:event"/>
</xs:sequence>
</xs:extension>
</xs:complexContent>
</xs:complexType>
<xs:complexType name="event">
<xs:sequence>
<xs:element minOccurs="0" name="eventId" type="xs:int"/>
<xs:element minOccurs="0" name="eventType" type="xs:string"/>
<xs:element minOccurs="0" name="lastDate" type="xs:dateTime"/>
</xs:sequence>
</xs:complexType>
<xs:complexType name="eventDetailRequest">
<xs:sequence>
<xs:element minOccurs="0" ref="ns2:eventId"/>
<xs:element name="transactionId" type="xs:string"/>
</xs:sequence>
</xs:complexType>
<xs:complexType name="eventDetailResponse">
<xs:complexContent>
<xs:extension base="tns:dataAccessResponse">
<xs:sequence>
<xs:element minOccurs="0" name="arrayOfDetail" type="tns: arrayOfDetail"/>
</xs:sequence>
</xs:extension>
</xs:complexContent>
</xs:complexType>
<xs:complexType name="arrayOfDetail">
<xs:sequence>
<xs:element maxOccurs="unbounded" minOccurs="0" name="details" nillable="true"
type="tns:detail"/>
</xs:sequence>
</xs:complexType>
<xs:complexType name="detail">
<xs:sequence>
<xs:element maxOccurs="unbounded" minOccurs="0" name="attributes" nillable="true"
type="tns:attribute"/>
<xs:element minOccurs="0" name="name" type="xs:string"/>
</xs:sequence>
</xs:complexType>
<xs:complexType name="attribute">
<xs:sequence>
<xs:element minOccurs="0" name="name" type="xs:string"/>
<xs:element minOccurs="0" name="value" type="xs:string"/>
</xs:sequence>
</xs:complexType>
<xs:simpleType name="commandTypes">
<xs:restriction base="xs:string">
```

TABLE 65-continued

DataAccess.wsdl

```
<xs:enumeration value="PUT_DEVICE"/>
<xs:enumeration value="REMOVE_DEVICE"/>
<xs:enumeration value="REPLACE_DEVICE"/>
<xs:enumeration value="ACTIVATE_SERVICE"/>
<xs:enumeration value="DEACTIVATE_SERVICE"/>
<xs:enumeration value="SUBSCRIBE_EVENT"/>
<xs:enumeration value="UNSUBSCRIBE_EVENT"/>
<xs:enumeration value="CONFIGURE_DEVICE"/>
<xs:enumeration value="CHECK_STATUS"/>
</xs:restriction>
</xs:simpleType>
<xs:simpleType name="statusType">
<xs:restriction base="xs:string">
<xs:enumeration value="PROVISIONING"/>
<xs:enumeration value="PROVISIONED"/>
<xs:enumeration value="INSTALLED"/>
<xs:enumeration value="UNINSTALLED"/>
<xs:enumeration value="ACTIVATING"/>
<xs:enumeration value="ACTIVATED"/>
<xs:enumeration value="ACTIVATION_IN_PROGRESS"/>
<xs:enumeration value="ACTIVE"/>
<xs:enumeration value="DEACTIVATING"/>
<xs:enumeration value="DEACTIVATED"/>
<xs:enumeration value="DEACTIVE"/>
<xs:enumeration value="REPLACING"/>
<xs:enumeration value="REPLACED"/>
<xs:enumeration value="DELETING"/>
<xs:enumeration value="DELETED"/>
<xs:enumeration value="SUBSCRIBED"/>
<xs:enumeration value="UNSUBSCRIBED"/>
<xs:enumeration value="ERROR"/>
<xs:enumeration value="CONFIGURING"/>
<xs:enumeration value="CONFIGURED"/>
<xs:enumeration value="CHECK_IN_PROGRESS"/>
<xs:enumeration value="CHECKED"/>
<xs:enumeration value="CHECK_FAILED"/>
</xs:restriction>
</xs:simpleType>
<xs:simpleType name="eventType">
<xs:restriction base="xs:string">
<xs:enumeration value="SAMPLING"/>
<xs:enumeration value="LOGGING"/>
</xs:restriction>
</xs:simpleType>
</xs:schema>
</types>
<message name="DataAccess_unsubscribe">
<part name="request" type="tns:subscribeRequest"/>
</part>
</message>
<message name="DataAccess_findEventDetailsByDeviceId">
<part name="request" type="tns:eventRequest">
</part>
</message>
<message name="DataAccess_findEventDetail">
<part name="request" type=tns:eventDetailRequest">
</part>
</message>
<message name="DataAccess_findEventByDeviceId">
<part name="request" type=tns:eventRequest">
</part>
</message>
<message name="DataAccess_findCommandByDeviceId">
<part name="request" type=tns:commandRequest">
</part>
</message>
<message name="DataAccess_findCommandByDeviceIdResponse">
<part name="response" type="tns:commandResponse">
</part>
</message>
<message name="DataAccess_subscribe">
<part name="request" type="tns:subscribeRequest">
</part>
</message>
<message name="DataAccess_findEventByDeviceIdResponse">
<part name="response" type="tns:eventResponse">
</part>
</message>
```

TABLE 65-continued

DataAccess.wsdl

```
<message name="DataAccess_subscribeResponse">
<part name="response" type="tns:dataAccessResponse">
</part>
</message>
<message name="DataAccess_findEventDetailsByDeviceIdResponse">
<part name="response" type="tns:eventDetailResponse">
</part>
</message>
<message name="DataAccess_findEventDetailResponse">
<part name="response" type="tns:eventDetailResponse">
</part>
</message>
<message name="DataAccess_unsubscribeResponse">
<part name="response" type="tns:dataAccessResponse">
</part>
</message>
<portType name="DataAccess">
<operation name="findCommandByDeviceId" parameterOrder="request">
<input message="tns:DataAccess_findCommandByDeviceId">
</input>
<output message="tns:DataAccess_findCommandByDeviceIdResponse">
</output>
</operation>
<operation name="findEventByDeviceId" parameterOrder="request">
<input message="tns:DataAccess_findEventByDeviceId">
</input>
<output message="tns:DataAccess_findEventByDeviceIdResponse">
</output>
</operation>
<operation name="findEventDetail" parameterOrder="request">
<input message="tns:DataAccess_findEventDetail">
</input>
<output message="tns:DataAccess_findEventDetailResponse">
</output>
</operation>
<operation name="findEventDetailsByDeviceId" parameterOrder="request">
<input message="tns:DataAccess_findEventDetailsByDeviceId">
</input>
<output message="tns:DataAccess_findEventDetailsByDeviceIdResponse">
</output>
</operation>
<operation name="subscribe" parameterOrder="request">
<input message="tns:DataAccess_subscribe">
</input>
<output message="tns:DataAccess_subscribeResponse">
</output>
</operation>
<operation name="unsubscribe" parameterOrder="request">
<input message="tns:DataAccess_unsubscribe">
</input>
<output message="tns:DataAccess_unsubscribeResponse">
</output>
</operation>
</portType>
<binding name="DataAccessBinding" type="tns:DataAccess">
<soap:binding style="rpc" transport="http://schemas.xmlsoap.org/soap/http"/>
<operation name="findCommandByDeviceId">
<soap:operation soapAction=""/>
<input>
<soap:body use="literal" namespace="http://services.infobroker.m2m.amos.company.com"/>
</input>
<output>
<soap:body use="literal" namespace="http://services.infobroker.m2m.amos.company.com"/>
</output>
</operation>
<operation name="findEventByDeviceId">
<soap:operation soapAction=""/>
<input>
<soap:body use="literal" namespace="http://services.infobroker.m2m.amos.company.com"/>
</input>
<output>
<soap:body use="literal" namespace="http://services.infobroker.m2m.amos.company.com"/>
</output>
</operation>
```

TABLE 65-continued

| DataAccess.wsdl |
|---|
| `<operation name="findEventDetail">`<br>`<soap:operation soapAction=""/>`<br>`<input>`<br>`<soap:body use="literal" namespace="http://services.infobroker.m2m.amos.company.com"/>`<br>`</input>`<br>`<output>`<br>`<soap:body use="literal" namespace="http://services.infobroker.m2m.amos.company.com"/>`<br>`</output>`<br>`</operation>`<br>`<operation name="findEventDetailsByDeviceId">`<br>`<soap:operation soapAction=""/>`<br>`<input>`<br>`<soap:body use="literal" namespace="http://services.infobroker.m2m.amos.company.com"/>`<br>`</input>`<br>`<output>`<br>`<soap:body use="literal" namespace="http://services.infobroker.m2m.amos.company.com"/>`<br>`</output>`<br>`</operation>`<br>`<operation name="subscribe">`<br>`<soap:operation soapAction=""/>`<br>`<input>`<br>`<soap:body use="literal" namespace="http://services.infobroker.m2m.amos.company.com"/>`<br>`</input>`<br>`<output>`<br>`<soap:body use="literal" namespace="http://services.infobroker.m2m.amos.company.com"/>`<br>`</output>`<br>`</operation>`<br>`<operation name="unsubscribe">`<br>`<soap:operation soapAction=""/>`<br>`<input>`<br>`<soap:body use="literal" namespace="http://services.infobroker.m2m.amos.company.com"/>`<br>`</input>`<br>`<output>`<br>`<soap:body use="literal" namespace="http://services.infobroker.m2m.amos.company.com"/>`<br>`</output>`<br>`</operation>`<br>`</binding>`<br>`<service name="DataAccessInterface">`<br>`<port name="DataAccessPort" binding="tns:DataAccessBinding">`<br>`<soap:address location="http://192.168.83.208:18080/M2M/InfoBrokerDataAccess"/>`<br>`</port>`<br>`</service>`<br>`</definitions>` |

Table 66 shows an example listing of a DeviceManager.wsdl.

TABLE 66

| DeviceManager.wsdl |
|---|
| `<?xml version="1.0" encoding="UTF-8"?>`<br>`<definitions name="DeviceManagerInterface"`<br>`targetNamespace="http://services.infobroker.m2m.amos.company.com"`<br>`xmlns:tns="http://services.infobroker.m2m.amos.company.com"`<br>`xmlns:xsd="http://www.w3.org/2001/XMLSchema"`<br>`xmlns:soap= "http://schemas.xmlsoap.org/wsdl/soap/"`<br>`xmlns="http://schemas.xmlsoap.org/wsdl/">`<br>`<types>`<br>`<xs:schema targetNamespace="http://services.infobroker.m2m.amos.company.com"`<br>`version="1.0" xmlns:tns="http://services.infobroker.m2m.amos.company.com"`<br>`xmlns:xs="http://www.w3.org/2001/XMLSchema">`<br>`<xs:complexType name="deviceManagerRequest">`<br>`<xs:sequence>`<br>`<xs:element minOccurs="0" name="configurationId" type="xs:int"/>`<br>`<xs:element name="customerId" type="xs:string"/>`<br>`<xs:element name="deviceId" type="xs:string"/>` |

TABLE 66-continued

DeviceManager.wsdl

```
<xs:element name="serviceId" type="xs:int"/>
<xs:element name="transactionId" type="xs:string"/>
</xs:sequence>
</xs:complexType>
<xs:complexType name="deviceManagerResponse">
<xs:sequence>
<xs:element minOccurs="0" name="errorCode" type="xs:int"/>
<xs:element minOccurs="0" name="errorDesc" type="xs:string"/>
<xs:element minOccurs="0" name="statusCode type="xs:int"/>
</xs:sequence>
</xs:complexType>
<xs:complexType name="removeDeviceRequest">
<xs:sequence>
<xs:element name="customerId" type="xs:string"/>
<xs:element name="deviceId" type="xs:string"/>
<xs:element name="transactionId" type="xs:string"/>
</xs:sequence>
</xs:complexType>
<xs:complexType name="replaceDeviceRequest">
<xs:sequence>
<xs:element name="customerId" type="xs:string"/>
<xs:element name="oldDevice" type="xs:string"/>
<xs:element name="newDevice" type="xs:string"/>
<xs:element name="transactionId" type="xs:string"/>
</xs:sequence>
</xs:complexType>
<xs:complexType name="insertDeviceRequest">
<xs:sequence>
<xs:element name="customerId" type="xs:string"/>
<xs:element name="deviceId" type="xs:string"/>
<xs:element name="device Type" type="xs:string"/>
<xs:element name="groupId" type="xs:string"/>
<xs:element minOccurs="0" name="iccid" type="xs:string"/>
<xs:element minOccurs="0" name="ipAddress" type="xs:string"/>
<xs:element minOccurs="0" name="msisdn" type="xs:string"/>
<xs:element name="transactionId" type="xs:string"/>
</xs:sequence>
</xs:complexType>
<xs:complexType name="deviceManagerConfigurationRequest">
<xs:sequence>
<xs:element name="arrayOfDetail" type="tns:arrayOfDetail"/>
<xs:element name="customerId" type="xs:string"/>
<xs:element name="deviceId" type="xs:string"/>
<xs:element name="serviceId" type="xs:int"/>
<xs:element name="transactionId" type="xs:string"/>
</xs:sequence>
</xs:complexType>
<xs:complexType name="arrayOfDetail">
<xs:sequence>
<xs:element maxOccurs="unbounded" name="details" type="tns:detail"/>
</xs:sequence>
</xs:complexType>
<xs:complexType name="detail"/>
<xs:sequence>
<xs:element maxOccurs="unbounded" name="attributes" type="tns:attribute"/>
</xs:sequence>
</xs:complexType>
<xs:complexType name="attribute">
<xs:sequence>
<xs:element name="name" type="xs:string"/>
<xs:element name="value" type="xs:string"/>
</xs:sequence>
</xs:complexType>
</xs:schema>
</types>
<message name="DeviceManager_replaceDeviceResponse">
<part name="response" type="tns:deviceManagerResponse">
</part>
</message>
<message name="DeviceManager_checkStatusResponse">
<part name="response" type="tns:deviceManagerResponse">
</part>
</message>
<message name="DeviceManager_deactivate">
<part name="request" type="tns:deviceManagerRequest">
</part>
</message>
<message name="DeviceManager_activate">
```

TABLE 66-continued

DeviceManager.wsdl

```
<part name="request" type="tns:deviceManagerRequest"/>
</part>
</message>
<message name="DeviceManager_configure">
<part name="request" type="tns:deviceManagerRequest">
</part>
</message>
<message name="DeviceManager_removeDeviceResponse">
<part name="response" type="tns:deviceManagerResponse">
</part>
</message>
<message name="DeviceManager_configureResponse">
<part name="response" type="tns:deviceManagerResponse">
</part>
</message>
<message name="DeviceManager_deactivateResponse">
<part name="response" type="tns:deviceManagerResponse">
</part>
</message>
<message name="DeviceManager_insertDevice">
<part name="request" type="tns:insertDeviceRequest">
</part>
</message>
<message name="DeviceManager_insertDeviceResponse">
<part name="response" type="tns:deviceManagerResponse">
</part>
</message>
<message name="DeviceManager_replaceDevice">
<part name="request" type="tns:replaceDeviceRequest"/>
</part>
</message>
<message name="DeviceManager_configureByDetailsResponse">
<part name="response" type="tns:deviceManagerResponse">
</part>
</message>
<message name="DeviceManager_removeDevice">
<part name="request" type="tns:removeDeviceRequest">
</part>
</message>
<message name="DeviceManager_configureByDetails">
<part name="request" type="tns:deviceManagerConfigurationRequest">
</part>
</message>
<message name="DeviceManager_activateResponse">
<part name="response"type="tns:deviceManagerResponse">
</part>
</message>
<message name="DeviceManager_checkStatus">
<part name="request" type="tns:deviceManagerRequest">
</part>
</message>
<portType name="DeviceManager">
<operation name="activate" parameterOrder="request">
<input message="tns:DeviceManager_activate">
</input>
<output message="tns:DeviceManager_activateResponse">
</output>
</operation>
<operation name="checkStatus" parameterOrder="request">
<input message="tns:DeviceManager_checkStatus">
</input>
<output message="tns:DeviceManager_checkStatusResponse">
</output>
</operation>
<operation name="configure" parameterOrder="request">
<input message="tns:DeviceManager_configure">
</input>
<output message="tns:DeviceManager_configureResponse">
</output>
</operation>
<operation name="configureByDetails" parameterOrder="request">
<input message="tns:DeviceManager_configureByDetails">
</input>
<output message="tns:DeviceManager_configureByDetailsResponse">
</output>
</operation>
<operation name="deactivate" parameterOrder="request">
<input message="tns:DeviceManager_deactivate">
```

TABLE 66-continued

DeviceManager.wsdl

```
</input>
<output message="tns:DeviceManager_deactivateResponse">
</output>
</operation>
<operation name="insertDevice" parameterOrder="request">
<input message="tns:DeviceManager_insertDevice">
</input>
<output message="tns:DeviceManager_insertDeviceResponse">
</output>
</operation>
<operation name="removeDevice" parameterOrder="request">
<input message="tns:DeviceManager_removeDevice">
</input>
<output message="tns:DeviceManager_removeDeviceResponse">
</output>
</operation>
<operation name="replaceDevice" parameterOrder="request">
<input message="tns:DeviceManager_replaceDevice">
</input>
<output message="tns:DeviceManager_replaceDeviceResponse">
</output>
</operation>
</portType>
<binding name="DeviceManagerBinding" type="tns:DeviceManager">
<soap:binding style="rpc" transport="http://schemas.xmlsoap.org/soap/http"/>
<operation name="activate">
<soap:operation soapAction=""/>
<input>
<soap:body use="literal" namespace="http://servicesinfobroker.m2m.amos.company.com"/>
</input>
<output>
<soap:body use="literal" namespace="http://services.infobroker.m2m.amos.company.com"/>
</output>
</operation>
<operation name="checkStatus">
<soap:operation soapAction=""/>
<input>
<soap:body use="literal" namespace="http://services.infobroker.m2m.amos.company.com"/>
</input>
<output>
<soap:body use="literal" namespace="http://services.infobroker.m2m.amos.company.com"/>
</output>
</operation>
<operation name="configure">
<soap:operation soapAction=""/>
<input>
<soap:body use="literal" namespace="http://services.infobroker.m2m.amos.company.com"/>
</input>
<output>
<soap:body use="literal" namespace="http://services.infobroker.m2m.amos.company.com"/>
</output>
</operation>
<operation name="configureByDetails">
<soap:operation soapAction=""/>
<input>
<soap:body use="literal" namespace="http://services.infobroker.m2m.amos.company.com"/>
</input>
<output>
<soap:body use="literal" namespace="http://services.infobroker.m2m.amos.company.com"/>
</output>
</operation>
<operation name="deactivate">
<soap:operation soapAction=""/>
<input>
<soap:body use="literal" namespace="http://services.infobroker.m2m.amos.company.com"/>
</input>
<output>
<soap:body use="literal" namespace="http://services.infobroker.m2m.amos.company.com"/>
```

TABLE 66-continued

DeviceManager.wsdl

```
</output>
</operation>
<operation name="insertDevice">
<soap:operation soapAction=""/>
<input>
<soap:body use="literal" namespace="http://services.infobroker.m2m.amos.company.com"/>
</input>
<output>
<soap:body use="literal" namespace="http://services.infobroker.m2m.amos.company.com"/>
</output>
</operation>
<operation name="removeDevice">
<soap:operation soapAction=""/>
<input>
<soap:body use="literal" namespace="http://services.infobroker.m2m.amos.company.com"/>
</input>
<output>
<soap:body use="literal" namespace="http://services.infobroker.m2m.amos.company.com"/>
</output>
</operation>
<operation name="replaceDevice">
<soap:operation soapAction=""/>
<input>
<soap:body use="literal" namespace="http://services.infobroker.m2m.amos.company.com"/>
</input>
<output>
<soap:body use="literal" namespace="http://services.infobroker.m2m.amos.company.com"/>
</output>
</operation>
</binding>
<service name="DeviceManagerInterface">
<port name="DeviceManagerPort" binding="tns:DeviceManagerBinding">
<soap:address location="http://127.0.0.1:8080/M2M/InfoBrokerDeviceManager"/>
</port>
</service>
</definitions>
```

Table 67 shows an example listing of an EventHandler.wsdl.

TABLE 67

EventHandler.wsdl

```
<?xml version="1.0" encoding="UTF-8"?>
<definitions name="EventHandlerInterface"
targetNamespace="http://services.infobroker.m2m.amos.company.com"
xmlns:tns="http://services.infobroker.m2m.amos.company.com"
xmlns:xsd="http://www.w3.org/2001/XMLSchema"
xmlns:soap="http://schemas.xmlsoap.org/wsdl/soap/"
xmlns="http://schemas.xmlsoap.org/wsdl/">
<types>
<xs:schema
targetNamespace="http://services.infobroker.m2m.amos.company.com"
version="1.0"
xmlns:tns="http://services.infobroker.m2m.amos.company.com"
xmlns:xs="http://www.w3.org/2001/XMLSchema">
<xs:complexType name="addRuleRequest">
<xs:sequence>
<xs:element minOccurs="0" name="actionName" type="xs:string"/>
<xs:element name="customerId" type="xs:string"/>
<xs:element minOccurs="0" name="description" type="xs:string"/>
<xs:element maxOccurs="unbounded" name="devices" type="xs:string"/>
<xs:element name="expression" type="xs:string"/>
<xs:element name="name" type="xs:string"/>
<xs:element name="parameters">
<xs:complexType>
<xs:sequence>
<xs:element maxOccurs="unbounded" minOccurs="0" name="entry">
```

TABLE 67-continued

EventHandler.wsdl

```
<xs:complexType>
<xs:sequence>
<xs:element minOccurs="0" name="key" type="xs:string"/>
<xs:element minOccurs="0" name="value" type="xs:string"/>
</xs:sequence>
</xs:complexType>
</xs:element>
</xs:sequence>
</xs:complexType>
</xs:element>
<xs:element name="serviceName" type="xs:string"/>
<xs:element name="transactionId" type="xs:string"/>
</xs:sequence>
</xs:complexType>
<xs:complexType name="eventHandlerResponse">
<xs:sequence>
<xs:element minOccurs="0" name="errorCode" type="xs:int"/>
<xs:element minOccurs="0" name="errorDesc" type="xs:string"/>
<xs:element minOccurs="0" name="statusCode" type="xs:int"/>
</xs:sequence>
</xs:complexType>
<xs:complexType name="addActionRequest">
<xs:sequence>
<xs:element name="actionName" type="xs:string"/>
<xs:element name="parameters">
<xs:complexType>
<xs:sequence>
<xs:element maxOccurs="unbounded" minOccurs="0" name="entry">
```

TABLE 67-continued

EventHandler.wsdl

```
<xs:complexType>
<xs:sequence>
<xs:element minOccurs="0" name="key" type="xs:string"/>
<xs:element minOccurs="0" name="value" type="xs:string"/>
</xs:sequence>
</xs:complexType>
</xs:element>
</xs:sequence>
</xs:complexType>
</xs:element>
<xs:element name="ruleName" type="xs:string"/>
<xs:element name="transactionId" type="xs:string"/>
</xs:sequence>
</xs:complexType>
<xs:complexType name="fieldRequest">
<xs:sequence>
<xs:element name="serviceName" type="xs:string"/>
<xs:element name="transactionId" type="xs:string"/>
</xs:sequence>
</xs:complexType>
<xs:complexType name="fieldResponse">
<xs:complexContent>
<xs:extension base="tns:eventHandlerResponse">
<xs:sequence>
<xs:element maxOccurs="unbounded" minOccurs="0" name="fields"
nillable="true" type="xs:string"/>
</xs:sequence>
</xs:extension>
</xs:complexContent>
</xs:complexType>
<xs:complexType name="functionRequest">
<xs:sequence>
<xs:element name="serviceName" type="xs:string"/>
<xs:element name="transactionId" type="xs:string"/>
</xs:sequence>
</xs:complexType>
<xs:complexType name="functionResponse">
<xs:complexContent>
<xs:extension base="tns:eventHandlerResponse">
<xs:sequence>
<xs:element maxOccurs="unbounded" minOccurs="0" name="functions"
nillable="true" type="xs:string"/>
</xs:sequence>
</xs:extension>
</xs:complexContent>
</xs:complexType>
<xs:complexType name="eventHandlerRequest">
<xs:sequence>
<xs:element name="transactionId" type="xs:string"/>
</xs:sequence>
</xs:complexType>
<xs:complexType name="actionResponse">
<xs:complexContent>
<xs:extension base="tbs:eventHandlerResponse">
<xs:sequence>
<xs:element minOccurs="0" name="actionParams"
type="tns:listKeyListType"/>
</xs:sequence>
</xs:extension>
</xs:complexContent>
</xs:complexType>
<xs:complexType name="listKeyListType">
<xs:sequence>
<xs:element maxOccurs="unbounded" minOccurs="0" name="action"
type="tns:keyListType"/>
</xs:sequence>
</xs:complexType>
<xs:complexType name="keyListType">
<xs:sequence>
<xs:element minOccurs="0" name="name" type="xs:string"/>
<xs:element maxOccurs="unbounded" minOccurs="0" name="param"
type="xs:string"/>
</xs:sequence>
</xs:complexType>
<xs:complexType name="findRuleRequest">
<xs:sequence>
<xs:element minOccurs="0" name="customerId" type="xs:string"/>
<xs:element minOccurs="0" name="deviceId" type="xs:string"/>
<xs:element minOccurs="0" name="serviceName" type="xs:string"/>
<xs:element name="transactionId" type="xs:string"/>
</xs:sequence>
</xs:complexType>
<xs:complexType name="findRuleResponse">
<xs:complexContent>
<xs:extension base="tns:eventHandlerResponse">
<xs:sequence>
<xs:element maxOccurs="unbounded" minOccurs="0" name="rules"
nillable="true" type="tns:rule"/>
</xs:sequence>
</xs:extension>
</xs:complexContent>
</xs:complexType>
<xs:complexType name="rule">
<xs:sequence>
<xs:element minOccurs="0" name="creationDate" type="xs:dateTime"/>
<xs:element minOccurs="0" name="description" type="xs:string"/>
<xs:element minOccurs="0" name="expression" type="xs:string"/>
<xs:element minOccurs="0" name="lastModifyDate" type="xs:dateTime"/>
<xs:element minOccurs="0" name="name" type="xs:string"/>
</xs:sequence>
</xs:complexType>
<xs:complexType name="alarmRequest">
<xs:sequence>
<xs:element minOccurs="0" name="baseId" type="xs:int"/>
<xs:element minOccurs="0" name="deviceId" type="xs:string"/>
<xs:element minOccurs="0" name="from" type="xs:dateTime"/>
<xs:element minOccurs="0" name="ruleName" type="xs:string"/>
<xs:element minOccurs="0" name="serviceName" type="xs:string"/>
<xs:element minOccurs="0" name="statusType" type="tns:statusType"/>
<xs:element minOccurs="0" name="to" type="xs:dateTime"/>
<xs:element name="transactionId" type="xs:string"/>
</xs:sequence>
</xs:complexType>
<xs:complexType name="alarmResponse">
<xs:complexContent>
<xs:extension base="tns:eventHandlerResponse">
<xs:sequence>
<xs:element maxOccurs="unbounded" minOccurs="0" name="alarms"
nillable="true" type="tns:alarm"/>
</xs:sequence>
</xs:extension>
</xs:complexContent>
</xs:complexType>
<xs:complexType name="alarm">
<xs:sequence>
<xs:element maxOccurs="unbounded" minOccurs="0"
name="alarmhistories"
nillable="true" type="tns:alarmhistory"/>
<xs:element name="baseId" type="xs:int"/>
<xs:element minOccurs="0" name="creationDate" type="xs:dateTime"/>
<xs:element minOccurs="0" name="lastModifyDate" type="xs:dateTime"/>
<xs:element minOccurs="0" name="ruleName" type="xs:string"/>
<xs:element minOccurs="0" name="statusType" type="tns:statusType"/>
</xs:sequence>
</xs:complexType>
<xs:complexType name="alarmhistory">
<xs:sequence>
<xs:element minOccurs="0" name="creationDate" type="xs:dateTime"/>
<xs:element minOccurs="0" name="statusType" type="tns:statusType"/>
</xs:sequence>
</xs:complexType>
<xs:complexType name="removeRuleRequest">
<xs:sequence>
<xs:element name="name" type="xs:string"/>
<xs:element name="transactionId" type="xs:string"/>
</xs:sequence>
</xs:complexType>
<xs:complexType name="activeDeactiveRuleRequest">
<xs:sequence>
<xs:element maxOccurs="unbounded" minOccurs="0" name="devices"
nillable="true" type="xs:string"/>
<xs:element name="ruleName" type="xs:string"/>
<xs:element name="transactionId" type="xs:string"/>
</xs:sequence>
</xs:complexType>
<xs:complexType name="modifyRuleRequest">
```

TABLE 67-continued

EventHandler.wsdl

```
<xs:sequence>
<xs:element name="expressian" type="xs:string"/>
<xs:element name="ruleName" type="xs:string"/>
<xs:element name="transactionId" type="xs:string"/>
</xs:sequence>
</xs:complexType>
<xs:simpleType name="statusType">
<xs:restriction base="xs:string">
<xs:enumeration value="ACTIVE"/>
<xs:enumeration value="DEACTIVE"/>
<xs:enumeration value="CREATED"/>
<xs:enumeration value="LOADED"/>
<xs:enumeration value="EXECUTED"/>
<xs:enumeration value="ERROR"/>
<xs:enumeration value="CLOSED"/>
</xs:restriction>
</xs:simpleType>
</xs:schema>
</types>
<message name="EventHandler_modifyRuleExpressionResponse">
<part name="response" type="tns:eventHandlerResponse">
</part>
</message>
<message name="EventHandler_removeRuleResponse">
<part name="response" type="tns:eventHandlerResponse">
</part>
</message>
<message name="EventHandler_removeRule">
<part name="request" type="tns:removeRuleRequest">
</part>
</message>
<message name="EventHandler_modifyRuleExpression">
<part name="request" type="tns:modifyRuleRequest">
</part>
</message>
<message name="EventHandler_removeAction">
<part name="request" type="tns:addActionRequest">
</part>
</message>
<message name="EventHandler_findFunctions"
<part name="request" type="tns:functionRequest">
</part>
</message>
<message name="EventHandler_removeActionResponse">
<part name= "response" type="tns:eventHandlerResponse">
</part>
</message>
<message name="EventHandler_findFieldsResponse">
<part name= "response" type="tns:fieldResponse">
</part>
</message>
<message name="EventHandler_addAction">
<part name="request" type="tns:addActionRequest">
</part>
</message>
<message name="EventHandler_addActionResponse">
<part name="response" type="tns:eventHandlerResponse">
</part>
</message>
<message name="EventHandler_findActionsAndParamiters">
<part name="request" type="tns:eventHandlerRequest"
</part>
</message>
<message name="EventHandler_findActionsAndParamitersResponse">
<part name= "response" type="tns:actionResponse">
</part>
</message>
<message name="EventHandler_findFields">
<part name="request" type="tns:fieldRequest">
</part>
</message>
<message name="EventHandler_activeRule">
<part name="request" type="tns:activeDeactiveRuleRequest">
</part>
</message>
<message name="EventHandler_findAlarms">
<part name="request" type="tns:alarmRequest">
</part>
```

TABLE 67-continued

EventHandler.wsdl

```
</message>
<message name="EventHandler_findAlarmsResponse">
<part name="response" type="tns:alarmResponse">
</part>
</message>
<message name="EventHandler_findRules">
<part name="request" type="tns:findRuleRequest">
</part>
</message>
<message name="EventHandler_findFunctionsResponse">
<part name="response" type="tns:functionResponse">
</part>
</message>
<message name="EventHandler_addRuleResponse">
<part name="response" type="tns:eventHandlerResponse">
</part>
</message>
<message name="EventHandler_activeRuleResponse">
<part name="response" type="tns:eventHandlerResponse">
</part>
</message>
<message name="EventHandler_addRule">
<part name="request" type="tns:addRuleRequest">
</part>
</message>
<message name="EventHandler_deactiveRule">
<part name="request" type="tns:activeDeactiveRuleRequest">
</part>
</message>
<message name="EventHandler_findRulesResponse">
<part name="response" type="tns:findRuleResponse">
</part>
</message>
<message name="EventHandler_deactiveRuleResponse">
<part name="response" type="tns:eventHandlerResponse">
</part>
</message>
<portType name="EventHandler">
<operation name="activeRule" parameterOrder="request">
<input message="tns:EventHandler_activeRule">
</input>
<output message="tns:EventHandler_activeRuleResponse">
</output>
</operation>
<operation name="addAction" parameterOrder="request">
<input message="tns:EventHandler_addAction">
</input>
<output message="tns:EventHandler_addActionResponse">
</output>
</operation>
<operation name="addRule" parameterOrder="request">
<input message="tns:EventHandler_addRule">
</input>
<output message="tns:EventHandler_addRuleResponse">
</output>
</operation>
<operation name="deactiveRule" parameterOrder="request">
<input message="tns:EventHandler_deactiveRule">
</input>
<output message="tns:EventHandler_deactiveRuleResponse">
</output>
</operation>
<operation name="findActionsAndParamiters" parameterOrder="request">
<input message="tns:EventHandler_findActionsAndParamiters">
</input>
<output message="tns:EventHandler_findActionsAndParamitersResponse">
</output>
</operation>
<operation name="findAlarms" parameterOrder="request">
<input message="tns:EventHandler_findAlarms">
</input>
<output message="tns:EventHandler_findAlarmsResponse">
</output>
</operation>
<operation name="findFields" parameterOrder="request">
<input message="tns:EventHandler_findFields">
</input>
<output message="tns:EventHandler_findFieldsResponse">
```

TABLE 67-continued

EventHandler.wsdl

```
</output>
</operation>
<operation name="findFunctions" parameterOrder="request">
<input message="tns:EventHandler_findFunctions">
</input>
<output message="tns:EventHandler_findFunctionsResponse">
</output>
</operation>
<operation name="findRules" parameterOrder="request">
<input message="tns:EventHandler_findRules">
</input>
<output message="tns:EventHandler_findRulesResponse">
</output>
</operation>
<operation name="modifyRuleExpression" parameterOrder="request">
<input message="tns:EventHandler_modifyRuleExpression">
</input>
<output message="tns:EventHandler_modifyRuleExpressionResponse">
</output>
</operation>
<operation name="removeAction" parameterOrder="request">
<input message="tns:EventHandler_removeAction">
</input>
<output message="tns:EventHandler_removeActionResponse">
</output>
</operation>
<operation name="removeRule" parameterOrder="request">
<input message="tns:EventHandler_removeRule">
</input>
<output message="tns:EventHandler_removeRuleResponse">
</output>
</operation>
</portType>
<binding name="EventHandlerBinding" type="tns:EventHandler">
<soap:binding style="rpc"
transport="http://schemas.xmlsoap.org/soap/http"/>
<operation name="activeRule">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="addAction"">
<soap:operation soapAction="/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="addRule"
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="deactiveRule">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
```

TABLE 67-continued

EventHandler.wsdl

```
</output>
</operation>
<operation name="findActionsAndParamiters">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="findAlarms">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="findFields">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="findFunctions"
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="findRules">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="modifyRuleExpression">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="removeAction">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
```

TABLE 67-continued

EventHandler.wsdl

```
</operation>
<operation name="removeRule">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
</binding>
<service name="EventHandlerInterface">
<port name="EventHandlerPort" binding="tns:EventHandlerBinding">
<soap:address
location="http://127.0.0.1:8080/M2M/InfoBrokerEventHandler"/>
</port>
</service>
</definitions>
```

Table 68 shows an example listing of a SystemConfiguration.wsdl.

TABLE 68

SystemConfiguration.wsdl

```
<?xml version="1.0" encoding="UTF-8"?>
<definitions name="SystemConfigurationInterface"
targetNamespace="http://services.infobroker.m2m.amos.company.com"
xmlns:tns="http://services.infobroker.m2m.amos.company.com"
xmlns:xsd="http://www.w3.org/2001/XMLSchema"
xmlns:soap="http://schemas.xmlsoap.org/wsdl/soap/"
xmlns="http://schemas.xmlsoap.org/wsdl/">
<types>
<xs:schema
targetNamespace="http://services.infobroker.m2m.amos.company.com"
version="1.0" xmlns:xs="http://www.w3.org/2001/XMLSchema">
<xs:complexType name="customerServiceRequest">
<xs:seguence>
<xs:element name="customerId" type="xs:string"/>
<xs:element name="serviceId" type="xs:int"/>
<xs:element name="transactionId" type="xs:string"/>
</xs:sequence>
</xs:complexType>
<xs:complexType name="systemConfigurationResponse">
<xs:sequence>
<xs:element minOccurs="0" name="errorCode" type="xs:int"/>
<xs:element minOccurs="0" name="errorDesc" type="xs:string"/>
<xs:element minOccurs="0" name="statusCode" type="xs:int"/>
</xs:sequence>
</xs:complexType>
<xs:complexType name="groupProjectRequest">
<xs:sequence>
<xs:element name="groupId" type="xs:int"/>
<xs:element name="projectId" type="xs:int"/>
<xs:element name="transactionId" type="xs:string"/>
</xs:sequence>
</xs:complexType>
</xs:schema>
</types>
<message
name="SystemConfiguration_deassociateGroupFromProjectResponse">
<part name="response" type="tns:systemConfigurationResponse">
</part>
</message>
<message name="SystemConfiguration_customerDomainSubscription">
<part name="request" type="tns:customerServiceRequest">
</part>
</message>
<message name="SystemConfiguration_deassociateGroupFromProject">
<part name="request" type="tns:groupProjectRequest">
</part>
</message>
<message
name="SystemConfiguration_customerDomainUnsubscriptionResponse">
<part name="response" type="tns:systemConfigurationResponse">
</part>
</message>
<message name="SystemConfiguration_customerDomainUnsubscription">
<part name="request" type="tns:customerServiceRequest">
</part>
</message>
<message name="SystemConfiguration_customerDomainSubscriptionResponse">
<part name="response" type="tns:systemConfigurationResponse">
</part>
```

TABLE 68-continued

SystemConfiguration.wsdl

```
</message>
<message name="SystemConfiguration_associateGroupToProject">
<part name="request" type="tns:groupProjectRequest">
</part>
</message>
<message name="SystemConfiguration_associateGroupToProjectResponse">
<part name="response" type="tns:systemConfigurationResponse">
</part>
</message>
<portType name="SystemConfiguration">
<operation name="associateGroupToProject" parameterOrder="request">
<input message="tns:SystemConfiguration_associateGroupToProject">
</input>
<output
message="tns:SystemConfiguration_associateGroupToProjectResponse">
</output>
</operation>
<operation name="customerDomainSubscription" parameterOrder="request">
<input message="ths:SystemConfiguration_customerDomainSubscription">
</input>
<output
message="ths:SystemConfiguration_customerDomainSubscriptionResponse">
</output>
</operation>
<operation name="customerDomainUnsubscription" parameterOrder="request">
<input message="tns:SystemConfiguration_customerDomainUnsubscription">
</input>
<output
message="tns:SystemConfiguration_customerDomainUnsubscriptionResponse">
</output>
</operation>
<operation name="deassociateGroupFromProject" parameterOrder="request">
<input message="tns:SystemConfiguration_deassociateGroupFromProject">
</input>
<output
message="tns:SystemConfiguration_deassociateGroupFromProjectResponse">
</output>
</operation>
</portType>
<binding name="SystemConfigurationBinding"
type="tns:SystemConfiguration">
<soap:binding style="rpc"
transport="http://schemas.xmlsoap.org/soap/http"/>
<operation name="associateGroupToProject">
<soap:operation soapAction=""/>
<input>
<soap:body use="literal"
namespace="http://services.infobroker.m2m.amos.company.com"/>
</input>
<output>
<soap:body use= "literal"
namespace="http://services.infobroker.m2m.amos.company.com"/>
</output>
</operation>
<operation name="customerDomainSubscription">
<soap:operation soapAction=""/>
<input>
<soap:body use= "literal"
namespace="http://services.infobroker.m2m.amos.company.com"/>
</input>
<output>
<soap:body use= "literal"
namespace="http://services.infobroker.m2m.amos.company.com"/>
</output>
</operation>
<operation name="customerDomainUnsubscription">
<soap:operation soapAction=""/>
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
<operation name="deassociateGroupFromProject">
<soap:operation soapAction=""/>
```

TABLE 68-continued

SystemConfiguration.wsdl

```
<input>
<soap:body use="literal"
namespace="http://services.infobroker.m2m.amos.company.com"/>
</input>
<output>
<soap:body use="literal"
namespace="http://services.infobroker.m2m.amos.company.com"/>
</output>
</operation>
</binding>
<service name="SystemConfigurationInterface">
<port name="SystemConfigurationPort"
binding="tns:SystemConfigurationBinding">
<soap:address
location="http://127.0.0.1:8080/M2M/InfoBrokerSystemConfiguration"/>
</port>
</service>
</definitions>
```

Some characteristics of exemplary services which may be supported by the Platform 102 are given below:

Service: Home Control & Smart Metering

1. End User joins a Residential Building offering through a Vertical Portal and pays for the subscription using a Mobile Money management offering.

2. Third party service provider or user configures and upgrade/downgrade Home controller capabilities.

3. End user downloads a controller application on his mobile phone that implements a soft panel integrating information (metering, status), control (turn on/off), or other functions.

The end user with the own mobile phone will be able to: keep power costs under control; optimize energy savings, for example, lamp dimmer regulation in order to keep constant the light in a room depending on the presence or absence of persons; keep environmental values (temperature, light, air quality) under defined thresholds and receive alarms; monitor real time status for each appliance, receive warnings for abnormal values; detect and respond to human presence in a room, and other capabilities.

Service: Enterprise Building Control & Security

1. Enterprise joins a Building Control & Security offering through Vertical Portal and pays for the subscription using Mobile Money management offering 2. Service Provider is able to configure and upgrade/downgrade Building controller capabilities.

3. Enterprise building will be cabled in order to register:

Employee access, thought a badge/face recognition/NFC or RFID stick.

Energy consumption, compared with thresholds in order to reduce wastes and managing alarms.

Environmental values (temperature, light, air quality) top keep them under defined thresholds.

Schedules for turning on/off of lights group, heating plant.

Optimize energy savings.

Enterprise Administration manages and monitors all the control and security equipment using, for example, a mobile phone.

Service: Remote HealthCare

1. End User/Doctor interacts with or provides hospital treatment at patient's home through Digital Pen technology or via Health Care Vertical Portal.

2. End User/Patient is able to measure the following device values which are reported to the architecture 100:

Glucometer

Blood Pressure

Weight

Hearth beat, or other health data

3. End User/Patient sends data to Hospital Data Center.

4. End User/Doctor sends to patient the correct therapy based on last measurement.

Service: Pharmacy Automation

1. Based on diagnostic report within Health Care scenario or during medical check-up, a doctor prepares a medical prescription through a mobile device application.

2. Medical prescription is sent to patient via medical virtual voucher creating a "patient barcode".

3. Patient requests medicine at pharmacy through medical virtual voucher assigned by the doctor.

4. Patient pays for medicine using contactless mobile point of sale device.

Service: Wellness Empowerment

1. Gym creates a technology environment and service automate the End User approach to the equipment.

2. End User subscribes to the service through a Retailer Mobile Portal and receives an SMS for mobile application download.

3. User will pay in "pay as you use" or subscription mode. Payments are managed through a Mobile Money Management service 4. For subscription mode, the End User receives the service pass enabled with a barcode through his mobile application.

5. End User access the services (e.g., gym equipment) through his personal pass: smart gym equipment recognizes the End User, traces training performances and suggests how to improve the training.

6. Personal trainer can access the record for the End User in order to correctly tune the training.

7. End User is able to accesses the training chart and training performance through a kiosk within the gym.

8. Through the healthcare equipment, weight, hearthbeat, and blood pressure are monitored; in case critical values are reached due to training, both the doctor and the personal trainer are alerted through SMS; both the medical record and the training chart are updated.

9. Gym Admin is able to attribute loyalty points and discount/gift voucher to the End User.

Service: Centralized Policy Management

1. End User joins an insurance policy for CAR and HOME and LIFE through Mobile Data Capture or Vertical Insurance Portal.

2. End User accesses Insurance Portal and selects less expensive policy per policy segment:

CAR Policy: policy cost will be reduced because of Pay As You Drive or other options.

HOME Policy: policy cost will be reduced because of security functions at the home.

LIFE Policy: policy cost will be reduced because of Personal Tracking or monitoring devices associated with the user.

3. Insurance Company will activate the control devices based on selected policy.

4. Insurance platform will be advised for each threshold exceeded in order to determinate the next fare to pay and will notify to End User.

5. For each client that earns a reward, the insurance company assigns virtual voucher discount to be used in purchasing new policy.

Service: Fleet Management

1. A business operator monitoring the entire fleet joins the service to:

Track each vehicle in real time (e.g., GPS position, speed, fuel, sensors)

Manage theft/accident alarms

Setup geo-fencing zones and manage the related warnings

Support drivers in term of scheduling jobs, for example

Obtain warnings when the truck is out of the defined target road/direction

2. A data transceiver present in each vehicle will send data in predefined time periods, allowing the M2M platform to produce the fleet management services.

3. SMS messages can be delivered to the entire fleet or to a single driver.

Service: Proof of Delivery Automation

1. A logistic company delivers goods with its own fleet and it needs to certify/automate/digitalize each freight with a Proof of Delivery; each vehicle is equipped with an data transceiver, connected with vehicle sensors, a GPS antenna, a Digital Pen.

2. The driver ships the goods to the recipient and has the recipient sign the delivery document; the data transceiver sends data to the mobile platform.

3. The company back-office may:

Monitor in real time the shipment (GPS position, status of the delivery)

Watch/Validate/Forward the delivery document signed by the recipient with the driver's digital pen.

Monitor Anti-Fraud Reports

Monitor alarms/warning about driver behavior (average and max speed, accidents, and so on)

Setup Geo-fencing zones for the fleet

Service: Smart Shopping

1. End User subscribes to the service through Mobile Data Capture and/or Retailer site; after subscribing, End User receives an SMS for mobile application download and Retail Admin will provision a support application on the architecture 100.

2. End User will administer his own Home equipment to configure "shopping rules" to be visualized on his handset application.

3. End User at the Shop may then calculate the amount for the purchased products through a contactless interface on products and cash register contactless reader.

4. End User pays the shopping cart using Mobile Money Management contactless application on his phone and collects points on his loyalty card.

5. Retail Admin sends discount vouchers to End User phone.

6. End user accesses the reward catalogue in order to redeem the awards and spends any vouchers during the next shop visit.

The following describes an exemplary implementation of the web console 266.

Figure 26:
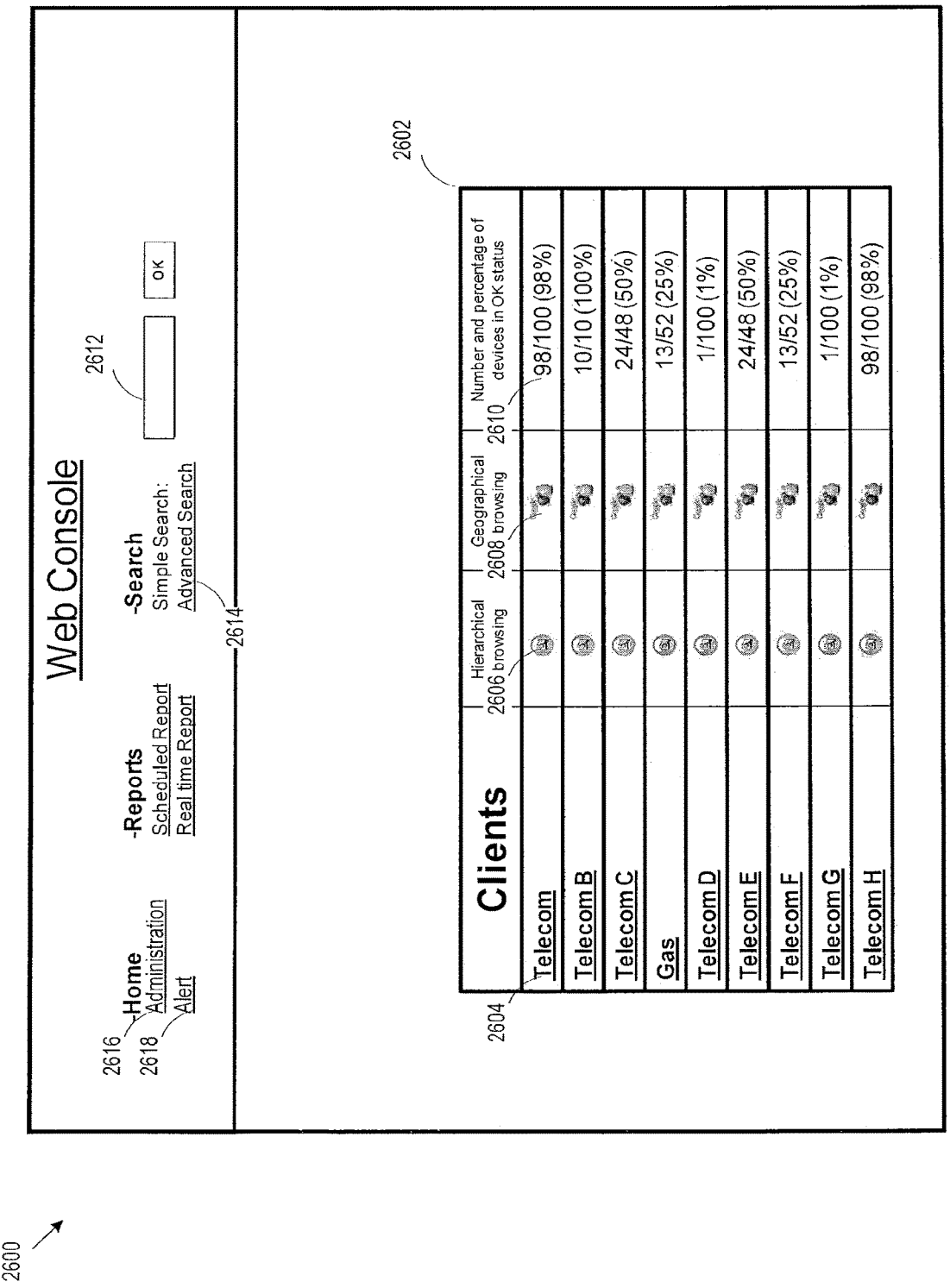
FIG. 26 shows an example web console interface 2600 for the architecture 100.

FIG. 26 shows an example web console interface 2600 for the architecture 100. The web console interface 2600 may be hosted in the platform enabler 204 and may be exposed to third parties through a web portal interface or other interface. The web console interface 2600 provides a clients table 2602. The clients table 2602 includes a list of client links 2604, a hierarchical browsing link 2606, a geographical browsing link 2608, and a status report 2610 for each client.

The status report 2610 may display the number and percentage of devices in a functioning or normal status for the client, or other status data. The links 2604-2608 may be implemented as hyperlinks or other pointers. Upon clicking on a client link, for example, the web console interface 2600 may display a tree view object populated with the services provided by the architecture 100 to the selected client.

The web console interface 2600 also provides a search interface 2612. The search interface 2612 accepts a search pattern, including wildcards, for finding resources managed by the architecture 100. In response, the web console interface 2600 finds matching resources and generates a search result interface 3802, such as that shown in FIG. 38. The web console interface 2600 also includes an advanced search link 2614 that leads to an advanced search interface 3902, such as that shown in FIG. 39.

Figure 40:
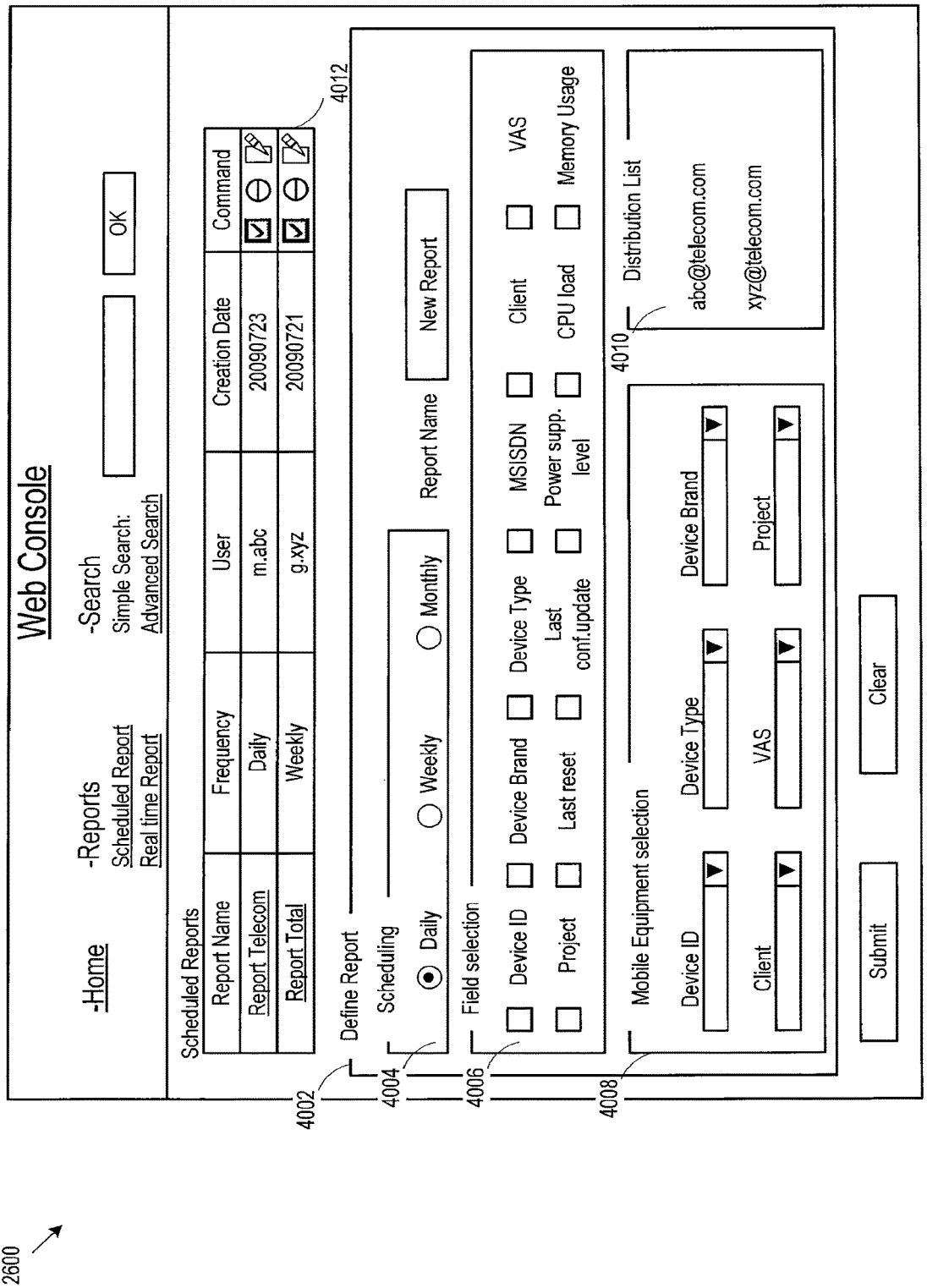
FIG. 40 shows an example of a scheduled reports interface.
Figure 42:
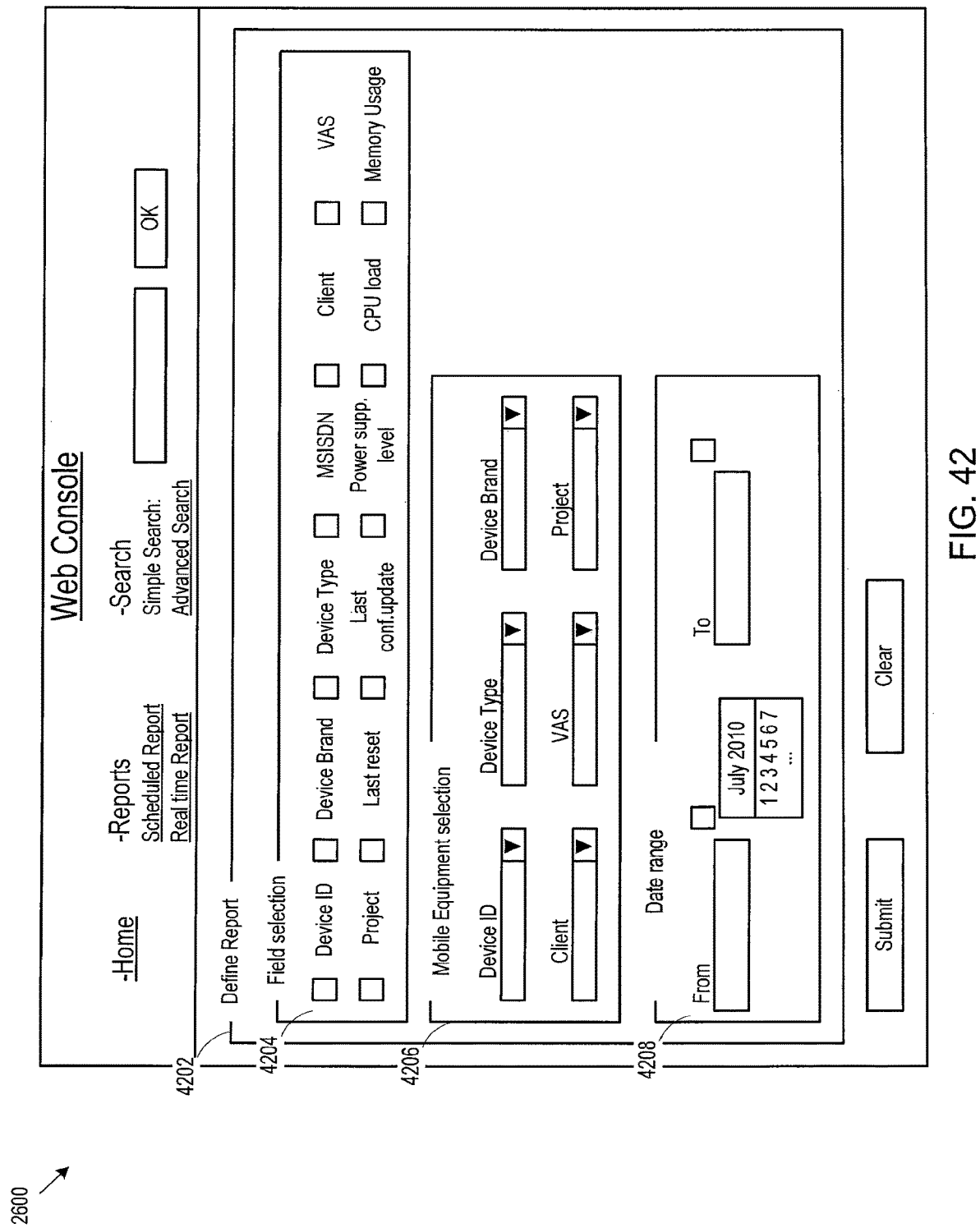
FIG. 42 shows an example of a real-time reports interface.
Figure 43:
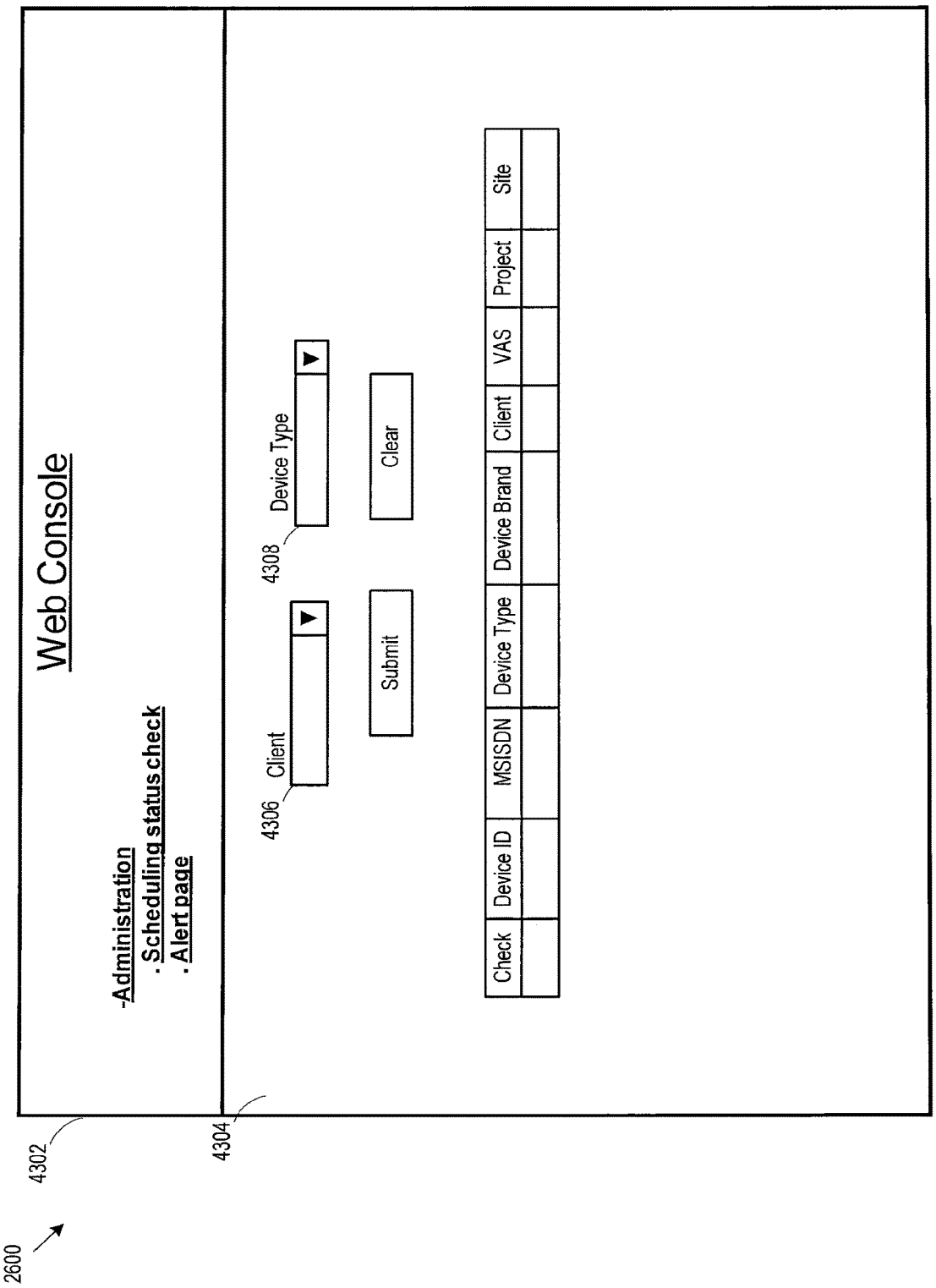
FIG. 43 shows an example of an administration interface.
Figure 48:
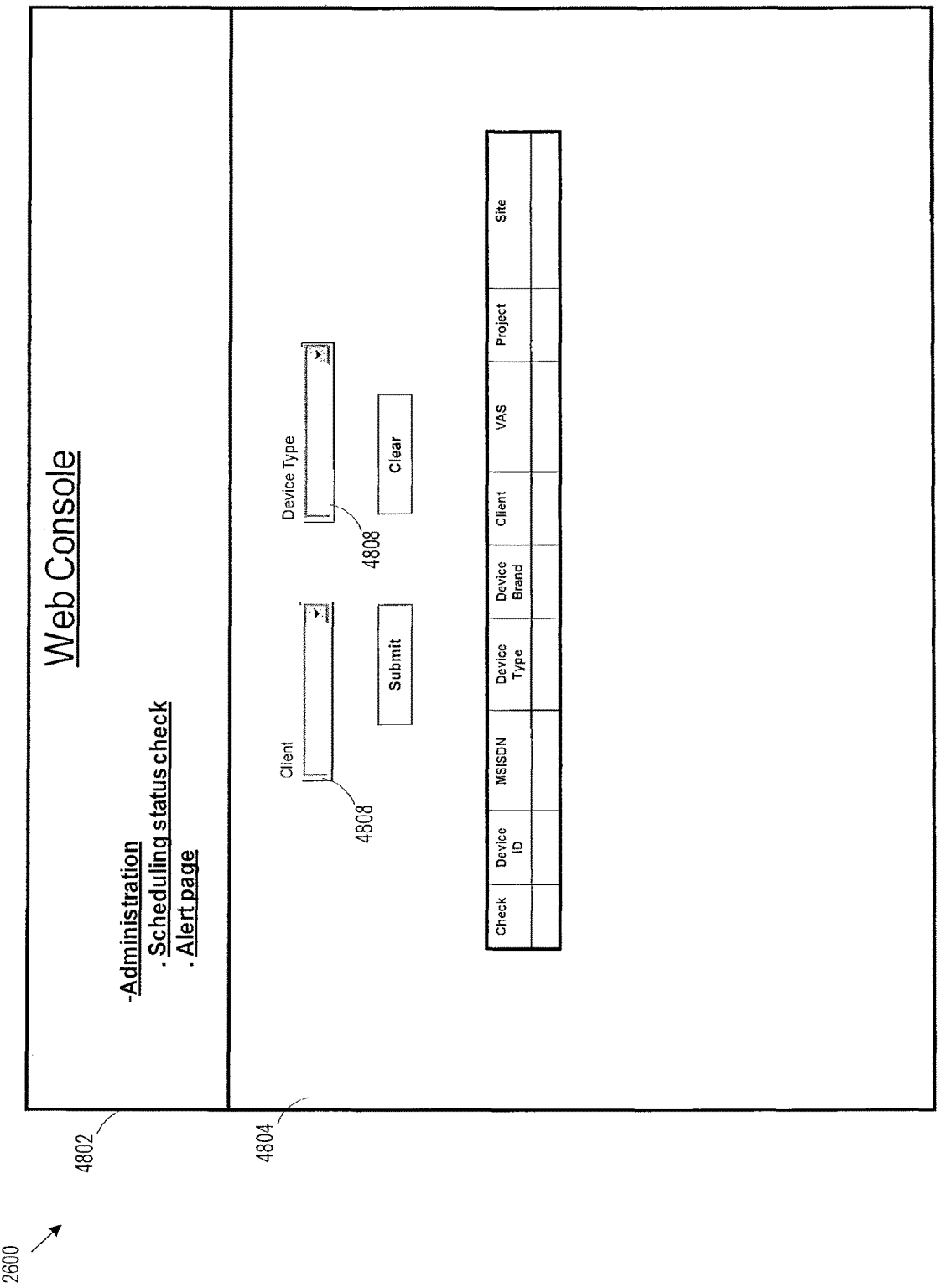
FIG. 48 shows an example of an alert interface.

The web console interface 2600 further includes a scheduled reports link 2614 that leads to a scheduled reports interface such as that shown in FIG. 40, a real-time reports link 2616 that leads to a real-time reports interface such as that shown in FIG. 42, an administration link 2616 that leads to an administration interface, such as that shown in FIG. 43, and an alert link 2618 that leads to an alert interface such as that shown in FIG. 48.

FIG. 27 shows an example tree view object 2702. The tree view object 2702 displays a list of services provided to client Telecom. In the example show in FIG. 27, the tree view object 2702 shows a vehicle tracking service 2704, a remote surveillance object 2706, and other services provided to Telecom.

FIG. 28 shows the tree view object 2702 expanded to list projects, such as the project TI-SPLB 2802. In general, tree view object 2702 populates with sites where resources, such as mobile equipment, software, or other resources, are installed, or sites that represent the current positions for equipment, such as mobile equipment, moving through a geographical region, such as a city. The main window 2804 will change to show the list of equipment belonging to the project and site selected.

FIG. 29 shows that the tree view object 2702 expands the projects objects to show the sites belonging to the project (e.g., the sites for Rome 2902). The equipment list 2904 responds to a project and site selection by listing the equipment associated to or belonging to the site. The equipment list 2904 may include a device identifier 2906, an MSISDN number 2908, a site location or description 2910, a device status 2912, or other information. Each entry in the equipment list 2904, such as the device ID 2906, may be a link to more detailed status information for the device.

FIG. 30 shows that the tree view object 2702 further expands the projects objects to show the equipment 3002 specifically associated to a selected site. As shown, the equipment list 2904 may update to show the equipment 3002 specific to the selected site.

FIG. 31 shows that the tree view object 2702 further expands the projects objects to show detailed status information links 3102 for the selected equipment. In the example shown in FIG. 31, the detailed status information links 3102 include a hardware status link, a subscriber identity module link, and an application status link. Each link may direct the main window 2804 to display detailed status for the hardware or software represented by the link. As shown in FIG. 31, the detailed status may include such status data as operational status, power supply level, memory usage, cpu load, activation status, device status, and any other desired status information. Status reports may be saved to a file, and may capture current or historical (e.g. 10 day history) device status.

FIG. 32 shows that the web console interface 2600 may include a data log download button 3202 for directing the system to save a file of log information generated for any device.

FIG. 33 shows a subscriber identity module (SIM) detailed status window 3302. The status window 3302 may show any desired SIM status information, such as whether the SIM is activated, whether it has connectivity, the MSISDN, or other status data.

Figure 34:
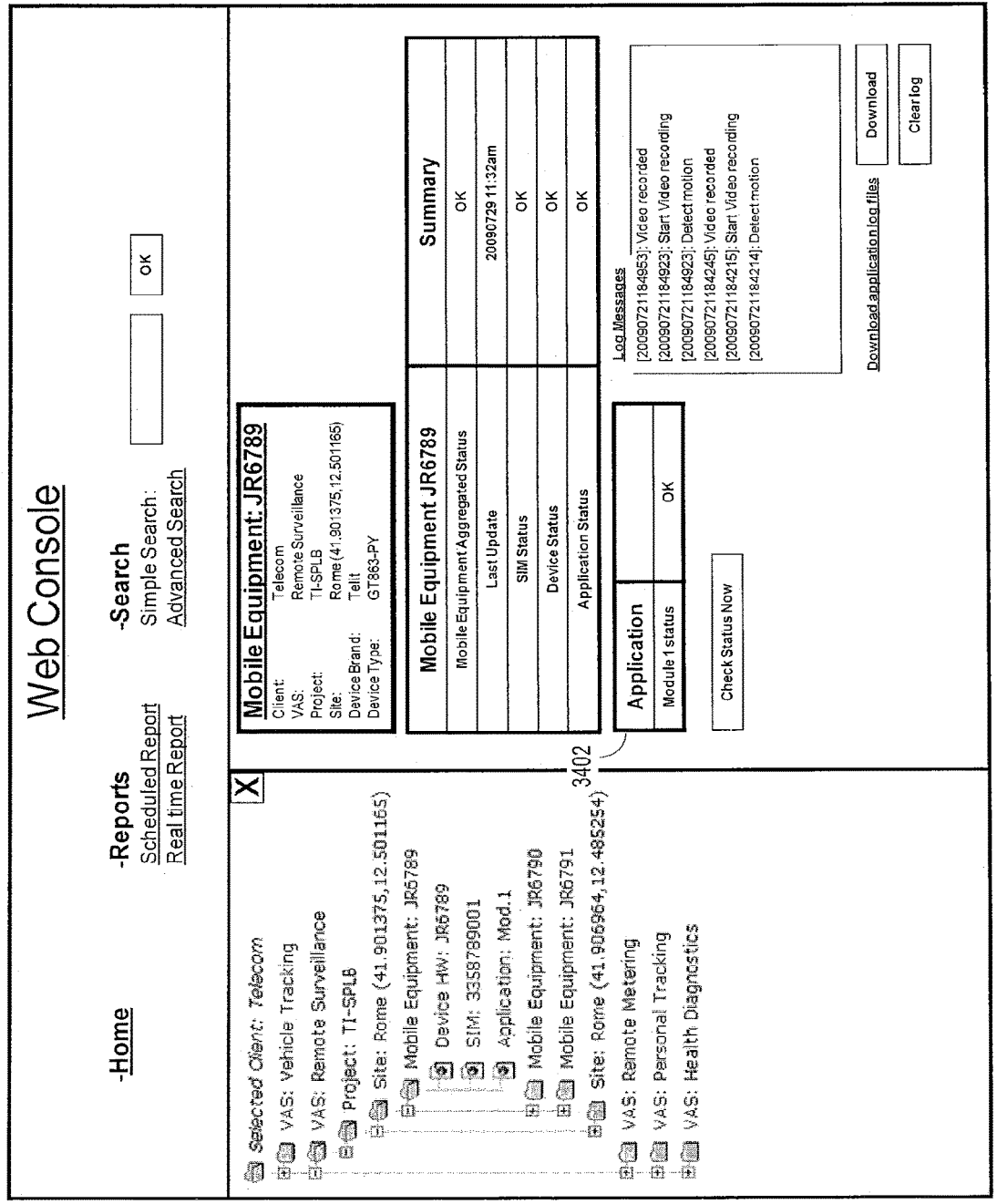
FIG. 34 shows an application modules detailed status window.

FIG. 34 shows an application modules detailed status window 3402. The status window 3402 may show any desired software model status information, such as functional status, current operation, or other status information.

FIG. 26 shows that the web console interface 2600 includes a geographical browsing link 2608. When the link 2608 is selected, the main window 2804 may change to show the device position page, illustrated in FIG. 35.

Figure 35:
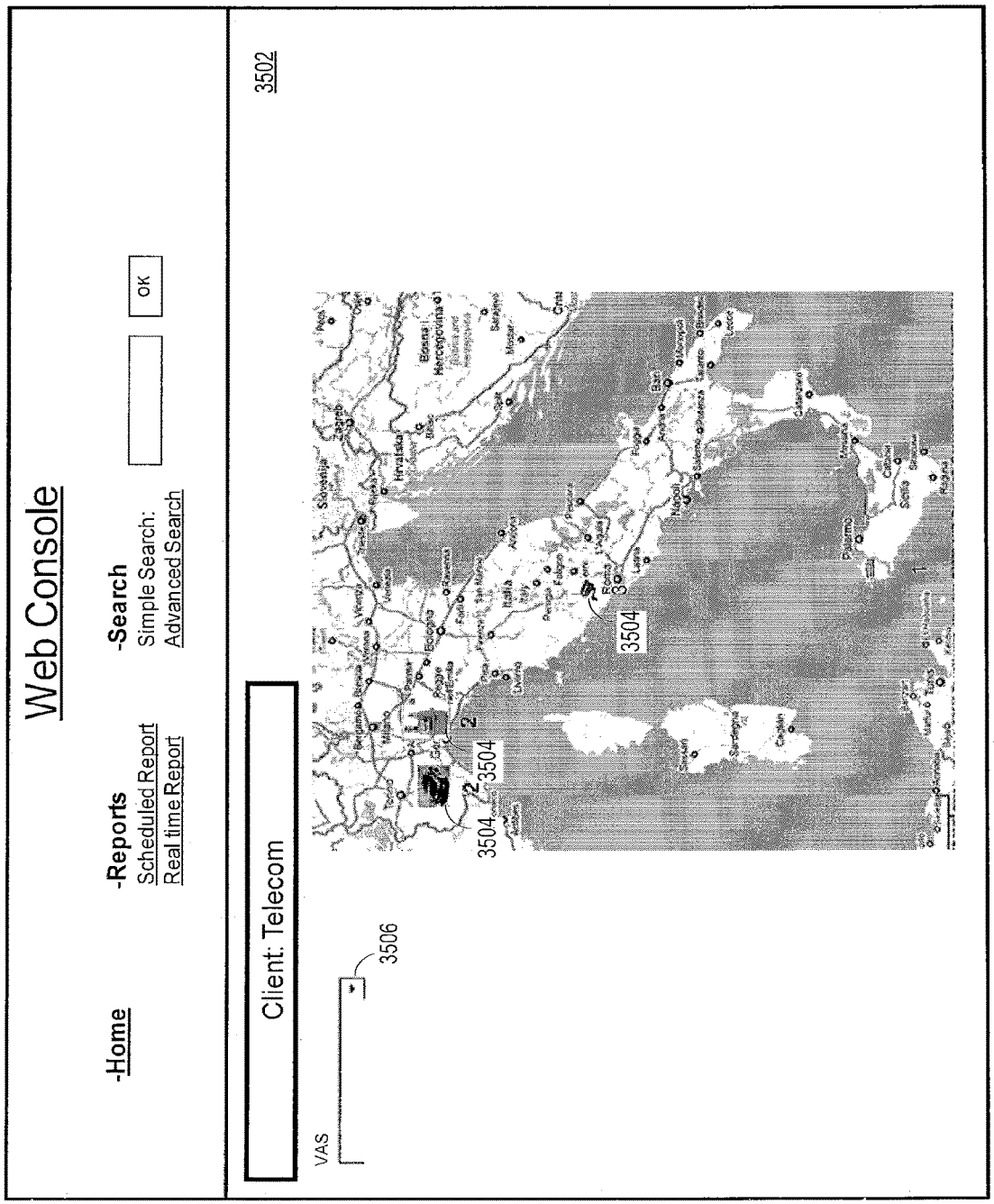
FIG. 35 shows a geographical display of resource locations.

In FIG. 35, the device position page 3502 shows a geographical display of resource location using equipment icons 3504. The device position page 3502 includes a service filter box 3506. An entry in the service filter box 3506 directs the web console interface 2600 to show icons in the device position page 3502 that belong to the entered service. Moving the mouse over an icon (or performing a different selection action) may cause the device position page 3502 to display a pop up box with any desired resource status information for a given resource or resources in an area nearby.

Figure 36:
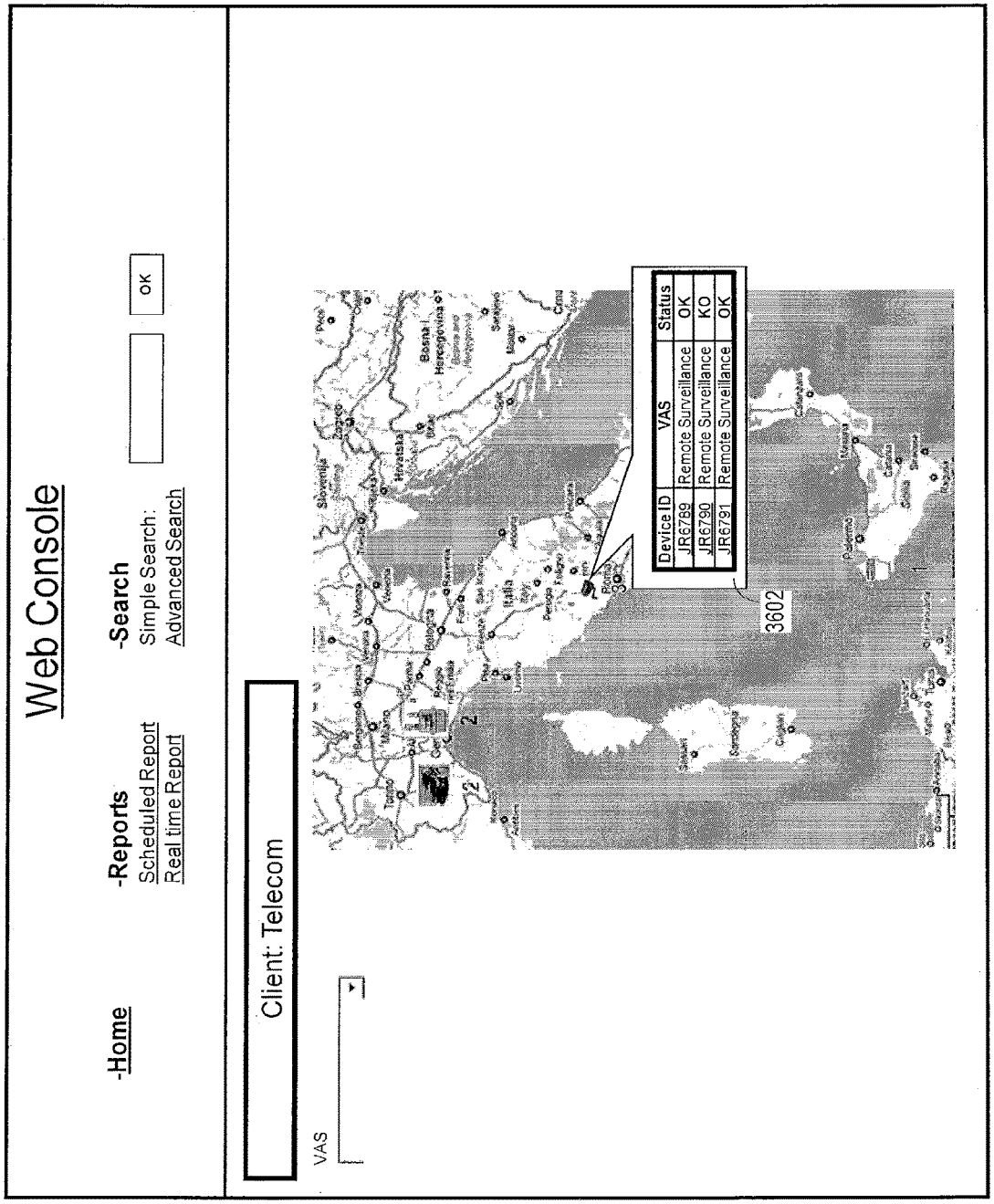
FIG. 36 shows an example of a resource status window.

FIG. 36 shows an example of a resource status window 3602 for resources in the same geographical region (e.g., the same province, county, building, zip code, or other region). Selecting a resource generates a status display page, such as that shown in FIG. 37.

FIG. 38 shows an example of the search result interface 3802 that lists each resource matching the search criteria. The search result interface 3802 may provide resource selectors 3804 and a status request buttons 3806 to direct the architecture 100 to execute a real-time query to obtain the latest data available for each resource. The last status update field 3808 shows a timestamp for the status information currently displayed.

Figure 39:
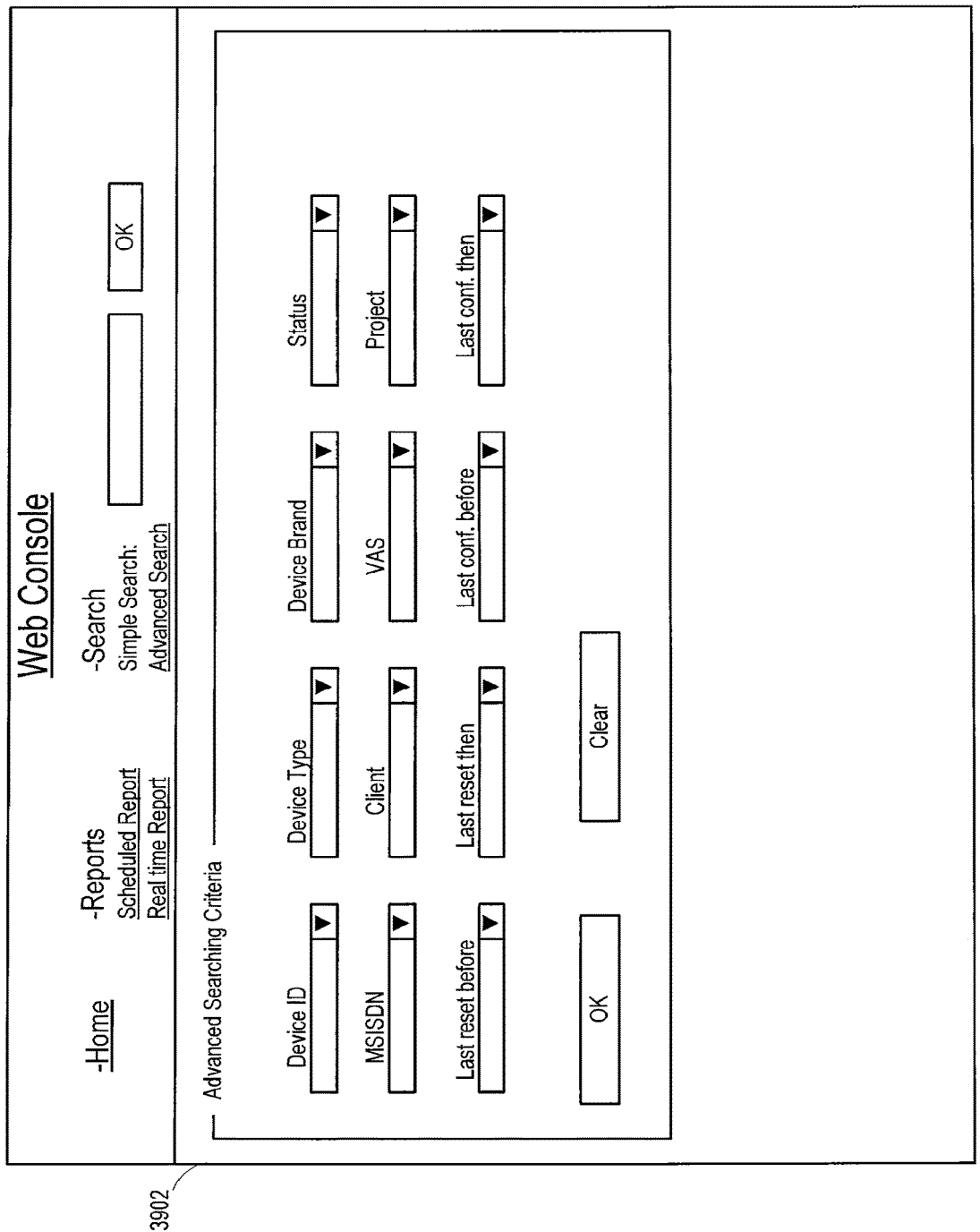
FIG. 39 shows an example of an advanced search interface.

FIG. 39 shows an example of the advanced search interface 3902. The advanced search interface 3902 provides data entry elements for any desired search criteria. As examples, the advanced search interface 3902 includes search criteria for a client name, MSISDN, project name, and other criteria.

FIG. 40 shows an example of the scheduled reports interface 4002. The interface 4002 includes report generation criteria for defining any desired report. In the example shown in FIG. 40, the interface 4002 provides report timing options 4004 for daily, weekly, or monthly scheduling, status fields 4006 to include in the report (e.g., device id and project), resource filters 4008 to select which devices are added into the report, and a recipient email address field 4010 to specify who will receive by email a copy of the report. the interface 4002 also shows an existing report list 4012 of previously defined reports, which may be deleted or modified.

Figure 41:
FIG. 41 shows an example of a scheduled reports interface with a newly defined report added.

FIG. 41 shows that a newly defined report 4102 is added into the existing report list 4012 for future access.

FIG. 42 shows an example of the real-time reports interface 4202. The interface 4202 provides status fields 4204 to include in the report (e.g., device id and project), resource filters 4206 to select which devices are added into the report, and a date range filter 4208 to specify a temporal range for the status. The real-time report is generated upon activation of the submit button, according to the criteria set in the interface 4202.

FIG. 43 shows an example of the administration interface 4302. Once the user has logged in as an administrator, the administration interface 4302 provides a resource selection interface for managing resources and clients. For example, the resource selection interface 4304 provides a client selection 4306 and a device selection 4308 for administration.

FIG. 44 shows an example administration page 4402 resulting from the selection of an IP Camera device type. The interface 4304 generates a list of matching devices 4404, and includes a detailed scheduling option 4406 and a distributed scheduling option 4408. The detailed scheduling option 4406 permits direct scheduling of status update checks on one or more devices according to specified minutes, hours, and days. The distributed scheduling option 4408 permits the user to specify a time range within which to check the resource, and whether the check will be performed daily, weekly, monthly, or on some other basis. The schedule check buttons 4410 display a page that permits setting the scheduling frequency, either in the detailed manner, or in the distributed manner.

FIG. 45 shows that upon client selection through the administration page 4402, a tree view object 4502 may be displayed showing services provided to the selected client. Specific device selection may continue using the tree view object 4502 as noted above.

FIG. 46 shows the detailed scheduling page 4602. The administration interface may display the detailed scheduling page 4602 when the detailed scheduling option 4406 is selected. The detailed scheduling page 4602 may provide scheduling entries for minute, hour, day of month, month, day of week, or other scheduling criteria.

FIG. 47 shows the distributed scheduling page 4702. The administration interface may display the distributed scheduling page 4702 when the distributed scheduling option 4408 is selected. The distributed scheduling page 4702 may provide scheduling entries for a time range, frequency, or other options, such that status checks are executed within the time range with the specified frequency.

FIG. 48 shows an example of the alert interface 4802. The alert interface 4802 provides a resource selection interface 4804 for obtaining alerts on resources. For example, the resource interface 4804 provides a client selection 4806 and a device selection 4808.

Figure 49:
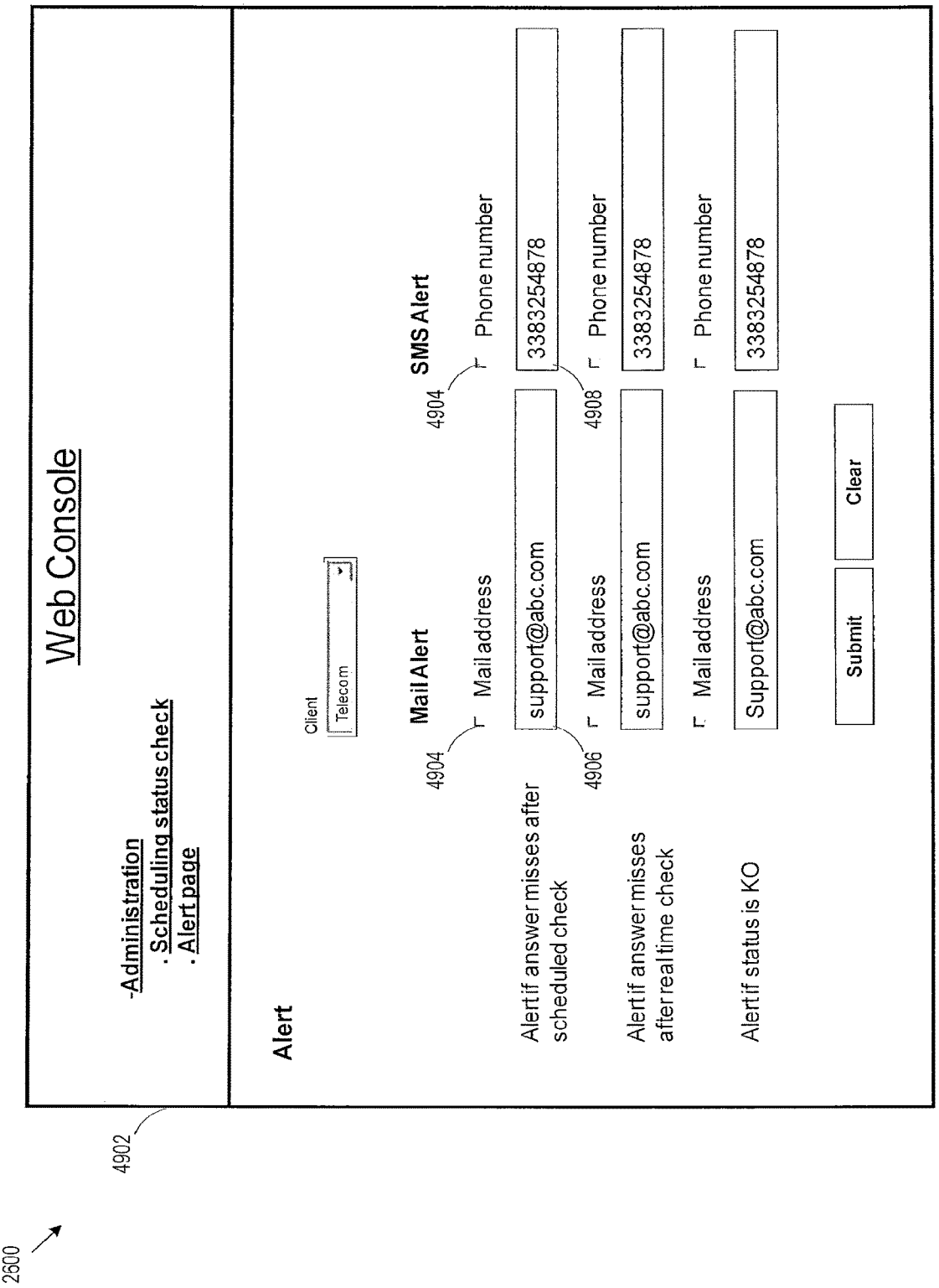
FIG. 49 shows an alert configuration interface.

FIG. 49 shows an alert configuration interface 4902 to facilitate communication of alerts for specific clients, and that notification channel selectors 4904 permit the user to specify whether alerts are sent by email, SMS, or other channel. To that end, interface 4902 provides entry fields 4906 and 4908 for email addresses and SMS numbers. The interface 4902 also permits the alerts to be sent to different recipients depending on the timing of the alert (e.g., after a scheduled check, after a real-time check, or when the alert status reaches a specific state, such as 'down' or 'knocked out').

The systems, modules, components and logic described above may be implemented in many different ways. The functionality may be implemented in a single system or functionally partitioned across multiple systems. As another example, the modules, components, systems, and logic may be implemented as computer-executable instructions or as data structures in memory may be stored on, distributed across, or read from many different types of machine-readable media. The machine-readable media may include RAM, ROM, hard disks, floppy disks, CD-ROMs, a signal, such as a signal received from a network or partitioned into sections and received in multiple packets communicated across a network. The systems may be implemented in software, hardware, or a combination of software and hardware.

Furthermore, the systems may be implemented with additional, different, or fewer components. As one example, a processor or any other logic, module, or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

The interface between components and systems such as the core SDP may include Transport Control Protocol (TCP), Real Time Transport Protocol (RTP) or other transport logic. The network gateway may route information based on Internet Protocol v4, v6 (i.e., IPv4 or IPv6) or other network layer protocols. The data link layer may include wired or wireless links, such as IEEE 802.11, WiFi, WiMAX, Asynchronous Transfer Mode (ATM), Fiber Distributed Data Interface (FDDI), Ethernet, or other data link layers over optical fiber, coaxial cable, twisted pair or other physical layers.

Interfaces between the systems and the logic and modules within systems may be implemented in numerous ways. For example, interface between systems may be Web Services, Simple Object Access Protocol, or Enterprise Service Bus interfaces. Other examples of interfaces include message passing, such as publish/subscribe messaging, shared memory, and remote procedure calls.

The hardware and software platforms that run in the SDP DS may vary widely. As examples, the endpoints may run the Windows CE™ operating system, JAVA ME™ system, Symbian™ operating system, Palm™ operating system. The hardware platforms may be implemented with a general purpose processing platform, such as those available from Sun Microsystems, Hewlett Packard, or International Business Machines and running Unix, Windows™, Linux or other operating systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A machine-to-machine communication platform, comprising:
   an interface configured to communicate data to and from a plurality of Internet based data acquisition devices;
   a storage device;
   instruction code storage; and
   a processor in communication with the interface, storage device and instruction code storage, wherein the instruction code storage stores instruction code for causing the processor to:
   store data communicated from one or more of the plurality of Internet based data acquisition devices to the storage device;
   convert at least some of the received data to a common format;
   analyze data communicated by one or more of the data acquisition devices in real-time;
   generate a visual representation of data acquired by one or more of the data acquisition devices in real-time;
   permit a user of the platform to associate a rule with one or more of the plurality of Internet based data acquisition devices;
   permit a user of the platform to define one or more new rules or manage one or more existing rules to control how data acquired by an associated data acquisition device is communicated from the associated data acquisition device to a third party system outside of the platform; and
   perform one or more actions according to the one or more rules.

2. The machine-to-machine communication platform according to claim 1, wherein the instruction code causes the processor to register one or more of the plurality of Internet based data acquisition devices with the machine-to-machine communication platform.

3. The machine-to-machine communication platform according to claim 1, wherein the actions performed include one or more of: transmitting an email to the third party system, transmitting an instant message to the third party system, and transmitting an alarm.

4. The machine-to-machine communication platform according to claim 1, wherein the plurality of Internet based data acquisition devices include one or more of: sensors, gateways, home automation devices, and home metering devices.

5. The machine-to-machine communication platform according to claim 1, wherein the data received from the plurality of Internet based data acquisition devices includes measurement data associated with measurements performed by the Internet based data acquisition devices.

6. The machine-to-machine communication platform of claim 1, wherein the instruction code causes the processor to communicate a message to a mobile device.

7. The machine-to-machine communication platform of claim 1, wherein the instruction code causes the processor to communicate to the third party system to trigger activation and/or implementation of a process at the third party system.

8. A method performed by a machine-to-machine communication platform for communicating information, the method comprising:
   communicating, through an interface of the machine-to-machine communication platform, data to and from a plurality of Internet based data acquisition devices;
   storing data communicated from one or more of the plurality of Internet based data acquisition devices to a storage device;

converting at least some of the received data to a common format;

analyzing data communicated by one or more of the data acquisition devices in real-time;

generating a visual representation of the data acquired by one or more of the data acquisition devices in real-time;

receiving information from a user of the machine-to-machine communication platform to associate a rule with one or more of the plurality of Internet based data acquisition devices;

receiving information from a user of the machine-to-machine communication platform to define one or more new rules or manage one or more existing rules to control how data acquired by an associated data acquisition device is communicated from the associated data acquisition device to a third party system outside of the machine-to-machine communication platform; and performing one or more actions according to the one or more rules.

9. The method according to claim 8, further comprising registering one or more of the plurality of Internet based data acquisition devices with the machine-to-machine communication platform.

10. The method according to claim 8, wherein the actions performed include one or more of: transmitting an email to the third party system, transmitting an instant message to the third party system, and transmitting an alarm.

11. The method according to claim 8, wherein the plurality of Internet based data acquisition devices include one or more of: sensors, gateways, home automation devices, and home metering devices.

12. The method according to claim 8, wherein the data received from the plurality of Internet based data acquisition devices includes measurement data associated with measurements performed by the Internet based data acquisition devices.

13. The method according to claim 8, further comprising communicating a message to a mobile device.

14. The method according to claim 8, further comprising communicating to the third party system to trigger activation and/or implementation of a process at the third party system.

15. A non-transitory computer readable medium that stores instruction code for communicating information between machines, the instruction code being executable by a machine for causing the machine to perform acts comprising:

communicating data to and from a plurality of Internet based data acquisition devices;

storing data communicated from one or more of the plurality of Internet based data acquisition devices to a storage device;

converting at least some of the received data to a common format;

analyzing data communicated by one or more of the data acquisition devices in real-time;

generating a visual representation of the data acquired by one or more of the data acquisition devices in real-time;

receiving information from a user of the machine to associate a rule with one or more of the plurality of Internet based data acquisition devices;

receiving information from a user of the machine to define one or more new rules or manage one or more existing rules to control how data acquired by an associated data acquisition device is communicated from the associated data acquisition device to a third party system outside of the machine; and performing one or more actions according to one or more rules.

16. The non-transitory computer readable medium according to claim 15, wherein the instruction code causes the machine to register one or more of the plurality of Internet based data acquisition devices with the machine.

17. The non-transitory computer readable medium according to claim 15, wherein the actions performed include one or more of: transmitting an email to the third party system, transmitting an instant message to the third party system, and transmitting an alarm.

18. The non-transitory computer readable medium according to claim 15, wherein the plurality of Internet based data acquisition devices include one or more of: sensors, gateways, home automation devices, and home metering devices.

19. The non-transitory computer readable medium according to claim 15, wherein the data received from the plurality of Internet based data acquisition devices includes measurement data associated with measurements performed by the Internet based data acquisition devices.

20. The non-transitory computer readable medium according to claim 15, wherein the instruction code causes the machine to communicate a message to a mobile device.

21. The machine-to-machine communication platform according to claim 1, wherein the instruction code causes the processor to permit a user of the platform to define one or more new rules by invoking an addRule service in an event handler.

22. The machine-to-machine communication platform according to claim 1, wherein the instruction code causes the processor to permit a user of the platform by calling services in an event handler to deactivate one or more existing rules by calling a deactiveRule service, add a new Action to one or more existing rules by calling an addAction service, or activate one or more existing rules by calling an activeRule service.

* * * * *